US012606671B2

(12) United States Patent
Maruhashi et al.

(10) Patent No.: US 12,606,671 B2
(45) Date of Patent: Apr. 21, 2026

(54) CURABLE COMPOSITION

(71) Applicant: DAIKIN INDUSTRIES, LTD., Osaka (JP)

(72) Inventors: Kazuki Maruhashi, Osaka (JP); Yoshiaki Honda, Osaka (JP); Hisashi Mitsuhashi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 646 days.

(21) Appl. No.: 18/090,945

(22) Filed: Dec. 29, 2022

(65) Prior Publication Data

US 2023/0137488 A1 May 4, 2023

Related U.S. Application Data

(63) Continuation of application No. PCT/JP2021/024997, filed on Jul. 1, 2021.

(30) Foreign Application Priority Data

Jul. 2, 2020 (JP) ................................ 2020-115115

(51) Int. Cl.

| | |
|---|---|
| ***C08G 65/336*** | (2006.01) |
| ***C08G 65/00*** | (2006.01) |
| ***C08G 65/332*** | (2006.01) |
| ***C08G 69/40*** | (2006.01) |
| ***C08G 69/42*** | (2006.01) |
| ***C09D 5/16*** | (2006.01) |
| ***C09D 171/00*** | (2006.01) |
| ***C09D 177/00*** | (2006.01) |

(52) U.S. Cl.

CPC ....... *C08G 65/3322* (2013.01); *C08G 65/007* (2013.01); *C08G 65/336* (2013.01); *C08G 69/40* (2013.01); *C08G 69/42* (2013.01); *C09D 5/16* (2013.01); *C09D 5/1662* (2013.01); *C09D 171/00* (2013.01); *C09D 177/00* (2013.01)

(58) Field of Classification Search

None

See application file for complete search history.

(56) References Cited

U.S. PATENT DOCUMENTS

| | | | | |
|---|---|---|---|---|
| 3,876,617 A * | 4/1975 | Caporiccio | ............ | C08G 69/42 528/229 |
| 6,020,450 A * | 2/2000 | Matsuda | .................. | C07F 7/21 528/21 |
| 2015/0307719 A1 | 10/2015 | Mitsuhashi et al. | | |
| 2019/0002635 A1 | 1/2019 | Mitsuhashi et al. | | |
| 2023/0137488 A1 * | 5/2023 | Maruhashi | ........... | C08G 65/007 524/850 |

FOREIGN PATENT DOCUMENTS

| | | |
|---|---|---|
| EP | 4 079 787 A1 | 10/2022 |
| JP | 2014-218639 A | 11/2014 |
| JP | 2017-082194 A | 5/2017 |
| WO | 2021/125058 A1 | 6/2021 |

OTHER PUBLICATIONS

Extended European Search Report issued Jun. 6, 2024 in Application No. 21834593.2.
International Search Report for PCT/JP2021/024997 dated Sep. 21, 2021.
International Preliminary Report on Patentability with the translation of Written Opinion dated Dec. 13, 2022 from the International Bureau in International Application No. PCT/JP2021/024997.

* cited by examiner

*Primary Examiner* — David J Buttner
(74) *Attorney, Agent, or Firm* — Sughrue Mion, PLLC

(57) ABSTRACT

A fluoropolyether group-containing silane compound represented by the following formula (I) wherein the symbols are as defined herein:

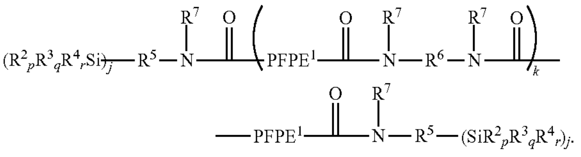

18 Claims, No Drawings

CURABLE COMPOSITION

This application is a Rule 53(b) continuation of International Application No. PCT/JP2021/024997 filed Jul. 1, 2021, which claims priority from Japanese Patent Application No. 2020-115115 filed Jul. 2, 2020. The disclosures of each of the above-identified applications are incorporated herein by reference in their entireties.

TECHNICAL FIELD

The present disclosure relates to a surface-treating agent.

BACKGROUND ART

Certain types of fluorine-containing silane compounds are known to be capable of providing excellent water-repellency, oil-repellency, antifouling property, and the like when used in surface treatment of a substrate. A layer obtained from a surface-treating agent containing a fluorine-containing silane compound (hereinafter, also referred to as a "surface-treating layer") is applied as a so-called functional thin film to a large variety of substrates such as glass, plastics, fibers, and building materials.

A known such fluorine-containing compound is a perfluoropolyether group-containing silane compound having a perfluoropolyether group in the molecular backbone and a hydrolyzable group bonding to a Si atom at the molecular terminal or in the terminal part (Patent Literatures 1 and 2).

CITATION LIST

Patent Literature

Patent Literature 1: JP 2014-218639 A
Patent Literature 2: JP 2017-082194 A

SUMMARY

[1]A fluoropolyether group-containing silane compound represented by the following formula (I):

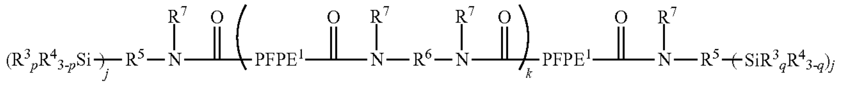

(I)

wherein $R^3$ is each independently at each occurrence a hydrogen atom or a monovalent organic group;

$R^4$ is each independently at each occurrence a hydroxyl group or a hydrolyzable group;

p is each independently at each occurrence an integer of 0 to 3, provided that, in at least one $SiR^3_pR^4_{3-p}$ in $(SiR^3_pR^4_{3-p})_j$, p is an integer of 0 to 2;

q is each independently at each occurrence an integer of 0 to 3, provided that, in at least one $SiR^3_qR^4_{3-q}$ in $(SiR^3_qR^4_{3-q})_j$, q is an integer of 0 to 2;

$R^5$ is each independently at each occurrence a (j+1)-valent organic group;

$R^6$ is each independently at each occurrence $—R^{16}—R^{15}—R^{17}$;

$R^{15}$ is each independently at each occurrence a cycloalkylene-containing group;

$R^{16}$ is each independently at each occurrence a single bond or a divalent organic group;

$R^{17}$ is each independently at each occurrence a single bond or a divalent organic group;

$R^7$ is each independently at each occurrence a hydrogen atom or a $C_{1-20}$ alkyl group;

$PFPE^1$ is each independently at each occurrence $—R^F—R^{FE}$;

$R^F$ is $—(C_fF_{2f})—$;

f is an integer of 1 to 10;

$R^{FE}$ is a divalent fluoropolyether group represented by formula:

$$—(OCF_2)_{a1}—(OC_2F_4)_{a2}—(OC_3X^{10}{}_6)_{a3}—(OC_4F_8)_{a4}—(OC_5F_{10})_{a5}—(OC_6F_{12})_{a6}—(OC_7F_{14})_{a7}—(OC_8F_{16})_{a8}—$$

wherein a1, a2, a3, a4, a5, a6, a7, and a8 are each independently an integer of 0 to 200 and the sum of a1, a2, a3, a4, a5, a6, a7, and a8 is at least 5, the occurrence order of the respective repeating units enclosed in parentheses provided with the subscript a1, a2, a3, a4, a5, a6, a7, or a8 is not limited in the formula, and $X^{10}$ is each independently at each occurrence a hydrogen atom, a fluorine atom, or a chlorine atom, provided that at least one of a1, a2, a4, a5, a6, a7, and a8 is an integer of 1 or more when all $X^{10}$ is a hydrogen atom or a chlorine atom;

j is independently at each occurrence an integer of 1 to 9; and k is an integer of 1 or more.

Advantageous Effect

According to the present disclosure, it is possible to provide a fluoropolyether group-containing silane compound that has excellent friction durability.

DESCRIPTION OF EMBODIMENTS

Hereinafter, a fluoropolyether group-containing silane compound of the present disclosure will be described.

The term "monovalent organic group", as used herein, refers to a monovalent group containing carbon. The monovalent organic group is not limited, and may be a hydrocarbon group or a derivative thereof. The derivative of the hydrocarbon group refers to a group that has one or more of N, O, S, Si, amide, sulfonyl, siloxane, carbonyl, carbonyloxy, and the like at the terminal or in the molecular chain of the hydrocarbon group. The simple term "organic group" refers to a monovalent organic group. The term "(j+1)-valent organic group" refers to a (j+1)-valent group containing carbon. The (j+1)-valent organic group may be, but is not limited to, a (j+1)-valent group obtained by further removing j hydrogen atoms from an organic group. For example, the divalent organic group may be, but is not limited to, a divalent group obtained by further removing one hydrogen atom from an organic group.

The term "hydrocarbon group", as used herein, refers to a group that contains carbon and hydrogen and that is obtained by removing one hydrogen atom from a hydrocarbon. The hydrocarbon group is not limited, and examples thereof include a $C_{1-20}$ hydrocarbon group optionally substituted with one or more substituents, such as an aliphatic hydrocarbon group and an aromatic hydrocarbon group. The above "aliphatic hydrocarbon group" may be either linear, branched, or cyclic, and may be either saturated or unsaturated. The hydrocarbon group may contain one or more ring structures.

Each substituent of the "hydrocarbon group", as used herein, is not limited, and examples thereof include a halogen atom; and one or more groups selected from a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5- to 10-membered heterocyclyl group, a 5- to 10-membered unsaturated heterocyclyl group, a $C_{6-10}$ aryl group, and a 5- to 10-membered heteroaryl group, each of which is optionally substituted with one or more halogen atoms.

The fluoropolyether group-containing silane compound of the present disclosure is represented by the following formula (I):

(in the formula:

a1, a2, a3, a4, a5, a6, a7, and a8 are each independently an integer of 0 to 200 and the sum of a1, a2, a3, a4, a5, a6, a7, and a8 is at least 5;

the occurrence order of the respective repeating units enclosed in parentheses provided with the subscript a1, a2, a3, a4, a5, a6, a7, or a8 is not limited in the formula; and $X^{10}$ is each independently at each occurrence a hydrogen atom, a fluorine atom, or a chlorine atom, provided that at least one of a1, a2, a4, a5, a6, a7, and a8 is an integer of 1 or more when all $X^{10}$ is a hydrogen atom or a chlorine atom.)

j is independently at each occurrence an integer of 1 to 9; and k is an integer of 1 or more.].

$PFPE^1$ is a so-called fluoropolyether group, and is each independently at each occurrence $—R^F—R^{FE}—$.

$R^F$ is $—(C_fF_{2f})—$, and f is an integer of 1 to 10.

f is preferably an integer of 1 to 6, more preferably an integer of 1 to 4, and still more preferably an integer of 1 to 3.

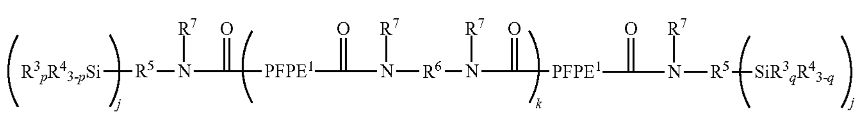

(I)

[in the formula:

$R^3$ is each independently at each occurrence a hydrogen atom or a monovalent organic group;

$R^4$ is each independently at each occurrence a hydroxyl group or a hydrolyzable group;

p is each independently at each occurrence an integer of 0 to 3, provided that, in at least one $SiR^3_pR^4_{3-p}$ in $(SiR^3_pR^4_{3-p})_j$, p is an integer of 0 to 2;

q is each independently at each occurrence an integer of 0 to 3, provided that, in at least one $SiR^3_qR^4_{3-q}$ in $(SiR^3_qR^4_{3-q})_j$, q is an integer of 0 to 2;

$R^5$ is each independently at each occurrence a (j+1)-valent organic group;

$R^6$ is each independently at each occurrence $—R^{16}—R^{15}—R^{17}$;

$R^{15}$ is each independently at each occurrence a cycloalkylene-containing group;

$R^{16}$ is each independently at each occurrence a single bond or a divalent organic group;

$R^{17}$ is each independently at each occurrence a single bond or a divalent organic group;

$R^7$ is each independently at each occurrence a hydrogen atom or a $C_{1-20}$ alkyl group;

$PFPE^1$ is each independently at each occurrence $—R^F—R^{FE}$;

$R^F$ is $—(C_fF_{2f})—$;

f is an integer of 1 to 10;

$R^{FE}$ is a divalent fluoropolyether group represented by formula:

$$—(OCF_2)_{a1}—(OC_2F_4)_{a2}—(OC_3X^{10}_6)_{a3}—(OC_4F_8)_{a4}—(OC_5F_{10})_{a5}—(OC_6F_{12})_{a6}—(OC_7F_{14})_{a7}—(OC_8F_{16})_{a8}—$$

$R^{FE}$ is a divalent fluoropolyether group represented by formula:

$$—(OCF_2)_{a1}—(OC_2F_4)_{a2}—(OC_3X^{10}_6)_{a3}—(OC_4F_8)_{a4}—(OC_5F_{10})_{a5}—(OC_6F_{12})_{a6}—(OC_7F_{14})_{a7}—(OC_8F_{16})_{a8}—$$

$X^{10}$ is each independently at each occurrence a hydrogen atom, a fluorine atom, or a chlorine atom, provided that at least one of a1, a2, a4, a5, a6, a7, and a8 is an integer of 1 or more when all $X^{10}$ is a hydrogen atom or a chlorine atom.

In a preferred embodiment, $X^{10}$ is a fluorine atom.

a1, a2, a3, a4, a5, a6, a7, and a8 are each independently an integer of 0 to 200, preferably an integer of 0 to 100, and the sum of a1, a2, a3, a4, a5, a6, a7, and a8 is 5 or more, preferably 10 or more, and more preferably 15 or more or 20 or more, and is preferably 200 or less, more preferably 100 or less, and 50 or less or 30 or less, for example.

The occurrence order of the respective repeating units enclosed in parentheses provided with the subscript a1, a2, a3, a4, a5, a6, a7, or a8 is not limited in the formula.

These repeating units may be linear or branched. For example, $—(OC_8F_{16})—$ may be $—(OCF_2CF_2CF_2CF_2CF_2CF_2CF_2CF_2)—$, $—(OCF(CF_3)CF_2CF_2CF_2CF_2CF_2CF_2)—$, $—(OCF_2CF(CF_3)CF_2CF_2CF_2CF_2CF_2)—$, $—(OCF_2CF_2CF(CF_3)CF_2CF_2CF_2CF_2)—$, $—(OCF_2CF_2CF_2CF(CF_3)CF_2CF_2CF_2)—$, $—(OCF_2CF_2CF_2CF_2CF(CF_3)CF_2CF_2)—$, $—(OCF_2CF_2CF_2CF_2CF_2CF(CF_3)CF_2)—$, $—(OCF_2CF_2CF_2CF_2CF_2CF_2CF(CF_3))—$, or the like, but it is preferably $(OCF_2CF_2CF_2CF_2CF_2CF_2CF_2CF_2)—$. $—(OC_7F_{14})—$ may be $—(OCF_2CF_2CF_2CF_2CF_2CF_2CF_2)—$, $—(OCF(CF_3)CF_2CF_2CF_2CF_2CF_2)—$, $—(OCF_2CF(CF_3)CF_2CF_2CF_2CF_2)—$, $—(OCF_2CF_2CF(CF_3)CF_2CF_2CF_2)—$, $—(OCF_2CF_2CF_2CF(CF_3)CF_2CF_2)—$, $—(OCF_2CF_2CF_2CF_2CF(CF_3)CF_2)—$, $—(OCF_2CF_2CF_2CF_2CF_2CF(CF_3))—$, or the like, but it is preferably $—(OCF_2CF_2CF_2CF_2CF_2CF_2CF_2)—$.

$-(OC_6F_{12})-$ may be $-(OCF_2CF_2CF_2CF_2CF_2CF_2)-$, $-(OCF(CF_3)CF_2CF_2CF_2CF_2)-$, $-(OCF_2CF(CF_3)CF_2CF_2CF_2)-$, $-(OCF_2CF_2CF(CF_3)CF_2CF_2)-$, $-(OCF_2CF_2CF_2CF(CF_3)CF_2)-$, $-(OCF_2CF_2CF_2CF_2CF(CF_3))-$, or the like, but it is preferably $-(OCF_2CF_2CF_2CF_2CF_2CF_2)-$. $-(OC_5F_{10})-$ may be $-(OCF_2CF_2CF_2CF_2CF_2)-$, $-(OCF(CF_3)CF_2CF_2CF_2)-$, $-(OCF_2CF(CF_3)CF_2CF_2)-$, $(OCF_2CF_2CF(CF_3)CF_2)-$, $-(OCF_2CF_2CF_2CF(CF_3))-$, or the like, but it is preferably $-(OCF_2CF_2CF_2CF_2CF_2)-$. $-(OC_4F_8)-$ may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$, and $-(OCF_2CF(C_2F_5))-$, but it is preferably $-(OCF_2CF_2CF_2CF_2)-$. $-(OC_3F_6)-$ (that is, in the above formula, $X^{10}$ is a fluorine atom) may be any of $-(OCF_2CF_2CF_2)-$, $-(OCF(CF_3)CF_2)-$, and $-(OCF_2CF(CF_3))-$, but it is preferably $-(OCF_2CF_2CF_2)-$. In addition, $-(OC_2F_4)-$ may be any of $-(OCF_2CF_2)-$ and $-(OCF(CF_3))-$, but it is preferably $-(OCF_2CF_2)-$.

$PFPE^1$ in the fluoropolyether group-containing silane compound of the present disclosure may have, in addition to these repeating units, a repeating unit consisting of an oxygen atom and a perfluoroalkylene group having 9 or more carbon atoms, as long as it can be prepared as a fluoropolyether group.

In one embodiment, the above repeating units are linear. When the repeating units are linear, the surface lubricity, friction durability, and the like of the surface-treating layer can be improved. In addition, in the present embodiment, the molecular mobility of the fluoropolyether group-containing silane compound at a low temperature is less likely to be reduced. By having linear repeating units, the values of physical properties (for example, elastic modulus at a low temperature) of the fluoropolyether group-containing silane compound may be less likely to be reduced compared to the values at room temperature, and thus it can be applied over a wide temperature range. The term "elastic modulus", as used herein, refers to the dynamic elastic modulus, more specifically, the storage elastic modulus.

In one embodiment, the above repeating units are branched. When the above repeating units are branched, the dynamic friction coefficient of the surface-treating layer can be increased.

In one embodiment, $R^{FE}$ is each independently at each occurrence a group represented by any of the following formulae (f1) to (f5):

$$(OC_3F_6)_{a3}-(OC_2F_4)_{a2} \quad (f1)$$

[in the formula, a3 is an integer of 5 to 200 and a2 is 0 or 1.];

$$(OC_4F_8)_{a4}-(OC_3F_6)_{a3}-(OC_2F_4)_{a2}-(OCF_2)_{a1}- \quad (f2)$$

[in the formula, a4 and a3 are each independently an integer of 0 to 30, and a2 and a1 are each independently an integer of 1 to 200, the sum of a4, a3, a2, and a1 is 5 or more, and the occurrence order of the respective repeating units enclosed in parentheses provided with the subscript a4, a3, a2, or a1 is not limited in the formula.];

$$-(R^6-R^7)_g- \quad (f3)$$

[in the formula, $R^6$ is $OCF_2$ or $OC_2F_4$, $R^7$ is a group selected from $OC_2F_4$, $OC_3F_6$, $OC_4F_8$, $OC_5F_{10}$, and $OC_6F_{12}$, or alternatively a combination of two or three groups independently selected from these groups, and g is an integer of 2 to 100.];

$$(OC_6F_{12})_{a6}-(OC_5F_{10})_{a5}-(OC_4F_8)_{a4}-(OC_3F_6)_{a3}-(OC_2F_4)_{a2}-(OCF_2)_{a1}- \quad (f4)$$

[in the formula, a2 is an integer of 1 to 200, a6, a5, a4, a3, and a1 are each independently an integer of 0 to 200, the sum of a6, a5, a4, a3, a2, and a1 is at least 5, and the occurrence order of the respective repeating units enclosed in parentheses provided with a6, a5, a4, a3, a2, or a1 is not limited in the formula.]; and $$(OC_6F_{12})_{a6}-(OC_5F_{10})_{a5}-(OC_4F_8)_{a4}-(OC_3F_6)_{a3}-(OC_2F_4)_{a2}-(OCF_2)_{a1}- \quad (f5)$$

[in the formula, a1 is an integer of 1 to 200, a6, a5, a4, a3, and a2 are each independently an integer of 0 to 200, the sum of a6, a5, a4, a3, a2, and a1 is at least 5, and the occurrence order of the respective repeating units enclosed in parentheses provided with a6, a5, a4, a3, a2, or a1 is not limited in the formula.].

In the above formula (f1), a3 is preferably 5 to 200, more preferably 10 to 100, and still more preferably 15 to 50, and it is, for example, an integer of 25 to 35. In one embodiment, a2 is 1. In another embodiment, a2 is 0. In the above formula (f1), $-(OC_3F_6)_d-$ is preferably a group represented by $-(OCF_2CF_2CF_2)_{a3}-$ or $-(OCF(CF_3)CF_2)_{a3}-$, and is more preferably a group represented by $-(OCF_2CF_2CF_2)_{a3}-$.

In the above formula (f2), a2 and a1 are each independently an integer of preferably 5 or more and 200 or less, and more preferably 10 to 200. In addition, the sum of a4, a3, a2, and a1 is preferably 5 or more, and more preferably 10 or more, and it may be, for example, 15 or more or 20 or more. In one embodiment, the above formula (f2) is preferably a group represented by $-(OCF_2CF_2CF_2CF_2)_{a4}-(OCF_2CF_2CF_2)_{a3}-(OCF_2CF_2)_{a2}-(OCF_2)_{a1}-$. In another embodiment, formula (f2) may be a group represented by $-(OC_2F_4)_{a2}-(OCF_2)_{a1}-$.

In the above formula (f3), $R^6$ is preferably $OC_2F_4$. In the above formula (f3), $R^7$ is preferably a group selected from $OC_2F_4$, $OC_3F_6$, and $OC_4F_8$, or a combination of two or three groups independently selected from these groups, and is more preferably a group selected from $OC_3F_6$ and $OC_4F_8$. Examples of the combination of two or three groups independently selected from $OC_2F_4$, $OC_3F_6$, and $OC_4F_8$ are not limited, but include $-OC_2F_{40}C_3F_6-$, $-OC_2F_{40}C_4F_8-$, $-OC_3F_{60}C_2F_4-$, $-OC_3F_{60}C_3F_6-$, $-OC_3F_{60}C_4F_8-$, $-OC_4F_8OC_4F_8-$, $-OC_4F_8OC_3F_6-$, $-OC_4F_8OC_2F_4-$, $-OC_2F_{40}C_2F_{40}C_3F_6-$, $-OC_2F_{40}C_2F_{40}C_4F_8-$, $-OC_2F_{40}C_3F_{60}C_2F_4-$, $-OC_2F_{40}C_3F_{60}C_3F_6-$, $-OC_2F_{40}C_4F_8OC_2F_4-$, $-OC_3F_{60}C_2F_{40}C_2F_4-$, $-OC_3F_{60}C_2F_{40}C_3F_6-$, $-OC_3F_{60}C_3F_{60}C_2F_4-$, and $-OC_4F_8OC_2F_{40}C_2F_4-$. In the above formula (f3), g is an integer of preferably 3 or more, and more preferably 5 or more. g is preferably an integer of 50 or less. In the above formula (f3), $OC_2F_4$, $OC_3F_6$, $OC_4F_8$, $OC_5F_{10}$, and $OC_6F_{12}$ may be either linear or branched, and they are preferably linear. In this embodiment, the above formula (f3) is preferably $-(OC_2F_4-OC_3F_6)_g-$ or $-(OC_2F_4-OC_4F_8)_g-$.

In the above formula (f4), a2 is preferably an integer of 1 to 100, and is more preferably an integer of 5 to 100. The sum of a6, a5, a4, a3, a2, and a1 is preferably 5 or more, and is more preferably 10 or more, for example, 10 or more and 100 or less.

In the above formula (f5), a1 is preferably an integer of 1 to 100, and is more preferably an integer of 5 or more and 100 or less. The sum of a6, a5, a4, a3, a2 and a1 is preferably 5 or more, and is more preferably 10 or more, for example, 10 or more and 100 or less.

In one embodiment, $R^{FE}$ is a group represented by the above formula (f1).

In one embodiment, $R^{FE}$ is a group represented by the above formula (f2).

In one embodiment, $R^{FE}$ is a group represented by the above formula (f3).

In one embodiment, $R^{FE}$ is a group represented by the above formula (f4).

In one embodiment, $R^{FE}$ is a group represented by the above formula (f5).

In $R^{FE}$, the ratio of a2 to a1 (hereinafter, referred to as an "a2/a1 ratio") is 0.1 to 10, preferably 0.2 to 5, more preferably 0.2 to 2, still more preferably 0.2 to 1.5, and further preferably 0.2 to 0.85. With an a2/a1 ratio of 10 or less, the lubricity, friction durability, and chemical resistance (such as durability against artificial sweat) of a surface-treating layer obtained from the compound are further improved. The lower the a2/a1 ratio is, the more improved the lubricity and friction durability of the surface-treating layer is. On the other hand, with an a2/a1 ratio of 0.1 or more, the stability of the compound can be further enhanced. The larger the a2/a1 ratio is, the more improved the stability of the compound is.

In one embodiment, the above a2/a1 ratio is preferably 0.2 to 0.95, and is more preferably 0.2 to 0.9.

In one embodiment, from the viewpoint of heat resistance, the above a2/a1 ratio is preferably 1.0 or more, and is more preferably 1.0 to 2.0.

In the above fluoropolyether group-containing silane compound, the number average molecular weight of the $PFPE^1$ moiety is not limited, but it is, for example, 500 to 100,000, preferably 1,500 to 50,000, and more preferably 2,000 to 10,000. In the present specification, the number average molecular weight of $PFPE^1$ is defined as a value obtained by $^{19}F$-NMR measurement.

In another embodiment, the number average molecular weight of the $PFPE^1$ moiety can be 500 to 100,000, preferably 1,000 to 30,000, more preferably 2,000 to 15,000, and still more preferably 2,000 to 10,000, for example, 3,000 to 6,000.

In another embodiment, the number average molecular weight of the $PFPE^1$ moiety can be 4,000 to 30,000, preferably 5,000 to 10,000, and more preferably 6,000 to 10,000.

k in formula (I) of the above fluoropolyether group-containing silane compound represents the number of repeating units of the structure represented by the following formula in formula (I).

$$-PFPE^1-C(=O)NR^7-R^6-NR^7C(=O)-$$

The value of k is 1 or more. Accordingly, in the above fluoropolyether group-containing silane compound, there are at least two units having the structure represented by $-C(=O)NR^7-$ at both ends of $-PFPE^1-$, which means that the above fluoropolyether group-containing silane compound has at least four structures represented by $-C(=O)NR^7-$. The value of k is not limited as long as it is in the range wherein the above fluoropolyether group-containing silane compound can be prepared, but it is preferably an integer of 1 to 5. As a result of this, the moiety, which is considered to be able to contribute to the deep curability of a curable composition containing the fluoropolyether group-containing silane compound, can be provided in a large number in one molecule.

Although the present invention is not bound by any particular theory, in the structure represented by $-C(=O)NR^7-$, the oxygen atom of the carbonyl group and the hydrogen atom in the case where $R^7$ is a hydrogen atom can be involved in formation of a hydrogen bond with a water molecule. An increase in the number of structures represented by $-C(=O)NR^7$-in one molecule will increase the number of moieties that form hydrogen bonds, which is considered to be preferable because it increases the affinity for water involved in curing of the curable composition and facilitates the curing reaction to a deep level. Accordingly, when the value of k is 1 or more in the above formula (I), the number of amide bonds contained in one molecule of the fluoropolyether group-containing silane compound is increased. This structure can be considered to be able to result in improved affinity with water molecules through hydrogen bonds and contribute to good deep curability of the curable composition.

$R^7$ in the above structure represented by $-C(=O)NR^7-$ each independently at each occurrence represents a hydrogen atom or a $C_{1-20}$ alkyl group. The above $C_{1-20}$ alkyl group is preferably a $C_{1-6}$ alkyl group, more preferably a methyl group or an ethyl group, and still more preferably a methyl group.

In one embodiment, at least one, preferably at least three, of $R^7$ is a hydrogen atom. That is, when the above fluoropolyether group-containing silane compound has the structure represented by $-C(=O)NH-$, preferably a plurality of them, the curable composition containing the fluoropolyether group-containing silane compound will be cured well to a deep level. In the case where some of $R^7$ is a hydrogen atom, there is no limitation as to which position of $R^7$ in the above fluoropolyether group-containing silane compound is a hydrogen atom. In preparation of the above fluoropolyether group-containing silane compound, the position into which the structure represented by $-C(=O)NH-$ is introduced can be controlled by selecting raw materials. From the viewpoint of forming hydrogen bonds, it is preferable that the proportion of those being hydrogen atoms among all $R^7$ present in the fluoropolyether group-containing silane compound be larger, since this will further improve the deep curability. In a particularly preferred embodiment, all $R^7$ in the above fluoropolyether group-containing silane compound is a hydrogen atom.

In the above fluoropolyether group-containing silane compound, the above structure represented by $-C(=O)NR^7-$ is bonded to an organic group represented by $R^5$ or $R^6$ via the nitrogen atom.

$R^6$ is each independently at each occurrence $-R^{16}-R^{15}-R^{17}-$.

$R^{15}$ is each independently at each occurrence a cycloalkylene-containing group; $R^{16}$ is each independently at each occurrence a single bond or a divalent organic group; and $R^{17}$ is each independently at each occurrence a single bond or a divalent organic group.

The fluoropolyether group-containing silane compound of the present disclosure contains a cycloalkylene group between the amide bonds. A surface-treating layer obtained from such a fluoropolyether group-containing silane compound of the present disclosure has high durability. Although the present disclosure is not restricted by any theory, it is considered that the fluoropolyether group-containing silane compound of the present disclosure contains a cycloalkylene group between the amide bonds, which provides higher crystallinity of a surface-treating layer formed when surface-treated with such a compound, resulting in improved durability of the film.

Furthermore, a surface-treating layer obtained from the fluoropolyether group-containing silane compound of the present disclosure imparts water-repellency to a substrate while retaining adherability of ink from printing or other means. In other words, the surface-treating layer obtained from the fluoropolyether group-containing silane compound of the present disclosure has high ink retainability.

The above cycloalkylene means a divalent saturated monocyclic or polycyclic aliphatic hydrocarbon. In such a cycloalkylene, a hydrogen atom of the ring is optionally substituted by one or more substituents.

Each substituent of the above cycloalkylene is not limited, and examples thereof include a halogen atom; and one or more groups selected from a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5- to 10-membered heterocyclyl group, a 5- to 10-membered unsaturated heterocyclyl group, a $C_{6-10}$ aryl group, and a 5- to 10-membered heteroaryl group, each of which is optionally substituted with one or more halogen atoms. In a preferred embodiment, the substituent is a $C_{1-6}$ alkyl group, preferably a methyl group or an ethyl group, and more preferably a methyl group.

The above cycloalkylene-containing group may contain a plurality of cycloalkylenes, preferably 1 to 3, and more preferably 1 or 2 cycloalkylenes.

In one embodiment, the above cycloalkylene-containing group contains one cycloalkylene.

In another embodiment, the above cycloalkylene-containing group contains two cycloalkylenes.

In a preferred embodiment, $R^{15}$ is each independently at each occurrence a group containing a monocyclic, bicyclic, or tricyclic cycloalkylene group having 5 to 12 carbon atoms.

The above polycyclic cycloalkylene may be any of the fused, spiro, and crosslinked types.

In one embodiment, the above cycloalkylene is monocyclic.

In another embodiment, the above cycloalkylene is bicyclic.

In another embodiment, the above cycloalkylene is tricyclic.

In a preferred embodiment, $R^{16}$ is each independently at each occurrence a single bond or a $C_{1-6}$ alkylene group; and $R^{17}$ is each independently at each occurrence a single bond or a $C_{1-6}$ alkylene group.

$R^{16}$ and $R^{17}$ are directly bonded to the cycloalkylene of $R^{15}$.

In a preferred embodiment, $R^{15}$ is each independently at each occurrence a group containing a monocyclic, bicyclic, or tricyclic cycloalkylene group having 5 to 12 carbon atoms, $R^{16}$ is each independently at each occurrence a single bond or a $C_{1-6}$ alkylene group, and $R^{17}$ is each independently at each occurrence a single bond or a $C_{1-6}$ alkylene group.

In a preferred embodiment, $R^{15}$ is an optionally substituted cyclohexanediyl, and $R^{16}$ and $R^{17}$ are each independently a single bond or a $C_{1-6}$ alkylene group and bonded to the meta position or para position with respect to each other. In one embodiment, the optionally substituted cyclohexanediyl is unsubstituted. In another embodiment, the optionally substituted cyclohexanediyl is substituted with a $C_{1-6}$ alkyl group, preferably a methyl group or an ethyl group, and more preferably a methyl group. The number of such substituents may be preferably 1 to 5, and more preferably 1 to 3.

In a preferred embodiment, $R^{15}$ contains an optionally substituted alkylenebis(cyclohexyl), preferably methylenebis(cyclohexyl), and $R^{16}$ and $R^{17}$ are each independently a single bond or a $C_{1-6}$ alkylene group and bonded to the 4,4' positions with respect to each other. In one embodiment, the optionally substituted alkylenebis(cyclohexyl) is unsubstituted. In another embodiment, the optionally substituted alkylenebis(cyclohexyl) is substituted with a $C_{1-6}$ alkyl group, preferably a methyl group or an ethyl group, and more preferably a methyl group. The number of such substituents may be preferably 2 to 5, and more preferably 2 to 4.

In a preferred embodiment, $R^6$ is a group selected from the following groups in which a hydrogen atom in the ring is optionally substituted:

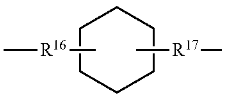

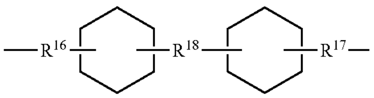

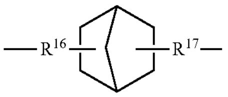
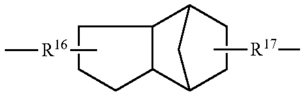

[in the formulae, $R^{16}$ is each independently at each occurrence a single bond or a $C_{1-6}$ alkylene group, $R^{17}$ is each independently at each occurrence a single bond or a $C_{1-6}$ alkylene group, and $R^{18}$ is each independently at each occurrence a $C_{1-6}$ alkylene group, and is preferably $CH_2CH_2$ or $CH_2$.].

In a still more preferred embodiment, $R^6$ is a group selected from the following groups in which a hydrogen atom in the ring is optionally substituted:

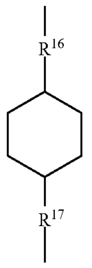
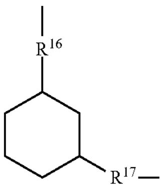

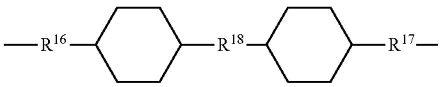

[in the formulae, $R^{16}$ is each independently at each occurrence a single bond or a $C_{1-6}$ alkylene group, $R^{17}$ is each independently at each occurrence a single bond or a $C_{1-6}$ alkylene group, and $R^{18}$ is each independently at each occurrence a $C_{1-6}$ alkylene group, preferably $CH_2CH_2$ or $CH_2$.].

Specific examples of $R^6$ include the following groups:

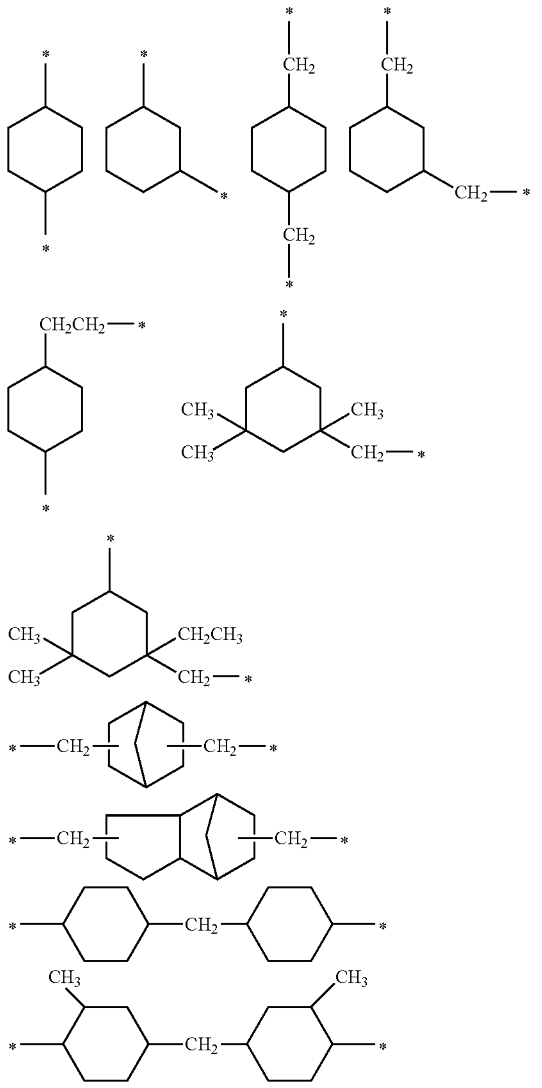

[in the formulae, * represents a bond.].

$R^5$ is a group that acts as a linker connecting the terminal silicon atom to the amide bond. $R^5$ each independently at each occurrence represents a (j+1)-valent organic group. Here, the value of j represents the number of groups containing silicon atoms present at the ends of the above fluoropolyether group-containing silane compound, and the value is in the range of 1 to 9. Thus, $R^5$ independently at each occurrence represents a di- to decavalent organic group. Accordingly, $R^5$ may be any group as long as it is a di- to decavalent organic group that allows the above fluoropolyether group-containing silane compound to stably exist. $R^5$ is preferably a di- to heptavalent, more preferably a di- to tetravalent, and still more preferably a divalent organic group. Accordingly, the value of j is preferably 1 to 6, more preferably 1 to 3, and still more preferably 1. Specific examples of $R^5$ can include those listed as moieties corresponding to $R^5$ in formulae (A) to (D), which will be described later.

It is preferable that $R^5$ do not have a heteroatom or aromatic structure on the molecular chain directly connecting the silicon atom and the amide bond, and it is more preferable that $R^5$ do not have an aromatic structure. $R^5$ is preferably an aliphatic hydrocarbon group that optionally has a heteroatom in some cases, more preferably an unsubstituted aliphatic hydrocarbon, more preferably a divalent alkylene group, more preferably a $C_{1-20}$ alkylene group, and still more preferably a $C_{1-6}$ alkylene group. Especially specifically, it is a methylene group, an ethylene group, a propylene group, a methylethylene group, a butylene group, a hexamethylene group, or the like. Two $R^5$ present in the above fluoropolyether group-containing silane compound may be the same as or different from each other, but it is preferable that they be the same since it makes preparation of the compound easier. In addition, while $R^5$ has (j+1) bonds, it does not matter which of the bonds is used to be bonded to the —C(=O)—$NR^7$-moiety.

In the above formula, $R^3$ is each independently at each occurrence a hydroxyl group or a hydrolyzable group.

Preferably, $R^3$ is each independently at each occurrence a hydrolyzable group.

$R^3$ is each independently at each occurrence preferably —$OR^h$, —$OCOR^h$, —O—N=$CR^h_2$, —$NR^h_2$, —$NHR^h$, or a halogen (in these formulae, $R^h$ represents a substituted or unsubstituted $C_{1-4}$ alkyl group), and more preferably —$OR^h$ (that is, an alkoxy group). Examples of $R^h$ include unsubstituted alkyl groups such as a methyl group, an ethyl group, a propyl group, an isopropyl group, a n-butyl group, and an isobutyl group; and substituted alkyl groups such as a chloromethyl group. Of them, an alkyl group, particularly an unsubstituted alkyl group, is preferable, and a methyl group or an ethyl group is more preferable. In one embodiment, $R^h$ is a methyl group, and in another embodiment, $R^h$ is an ethyl group.

In the above formula, $R^3$ is each independently at each occurrence a hydrogen atom or a monovalent organic group. Such a monovalent organic group is a monovalent organic group excluding the above hydrolyzable group.

In $R^3$, the monovalent organic group is preferably a $C_{1-20}$ alkyl group, more preferably a $C_{1-6}$ alkyl group, and still more preferably a methyl group.

In the above formula (I), p is an integer of 0 to 3 independently in each $(SiR^3_pR^4_{3-p})$, provided that, in at least one $SiR^3_pR^4_{3-p}$ in $(SiR^3_pR^4_{3-p})$, p is an integer of 0 to 2. That is, at the molecular end of formula (I), there is at least one Si to which a hydrolyzable group is bonded.

In one embodiment, all p is an integer of 0 to 2, preferably an integer of 0 to 1, and more preferably 0.

In the above formula (I), q is an integer of 0 to 3 independently in each $(SiR^3_qR^4_{3-q})$, provided that, in at least one $SiR^3_qR^4_{3-q}$ in $(SiR^3_qR^4_{3-q})_j$, q is an integer of 0 to 2. In other words, at the molecular end of formula (I), there is at least one Si to which a hydrolyzable group is bonded.

In one embodiment, all q is an integer of 0 to 2, preferably an integer of 0 to 1, and more preferably 0.

In a preferred embodiment, all p is an integer of 0 to 2, preferably an integer of 0 to 1, and more preferably 0, and all q is an integer of 0 to 2, preferably an integer of 0 to 1, and more preferably 0.

In a particularly preferred embodiment, the fluoropolyether group-containing silane compound is a compound in which all $R^7$ is a hydrogen atom, $R^5$ is a divalent alkylene group, j is 1, and p and q are 0. The fluoropolyether group-containing silane compound may be used as a single compound or as a mixture of two or more compounds.

Depending on the method for preparing fluoropolyether group-containing silane compound, compounds may be generated with a structure in which no silyl group or possibly no linker moiety is introduced into one or both ends of a PFPE-modified product or a compound in which PFPE-modified products are connected with $R^6$. Hereinafter, such compounds that contain no silyl group at at least one of both ends of the molecular chain composed of $PFPE^1$ are sometimes referred to as "non-terminated PFPE-modified products". It is preferable that the purity of the compound represented by formula (I) be high, that is, that the content ratio of such non-terminated PFPE-modified products be small. However, to the extent that the function as a curable composition is not impaired, the fluoropolyether group-containing silane compound used for preparing the curable composition may contain non-terminated PFPE-modified products. For example, in the case of the above formula (I), compounds with a structure in which a carboxylic acid group, an ester group, a hydroxyl group, or an alkylene-OH group is bonded to the structure represented by $\{-PFPE^1-C(=O)NR^7-R^6-NR^7C(=O)-\}_r-PFPE^1-$ may be contained.

In the case of preparing a surface-treating agent containing the fluoropolyether group-containing silane compound of the present disclosure, the purity of the fluoropolyether group-containing silane compound used can be measured according to the percentage of silane termination, which means the degree to which silyl groups are introduced into the ends of the compound. The percentage of termination can be determined by the proportion of $PFPE^1$ moieties into which silyl groups are introduced relative to the total amount of substance of those not sandwiched between $R^6$. The percentage of termination is preferably 90 mol % or more, more preferably 93 mol % or more, and still more preferably 95 mol % or more. In this range, compounds with both ends of the molecule silylated can be contained in a sufficient amount, and the function as a curable composition can be fully demonstrated. The percentage of termination can be determined by NMR measurement, for example. In the case of the compound of formula (I), the degree to which silyl groups are introduced into the molecular ends can be determined by measuring the $CF_2$ groups present at the ends of $PFPE^1$, that is, the $CF_2$ groups adjacent to the amide groups bonded to the linkers, using $^{19}$F-NMR. Even in compounds with a structure different from that of the compound of formula (I), the percentage of termination can be calculated by NMR measurement for moieties that are different between those with silylated ends and those without silylated ends, and the method for this is well known to those skilled in the art.

Hereinafter, a specific structure will be described in detail as one embodiment of the above fluoropolyether group-containing silane compound. The above fluoropolyether group-containing silane compound is preferably at least one compound represented by formula (A), (B), (C), or (D). Each group and superscript/subscript appearing in the following formulae can correspond to the groups and superscripts/subscripts appearing in the above general formula, respectively, and those skilled in the art can grasp the corresponding relationship between them.

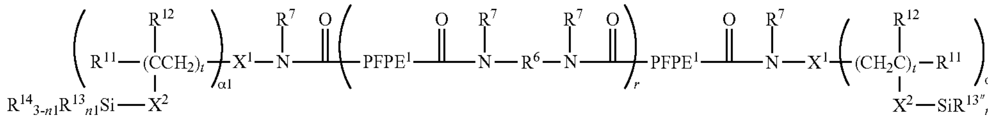

(A)

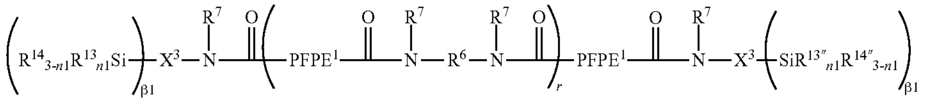

(B)

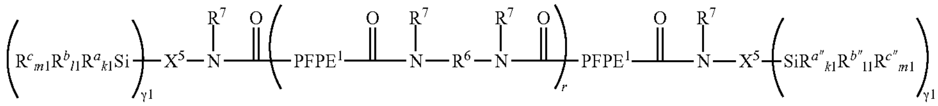

(C)

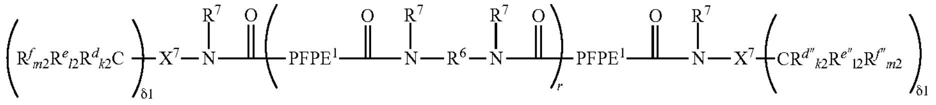

(D)

(in the formulae, $PFPE^1$, $R^6$, and $R^7$ are the same as defined above.)

Hereinafter, fluoropolyether group-containing silane compounds represented by the above formulae (A), (B), (C), and (D) will be described.

Formula (A)

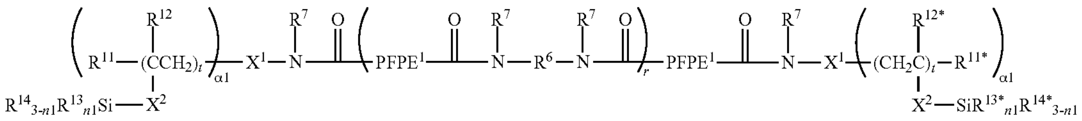

(A)

In the above formula, $PFPE^1$, $R^6$, and $R^7$ are the same as defined above.

In the above formula, r is an integer of 1 or more, and is preferably an integer of 1 to 5.

In the above formula, $R^{13}$ each independently at each occurrence represents a hydroxyl group or a hydrolyzable group. The hydrolyzable group is the same as defined above. That is, $R^{13}$ can correspond to $R^4$ in the above formula.

In the above formula, $R^{14}$ each independently at each occurrence represents a hydrogen atom or an alkyl group having 1 to 22 carbon atoms, and preferably an alkyl group having 1 to 4 carbon atoms. That is, $R^{14}$ can correspond to $R^3$ in the above general formula.

In the above formula, $R^{11}$ each independently at each occurrence represents a hydrogen atom or a halogen atom. The halogen atom is preferably an iodine atom, a chlorine atom, or a fluorine atom, and is more preferably a fluorine atom.

In the above formula, $R^{12}$ each independently at each occurrence represents a hydrogen atom or a lower alkyl group. The lower alkyl group is preferably an alkyl group having 1 to 20 carbon atoms, and is more preferably an alkyl group having 1 to 6 carbon atoms, and examples thereof include a methyl group, an ethyl group, and a propyl group.

In the above formula, $R^{11''}$, $R^{12''}$, $R^{13''}$, and $R^{14''}$ are the same as defined in $R^{11}$, $R^{12}$, $R^{13}$, and $R^{14}$, respectively.

In the above formula (A), the Si atom bonded to at least one group selected from the group consisting of a hydroxyl group and a hydrolyzable group represents the Si atom contained in $(—SiR^{13}{}_{n1}R^{14}{}_{3-n})$ or $(—SiR^{13''}{}_{n1}R^{14''}{}_{3-n1})$, wherein n1 is an integer of 1 to 3.

In the above formula, n1 is an integer of 0 to 3 independently in each $(—SiR^{13}{}_{n1}R^{14}{}_{3-n1})$ unit or in each $(—SiR^{13''}{}_{n1}R^{14''}{}_{3-n1})$ unit, and is preferably 1 to 3, more preferably 3. In the formula, at least two of n1 are an integer of 1 to 3, namely, there is not any case where all n1 is simultaneously 0. That is, in the formula, there are at least two Si atoms to which $R^{13}$ or $R^{13''}$ is bonded. In other words, in formula (A), there are at least two structures selected from the group consisting of a $—SiR^{13}{}_{n1}R^{14}{}_{3-n1}$ structure, wherein n1 is 1 or more (that is, $—SiR^{13}$ moiety) and a $—SiR^{13''}{}_{n1}R^{14''}{}_{3-n1}$ structure, wherein n1 is 1 or more (that is, $—SiR^{13''}$ moiety). That is, n1 can correspond to the value of 3-p or 3-q in the above general formula.

Preferably, in formula (A), the Si atom bonded to at least one group selected from the group consisting of a hydroxyl group and a hydrolyzable group is present at both ends of the molecular backbone. That is, in formula (A), there is at least one $—SiR^{13}{}_{n1}R^{14}{}_{3-n1}$ structure, wherein n1 is 1 or more (that is, $—SiR^{13}$ moiety) and at least one $—SiR^{13''}{}_{n1}R^{14''}{}_{3-n1}$ structure, wherein n1 is 1 or more (that is, $—SiR^{13''}$ moiety).

In the above formula, $X^1$ each independently represents a single bond or di- to decavalent organic group connected to the amide bond. $X^1$ in the compound represented by formula (A) is interpreted as part of a linker that connects the perfluoro(poly)ether moiety (that is, $-PFPE^1-$ moiety), which mainly provides, for example, water-repellency and surface lubricity, and the silane moiety, which provides binding ability to a substrate. Accordingly, $X^1$ may be a single bond or any organic group as long as the compound represented by formula (A) can stably exist. That is, $X^1$ is understood to correspond to part of $R^5$ in the above general formula, together with $X^2$ and the hydrocarbon group connected thereto as will be described below. Herein, the left side of the group described as $X^1$ is bonded to the amide bond adjacent to the group represented by $PFPE^1$, and the right side thereof is bonded to the group enclosed in parentheses. However, the group described as $X^1$ encompasses a group that is bonded in the opposite direction as long as it can be prepared as a stable compound, and for example, $—CO—C_6H_4—$ encompasses the group described as $—C_6H_4—CO—$, where the phenylene group is bonded to the amide bond adjacent to the group represented by $PFPE^1$.

In another embodiment, $X^1$ may be $X^e$. $X^e$ represents a single bond or a di- to decavalent organic group, and preferably represents a single bond or a di-to decavalent organic group having at least one selected from the group consisting of $—C_6H_4$-(that is, -phenylene-. Hereinafter, representing a phenylene group), —O— (ether group), —CO— (carbonyl group), $—NR^{40}—$, and $—SO_2—$. $R^{40}$ each independently represents a hydrogen atom, a phenyl group, or a $C_{1-6}$ alkyl group (preferably a methyl group), and is preferably a hydrogen atom or a methyl group. It is preferable that $—C_6H_4—$, —CO—, $—NR^{40}—$, or $—SO_2—$ be contained in the molecular backbone of the perfluoropolyether group-containing silane compound (A).

$X^e$ more preferably represents a single bond or a di- to decavalent organic group having at least one selected from the group consisting of $—C_6H_4—$, $—CONR^{40}—$, $—CONR^{40}—C_6H_4—$, —CO—, $—CO—C_6H_4—$, $—O—CO—NR^{40}—$, $—SO_2NR^{40}—$, $—SO_2NR^{40}—C_6H_4—$, $—SO_2—$, and $—SO_2—C_6H_4—$. It is preferable that $—C_6H_4—$, $—CONR^{40}—$, $—CONR^{40}—C_6H_4—$, —CO—, $—CO—C_6H_4—$, $—SO_2NR^{40}—$, $—SO_2NR^{40}—C_6H_4—$, $—SO_2—$, or $—SO_2—C_6H_4—$ be contained in the molecular backbone of the fluoropolyether group-containing silane compound (A).

In the above formula, α1 is an integer of 1 to 9, and may vary depending on the valence of $X^1$. In formula (A), the value of α1 is obtained by subtracting 1 from the valence of $X^1$. When $X^1$ is a single bond or a divalent organic group, α1 is 1. That is, α1 can correspond to the value of j in the above general formula.

$X^1$ is preferably a di- to heptavalent, more preferably a di- to tetravalent, and still more preferably a divalent organic group.

In one embodiment, $X^1$ is a di- to tetravalent organic group, and α1 is 1 to 3.

In another embodiment, $X^1$ is a divalent organic group, and α1 is 1. In this case, formula (A) is represented by the following formula (A').

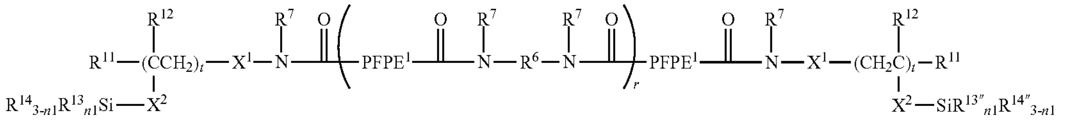

$X^1$ is not limited as long as it can form a bond with the amide group connected to the $PFPE^1$ group and can stably prepare the compound, but examples thereof include a divalent group represented by the following formula:

$$(R^{31})_{p'}—(X^a)_{q'}—$$

[in the formula:

$R^{31}$ represents a single bond, $-(CH_2)_{s'}-$, or an o-, m- or p-phenylene group, and is preferably $-(CH_2)_{s'}-$;

s' is an integer of 1 to 20, preferably an integer of 1 to 6, more preferably an integer of 1 to 3, and still more preferably 1 or 2;

Xa represents $-(X^b)_{l'}-$;

Xb each independently at each occurrence represents a group selected from the group consisting of —O—, —S—, an o-, m- or p-phenylene group, —C(O)O—, $-Si(R^{33})_2-$, $-(Si(R^{33})_2O)_{m'}-Si(R^{33})_2-$, $-CONR^{34}-$, $-O-CONR^{34}-$, $-NR^{34}-$, and $-(CH_2)_{n'}-$;

$R^{33}$ each independently at each occurrence represents a phenyl group, a $C_{1-6}$ alkyl group, or a $C_{1-6}$ alkoxy group, is preferably a phenyl group or a $C_{1-6}$ alkyl group, and is more preferably a methyl group;

$R^{34}$ each independently at each occurrence represents a hydrogen atom, a phenyl group, or a $C_{1-6}$ alkyl group (preferably a methyl group), and is preferably a hydrogen atom;

m' is each independently at each occurrence an integer of 1 to 100, and is preferably an integer of 1 to 20;

n' is each independently at each occurrence an integer of 1 to 20, preferably an integer of 1 to 6, and more preferably an integer of 1 to 3;

l' is an integer of 1 to 10, preferably an integer of 1 to 5, and more preferably an integer of 1 to 3; and p' is 0 or 1 and q' is 0 or 1, provided that at least one of p' and q' is 1, and the occurrence order of the respective repeating units enclosed in parentheses provided with p' or q' is not limited.]

Here, $R^{31}$ and $X^a$ (typically, hydrogen atoms of $R^{31}$ and $X^a$) are optionally substituted with one or more substituents selected from a fluorine atom, a $C_{1-3}$ alkyl group, and a $C_{1-3}$ fluoroalkyl group. However, when $R^{31}$ is a single bond or p' is 0, $X^a$ is not $-CONR^{34}-$ or $-NR^{34}-$.

In one embodiment, l' in the above formula is 1.

Preferably, $X^1$ is $-(R^{31})_{p'}-(X^a)_{q'}-R^{32}-$. $R^{32}$ represents a single bond, $-(CH_2)_{t'}-$, or an o-, m- or a p-phenylene group, and is preferably $-(CH_2)_{t'}-$. t' is an integer of 1 to 20, preferably an integer of 2 to 6, and more preferably an integer of 2 to 3. Here, $R^{32}$ (typically, a hydrogen atom in $R^{32}$) is optionally substituted with one or more substituents selected from a fluorine atom, a $C_{1-3}$ alkyl group, and a $C_{1-3}$ fluoroalkyl group.

Preferably, $X^1$ may be any of the following:

a single bond;

a $C_{1-20}$ alkylene group;

$R^{31}-X^c-R^{32}-$; and $-X^d-R^{32}-$

[in the formulae, $R^{31}$ and $R^{32}$ are the same as defined above.]. Note that the alkylene group is a group having a $-(C_\delta H_{2\delta})-$ structure, is optionally substituted or unsubstituted, and is optionally linear or branched.

More preferably, $X^1$ is any of the following:

a single bond;

a $C_{1-20}$ alkylene group;

$-(CH_2)_{s'}-X^c-$;

$-(CH_2)_{s'}-X^c-(CH_2)_{t'}-$;

$-X^d-$; and $-X^d-(CH_2)_{t'}-$

[in the formulae, s' and t' are the same as defined above.].

Still more preferably, $X^1$ is any of the following:

$-X^f-$;

$-X^f-C_{1-20}$ alkylene group;

$-X^f-(CH_2)_{s'}-X^c-$;

$-X^f-(CH_2)_{s'}-X^c-(CH_2)_{t'}-$;

$-X^f-X^d-$; and $-X^f-X^d-(CH_2)_{t'}-$.

In the formula, s' and t' are the same as defined above. In the above formula, $X^f$ is an alkylene group having 1 to 6 carbon atoms, preferably 1 to 4 carbon atoms, and more preferably 1 to 2 carbon atoms, such as a methylene group. A hydrogen atom(s) in $X^f$ is optionally substituted by, and is preferably substituted by, one or more substituents selected from a fluorine atom, a $C_{1-3}$ alkyl group, and a $C_{1-3}$ fluoroalkyl group. $X^f$ is optionally linear or branched, and is preferably linear.

In the above formula, $X^c$ represents any of the following:

—O—;

S—;

—C(O)O—;

$-CONR^{34}-$;

$-O-CONR^{34}-$;

$Si(R^{33})_2-$;

$(Si(R^{33})_2O)_{m'}-Si(R^{33})_2-$;

$-O-(CH_2)_{u'}-(Si(R^{33})_2O)_{m'}-Si(R^{33})_2-$;

$-O-(CH_2)_{u'}-Si(R^{33})_2-O-Si(R^{33})_2-CH_2CH_2-Si;(R^{33})_2-O-Si(R^{33})_2-$;

$-O-(CH_2)_{u'}-Si(OCH_3)_2OSi(OCH_3)_2-$;

$-(CH_2)_{u'}-(Si(R^{33})_2O)_{m'}-Si(R^{33})_2-$;

$-(CH_2)_{u'}-N(R^{34})-$;

-(o-, m-, or p-phenylene)-$Si(R^{33})_2-$;

$-CONR^{34}-(CH_2)_{u'}-(Si(R^{33})_2O)_{m'}-Si(R^{33})_2-$;

$-CONR^{34}-(CH_2)_{u'}-N(R^{34})-$; and $-CONR^{34}$-(o-, m-, or p-phenylene)-$Si(R^{33})_2-$

[in the formulae, $R^{33}$, $R^{34}$ and m' are the same as defined above, and u' is an integer of 1 to 20, preferably an integer of 2 to 6, and more preferably an integer of 2 to 3.]. However, when $R^{31}$ is a single bond, $X^c$ is not a group having $-CONR^{34}-$ at an end. Preferably, it is —O—.

In the above formula, $X^d$ represents any of the following:

—S—;

—C(O)O—;

$-(CH_2)_{u'}-(Si(R^{33})_2O)_{m'}-Si(R^{33})_2-$;

$-(CH_2)_{u'}-N(R^{34})-$;

-(o-, m-, or p-phenylene)-$Si(R^{33})_2-$;

$-CONR^{34}-$;

$-CONR^{34}-(CH_2)_{u'}-(Si(R^{33})_2O)_{m'}-Si(R^{33})_2-$;

$-CONR^{34}-(CH_2)_{u'}-N(R^{34})-$; and $-CONR^{34}$-(o-, m-, or p-phenylene)-$Si(R^{33})_2-$

[in the formulae, each symbol is the same as defined above.].

Particularly preferably, $X^1$ is a group represented by any of the following:

$-X^f-$;

$-X^f-C_{1-20}$ alkylene group;

$-X^f-(CH_2)_{s'}-X^c-$;

$-X^f-(CH_2)_{s'}-X^c-(CH_2)_{t'}-$;

$-X^f-X^d-$; and $-X^f-X^d-(CH_2)_{t'}-$

[in the formulae, $X^f$, s' and t' are the same as defined above.], wherein $X^c$ is —O— or $-CONR^{34}-$;

$X^d$ is $-CONR^{34}-$; and $R^{34}$ each independently at each occurrence represents a hydrogen atom, a phenyl group, or a $C_{1-6}$ alkyl group (preferably a methyl group).

In one embodiment, $X^1$ is a group represented by any of the following:

—$X^f$—$(CH_2)_{s'}$—$X^c$—;
—$X^f$—$(CH_2)_{s'}$—$X^c$—$(CH_2)_{t'}$—;
—$X^f$—$X^d$—; and
—$X^f$—$X^d$—$(CH_2)_{t'}$—

[in the formulae, $X^f$, s' and t' are the same as defined above.], wherein $X^c$ is —$CONR^{34}$—;
$X^d$ is —$CONR^{34}$—; and
$R^{34}$ each independently at each occurrence represents a hydrogen atom, a phenyl group, or a $C_{1-6}$ alkyl group (preferably a methyl group).

In one embodiment, $X^1$ may be any of the following:
a single bond;
a $C_{1-20}$ alkylene group;
—$(CH_2)_{s'}$—$X^c$—$(CH_2)_{t'}$—; and
—$X^d$—$(CH_2)_{t'}$—

[in the formulae, each symbol is the same as defined above.]. However, at this time, $X^d$ is not —$CONR^{34}$—.

Preferably, $X^1$ is any of the following:
a single bond;
a $C_{1-20}$ alkylene group;
—$(CH_2)_{s'}$—O—$(CH_2)_{t'}$—;
—$(CH_2)_{s'}$—$(Si(R^{33})_2O)_{m'}$—$Si(R^{33})_2$—$(CH_2)_{t'}$—;
—$(CH_2)_{s'}$—O—$(CH_2)_{u'}$—$(Si(R^{33})_2O)_{m'}$—$Si(R^{33})_2$—$(CH_2)_{t'}$—; and
—$(CH_2)_{s'}$—O—$(CH_2)_{t'}$—$Si(R^{33})_2$—$(CH_2)_{u'}$—$Si(R^{33})_2$—$(C_vH_{2v})$—

[in the formulae, $R^{33}$, m', s', t', and u' are the same as defined above, and v is an integer of 1 to 20, preferably an integer of 2 to 6, and more preferably an integer of 2 or 3.1.

In the above formula, —$(C_vH_{2v})$— is optionally linear or branched, and may be, for example, —$CH_2$—, —$CH_2CH_2$—, —$CH_2CH_2CH_2$—, —$CH(CH_3)$—, or —$CH(CH_3)CH_2$—.

The above $X^1$ group is optionally substituted with one or more substituents selected from a fluorine atom, a $C_{1-3}$ alkyl group, and a $C_{1-3}$ fluoroalkyl group (preferably, a $C_{1-3}$ perfluoroalkyl group).

In one embodiment, the $X^1$ group may be other than —O—$C_{1-6}$ alkylene group.

In another embodiment, examples of the $X^1$ group include the following groups:

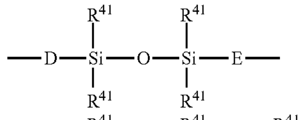

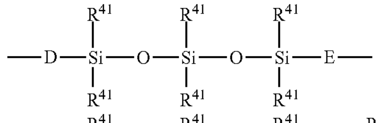

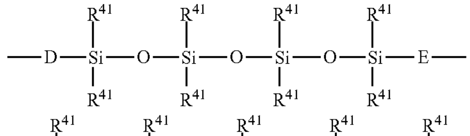

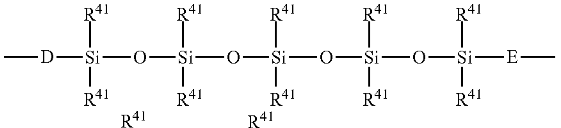

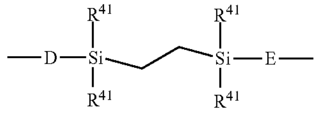

-continued

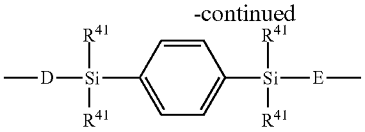

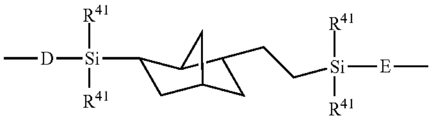

[in the formulae, $R^{41}$ is each independently a hydrogen atom, a phenyl group, an alkyl group having 1 to 6 carbon atoms, or a $C_{1-6}$ alkoxy group, preferably a methyl group;

D is a group selected from
—$CH_2O(CH_2)_2$—,
—$CH_2O(CH_2)_3$—,
—$CF_2O(CH_2)_3$—,
—$(CH_2)_2$—,
$(CH_2)_3$—,
—$(CH_2)_4$—, and
(1,3-phenylene)-$Si(R^{42})_2$—$(CH_2)_2$—

(in the formula, $R^{42}$ each independently represents a hydrogen atom, a $C_{1-6}$ alkyl group, or a $C_{1-6}$ alkoxy group, preferably a methyl group or a methoxy group, and more preferably a methyl group);

E is —$(CH_2)_{ne}$— (ne is an integer of 2 to 6); and
D is bonded to the side where the $PFPE^1$ group of the molecular backbone is located, and E is bonded to the group opposite to the side where $PFPE^1$ is located.].

Specific examples of $X^1$ include:
a single bond;
—$CH_2OCH_2$—;
—$CH_2O(CH_2)_2$—;
—$CH_2O(CH_2)_3$—;
—$CH_2O(CH_2)_6$—;
—$CF_2$—$CH_2$—O—$CH_2$—;
—$CF_2$—$CH_2$—O—$(CH_2)_2$—;
—$CF_2$—$CH_2$—O—$(CH_2)_3$—;
—$CF_2$—$CH_2$—O—$(CH_2)_6$—;
—$CH_2O(CH_2)_3Si(CH_3)_2OSi(CH_3)_2(CH_2)_2$—;
—$CH_2O(CH_2)_3Si(CH_3)_2OSi(CH_3)_2OSi(CH_3)_2(CH_2)_2$—;
—$CH_2O(CH_2)_3Si(CH_3)_2O(Si(CH_3)_2O)_2Si(CH_3)_2(CH_2)_2$—;
—$CH_2O(CH_2)_3Si(CH_3)_2O(Si(CH_3)_2O)_3Si(CH_3)_2(CH_2)_2$—;
—$CH_2O(CH_2)_3Si(CH_3)_2O(Si(CH_3)_2O)_{10}Si(CH_3)_2(CH_2)_2$—;
—$CH_2O(CH_2)_3Si(CH_3)_2O(Si(CH_3)_2O)_2OSi(CH_3)_2(CH_2)_2$—;
—$CH_2OCF_2CHFOCF_2$—;
—$CH_2OCF_2CHFOCF_2CF_2$—;
—$CH_2OCF_2CHFOCF_2CF_2CF_2$—;
—$CH_2OCH_2CF_2CF_2OCF_2$—;
—$CH_2OCH_2CF_2CF_2OCF_2CF_2$—;
—$CH_2OCH_2CF_2CF_2OCF_2CF_2CF_2$—;
—$CH_2OCH_2CF_2CF_2OCF(CF_3)CF_2OCF_2$—;
—$CH_2OCH_2CF_2CF_2OCF(CF_3)CF_2OCF_2CF_2$—;
—$CH_2OCH_2CF_2CF_2OCF(CF_3)CF_2OCF_2CF_2CF_2$—;
—$CH_2OCH_2CHFCF_2OCF_2$—;
—$CH_2OCH_2CHFCF_2OCF_2CF_2$—;
—$CH_2OCH_2CHFCF_2OCF_2CF_2CF_2$—;
—$CH_2OCH_2CHFCF_2OCF(CF_3)CF_2OCF_2$—;
—$CH_2OCH_2CHFCF_2OCF(CF_3)CF_2OCF_2CF_2$—;
—$CH_2OCH_2CHFCF_2OCF(CF_3)CF_2OCF_2CF_2CF_2$—;

—$CH_2OCF_2CHFOCF_2CF_2CF_2$—C(O)NH—$CH_2$—;
$CH_2OCH_2(CH_2)_7CH_2Si(OCH_3)_2OSi(OCH_3)_2(CH_2)_2Si(OCH_3)_2OSi(OCH_3)_2(CH_2)_2$—;
—$CH_2OCH_2CH_2CH_2Si(OCH_3)_2OSi(OCH_3)_2(CH_2)_3$—;
—$CH_2OCH_2CH_2CH_2Si(OCH_2CH_3)_2OSi(OCH_2CH_3)_2(CH_2)_3$—;
—$CH_2OCH_2CH_2CH_2Si(OCH_3)_2OSi(OCH_3)_2(CH_2)_2$—;
—$CH_2OCH_2CH_2CH_2Si(OCH_2CH_3)_2OSi(OCH_2CH_3)_2(CH_2)_2$—;
—$(CH_2)_2$—$Si(CH_3)_2$—$(CH_2)_2$—;
—$CH_2$—;
—$(CH_2)_2$—;
—$(CH_2)_3$—;
—$(CH_2)_4$—;
—$(CH_2)_5$—;
—$(CH_2)_6$—;
—$CF_2$—;
—$(CF_2)_2$—;
—$CF_2$—$CH_2$—;
—$CF_2$—$(CH_2)_2$—;
—$CF_2$—$(CH_2)_3$—;
—$CF_2$—$(CH_2)_4$—;
—$CF_2$—$(CH_2)_5$—;
—$CF_2$—$(CH_2)_6$—;
—CO—;
—$CF_2CONH$—;
—$CF_2CONHCH_2$—;
—$CF_2CONH(CH_2)_2$—;
—$CF_2CONH(CH_2)_3$—;
—$CF_2CONH(CH_2)_6$—;
—$CF_2$—$CON(CH_3)$—$(CH_2)_3$—;
—$CF_2$—CON(Ph)-$(CH_2)_3$— (in the formula, Ph means phenyl);
—$CF_2$—$CON(CH_3)$—$(CH_2)_6$—;
—$CF_2$—CON(Ph)-$(CH_2)_6$— (in the formula, Ph means phenyl);
—$(CH_2)_2NH(CH_2)_3$—;
—$(CH_2)_6NH(CH_2)_3$—;
—$CH_2O$—CONH—$(CH_2)_3$—;
—$CH_2O$—CONH—$(CH_2)_6$—;
—S—$(CH_2)_3$—;
—$(CH_2)_2S(CH_2)_3$—;
—$(CH_2)_3Si(CH_3)_2OSi(CH_3)_2(CH_2)_2$—;
—$(CH_2)_3Si(CH_3)_2OSi(CH_3)_2OSi(CH_3)_2(CH_2)_2$—;
—$(CH_2)_3Si(CH_3)_2O(Si(CH_3)_2O)_2Si(CH_3)_2(CH_2)_2$—;
—$(CH_2)_3Si(CH_3)_2O(Si(CH_3)_2O)_3Si(CH_3)_2(CH_2)_2$—;
—$(CH_2)_3Si(CH_3)_2O(Si(CH_3)_2O)_{10}Si(CH_3)_2(CH_2)_2$—;
—$(CH_2)_3Si(CH_3)_2O(Si(CH_3)_2O)_{20}Si(CH_3)_2(CH_2)_2$—;
—C(O)O—$(CH_2)_3$—;
—C(O)O—$(CH_2)_6$—;
—$CH_2$—O—$(CH_2)_3$—$Si(CH_3)_2$—$(CH_2)_2$—$Si(CH_3)_2$—$(CH_2)_2$—;
—$CH_2$—O—$(CH_2)_3$—$Si(CH_3)_2$—$(CH_2)_2$—$Si(CH_3)_2$—$CH(CH_3)$—;
—$CH_2$—O—$(CH_2)_3$—$Si(CH_3)_2$—$(CH_2)_2$—$Si(CH_3)_2$—$(CH_2)_3$—;
—$CH_2$—O—$(CH_2)_3$—$Si(CH_3)_2$—$(CH_2)_2$—$Si(CH_3)_2$—$CH(CH_3)$—$CH_2$—;
—$OCH_2$—;
—$O(CH_2)_3$—;
—$OCFHCF_2$—;
1,3-phenylene; and
-(1,3-phenylene)-$Si(CH_3)_2$—$(CH_2)_2$—.

In the above, $X^1$ is preferably any of the following: a single bond;
—$CH_2OCH_2$—;
—$CH_2O(CH_2)_2$—;
—$CH_2O(CH_2)_3$—;
—$CH_2O(CH_2)_6$—;
—$CF_2$—$CH_2$—O—$CH_2$—;
—$CF_2$—$CH_2$—O—$(CH_2)_2$—;
—$CF_2$—$CH_2$—O—$(CH_2)_3$—;
—$CF_2$—$CH_2$—O—$(CH_2)_6$—;
—$CH_2OCF_2CHFOCF_2$—;
—$CH_2OCF_2CHFOCF_2CF_2$—;
—$CH_2OCF_2CHFOCF_2CF_2CF_2$—;
—$CH_2OCH_2CF_2CF_2OCF_2$—;
—$CH_2OCH_2CF_2CF_2OCF_2CF_2$—;
—$CH_2OCH_2CF_2CF_2OCF_2CF_2CF_2$—;
—$CH_2OCH_2CF_2CF_2OCF(CF_3)CF_2OCF_2$—;
—$CH_2OCH_2CF_2CF_2OCF(CF_3)CF_2OCF_2CF_2$—;
—$CH_2OCH_2CF_2CF_2OCF(CF_3)CF_2OCF_2CF_2CF_2$—;
—$CH_2OCH_2CHFCF_2OCF_2$—;
—$CH_2OCH_2CHFCF_2OCF_2CF_2$—;
—$CH_2OCH_2CHFCF_2OCF_2CF_2CF_2$—;
—$CH_2OCH_2CHFCF_2OCF(CF_3)CF_2OCF_2$—;
—$CH_2OCH_2CHFCF_2OCF(CF_3)CF_2OCF_2CF_2$—;
—$CH_2OCH_2CHFCF_2OCF(CF_3)CF_2OCF_2CF_2CF_2$—;
—$CH_2OCF_2CHFOCF_2CF_2CF_2$—C(O)NH—$CH_2$—;
—$CH_2$—;
—$(CH_2)_2$—;
—$(CH_2)_3$—;
—$(CH_2)_4$—;
—$(CH_2)_5$—;
—$(CH_2)_6$—;
—$CF_2$—;
—$(CF_2)_2$—;
—$CF_2$—$CH_2$—;
—$CF_2$—$(CH_2)_2$—;
—$CF_2$—$(CH_2)_3$—;
—$CF_2$—$(CH_2)_4$—;
—$CF_2$—$(CH_2)_5$—;
—$CF_2$—$(CH_2)_6$—;
—$CF_2CONH$—;
—$CF_2CONHCH_2$—;
—$CF_2CONH(CH_2)_2$—;
—$CF_2CONH(CH_2)_3$—;
—$CF_2CONH(CH_2)_6$—;
—$CF_2$—$CON(CH_3)$—$(CH_2)_3$—;
—$CF_2$—CON(Ph)-$(CH_2)_3$— (in the formula, Ph means phenyl);
—$CF_2$—$CON(CH_3)$—$(CH_2)_6$—;
—$CF_2$—CON(Ph)-$(CH_2)_6$— (in the formula, Ph means phenyl);
—$(CH_2)_2NH(CH_2)_3$—;
—$(CH_2)_6NH(CH_2)_3$—;
—$CH_2O$—CONH—$(CH_2)_3$—;
—$CH_2O$—CONH—$(CH_2)_6$—;
—$OCH_2$—;
—$O(CH_2)_3$—; and
—$OCFHCF_2$—.

In the above, $X^1$ is more preferably any of the following: a single bond;
—$CH_2OCF_2CHFOCF_2CF_2CF_2$—C(O)NH—$CH_2$—;
—$CH_2$—;
—$(CH_2)_2$—;
—$(CH_2)_3$—;
—$(CH_2)_6$—;
—$CF_2CONH$—;
—$CF_2CONHCH_2$—;
—$CF_2CONH(CH_2)_2$—;
—$CF_2CONH(CH_2)_3$—;
—$CF_2CONH(CH_2)_6$—;
—$CF_2$—$CON(CH_3)$—$(CH_2)_3$—;

—$CF_2$—CON(Ph)-$(CH_2)_3$— (in the formula, Ph means phenyl);

—$CF_2$—CON($CH_3$)—$(CH_2)_6$—;

—$CF_2$—CON(Ph)-$(CH_2)_6$— (in the formula, Ph means phenyl);

—$(CH_2)_2NH(CH_2)_3$—; and

—$(CH_2)_6NH(CH_2)_3$—.

In one embodiment, $X^1$ represents $X^{e'}$. $X^{e'}$ is a single bond, an alkylene group having 1 to 6 carbon atoms, —$R^{51}$—$C_6H_4$—$R^{52}$—, —$R^{51}$—$CONR^{40}$—$R^{52}$—, —$R^{51}$—$CONR^{40}$—$C_6H_4$—$R^{52}$—, —$R^{51}$—CO—$R^{52}$—, —$R^{51}$—CO—$C_6H_4$—$R^{52}$—, —$R^{51}$—$SO_2NR^{40}$—$R^{52}$—, —$R^{51}$—$SO_2NR^{40}$—$C_6H_4$—$R^{52}$—, —$R^{51}$—$SO_2$—$R^{52}$—, or —$R^{51}$—$SO_2$—$C_6H_4$—$R^{52}$—. $R^{51}$ and $R^{52}$ each independently represent a single bond or an alkylene group having 1 to 6 carbon atoms, provided that $R^{51}$ is not a single bond when $R^{51}$ is connected to —$CONR^{40}$—, and are each preferably a single bond or an alkylene group having 1 to 3 carbon atoms. $R^{40}$ is the same as defined above. The above alkylene group is substituted or unsubstituted, and is preferably unsubstituted. Examples of the substituent of the above alkylene group can include a halogen atom, preferably a fluorine atom. The above alkylene group is linear or branched, and is preferably linear.

In a preferred embodiment, $X^{e'}$ may be any of the following:

a single bond;

—$X^f$—;

an alkylene group having 1 to 6 carbon atoms, preferably having 1 to 3 carbon atoms;

—$X^f$—$C_{1-6}$ alkylene group, preferably —$X^f$—$C_{1-3}$ alkylene group, more preferably —$X^f$—$C_{1-2}$ alkylene group;

—$C_6H_4$—$R^{52}$—;

—$R^{52'}$—;

—$C_6H_4$—$R^{52'}$—;

—$X^f$—$CONR^{4'}$—$R^{52'}$—;

—$X^f$—$CONR^{4'}$—$C_6H_4$—$R^{52'}$—;

—CO—$R^{52'}$—;

—CO—$C_6H_4$—$R^{52'}$—;

—$SO_2NR^{4'}$—$R^{52'}$—;

—$SO_2NR^{4'}$—$C_6H_4$—$R^{52'}$—;

—$SO_2$—$R^{52'}$—;

—$SO_2$—$C_6H_4$—$R^{52'}$—;

—$R^{51'}$—$C_6H_4$—;

—$R^{51'}$—$CONR^{4'}$—;

—$R^{51'}$—$CONR^{4'}$—$C_6H_4$—;

—$R^{51'}$—CO—;

—$R^{51'}$—CO—$C_6H_4$—;

—$R^{51'}$—$SO_2NR^{4'}$—;

—$R^{51'}$—$SO_2NR^{4'}$—$C_6H_4$—;

—$R^{51'}$—$SO_2$—;

—$R^{51'}$—$SO_2$—$C_6H_4$—;

—$C_6H_4$—;

—$X^f$—$CONR^{4'}$—;

—$X^f$—$CONR^{4'}$—$C_6H_4$—;

—CO—;

—CO—$C_6H_4$—;

—$SO_2NR^{4'}$—;

—$SO_2NR^{4'}$—$C_6H_4$—;

—$SO_2$—; and

—$SO_2$—$C_6H_4$—

(in the formulae, $R^{51'}$ and $R^{52'}$ are each independently a linear alkylene group having 1 to 6 carbon atoms, preferably having 1 to 3 carbon atoms. As described above, the above alkylene group is substituted or unsubstituted, and examples of the substituent of the above alkylene group can include a halogen atom, preferably a fluorine atom. $R^{4'}$ is a hydrogen atom or a methyl group).

In the above, $X^{e'}$ may be preferably any of the following:

—$X^f$—;

an alkylene group having 1 to 6 carbon atoms, preferably having 1 to 3 carbon atoms;

—$X^f$—$C_{1-6}$ alkylene group, preferably —$X^f$—$C_{1-3}$ alkylene group, more preferably —$X^f$—$C_{1-2}$ alkylene group;

—$R^{52'}$—;

—$C_6H_4$—$R^{52}$—;

—$X^f$—$CONR^{4'}$—$R^{52'}$—;

—$X^f$—$CONR^{4'}$—$C_6H_4$—$R^{52'}$—;

—$R^{51'}$—$CONR^{4'}$—;

—$R^{51'}$—$CONR^{4'}$—$C_6H_4$—;

—$X^f$—$CONR^{4'}$—;

—$X^f$—$CONR^{4'}$—$C_6H_4$—;

—$R^{51'}$—$CONR^{4'}$—; and

—$R^{51'}$—$CONR^{4'}$—$C_6H_4$—.

In the formulae, $X^f$, $R^{51'}$, and $R^{52'}$ are each the same as defined above.

In the above, $X^{e'}$ may be more preferably any of the following:

a single bond;

—$R^{52'}$—;

—$C_6H_4$—$R^{52'}$—;

—$X^f$—$CONR^{4'}$—$R^{52'}$—;

—$X^f$—$CONR^{4'}$—$C_6H_4$—$R^{52'}$—

—$R^{51'}$—$CONR^{4'}$—;

—$R^{51'}$—$CONR^{4'}$—$C_6H_4$—;

—$C_6H_4$—;

—$X^f$—$CONR^{4'}$—; and

—$X^f$—$CONR^{4'}$—$C_6H_4$—.

In the present embodiment, specific examples of $X^{e'}$ include:

a single bond;

an alkylene group having 1 to 6 carbon atoms;

a perfluoroalkylene group having 1 to 6 carbon atoms (such as —$CF_2$— and —$(CF_2)_2$—);

—$CF_2$—$C_{1-6}$ alkylene group;

—$CH_2$—;

—$(CH_2)_2$—;

—$(CH_2)_3$—;

—$CF_2$—CONH—;

—$CF_2CONHCH_2$—;

—$CF_2CONH(CH_2)_2$—;

—$CF_2CONH(CH_2)_3$—;

—$CF_2$—CON($CH_3$)—;

—$CF_2$—CON($CH_3$) $CH_2$—;

—$CF_2$—CON($CH_3$)—$(CH_2)_2$—;

—$CF_2$—CON($CH_3$)—$(CH_2)_3$—;

—$CH_2$—CONH—;

—$CH_2$—CONH—$CH_2$—;

—$CH_2$—CONH—$(CH_2)_2$—;

—$CH_2$—CONH—$(CH_2)_3$—;

—$CF_2$—$CH_2$—CONH—;

—$CF_2$—$CH_2$—CONH—$CH_2$—;

—$CF_2$—$CH_2$—CONH—$(CH_2)_2$—;

—$CF_2$—$CH_2$—CONH—$(CH_2)_3$—;

—$C_6H_4$—;

—$CH_2$—CON($CH_3$)—$CH_2$—;

—$CH_2$—CON($CH_3$)—$(CH_2)_2$—;

—$CH_2$—CON($CH_3$)—$(CH_2)_3$—;

—$CF_2$—CONH—$C_6H_4$—;

—$CF_2$—CON($CH_3$)—$C_6H_4$—;

—$CF_2$—$CH_2$—CON($CH_3$)—$CH_2$—;

$-CF_2-CH_2-CON(CH_3)-(CH_2)_2-$;
$-CF_2-CH_2-CON(CH_3)-(CH_2)_3-$;
$-CF_2-CON(CH_3)-C_6H_4-$;
$-CO-$;
$-CO-C_6H_4-$;
$-C_6H_4-$;
$-SO_2NH-$;
$-SO_2NH-CH_2-$;
$-SO_2NH-(CH_2)_2-$;
$-SO_2NH-(CH_2)_3-$;
$-SO_2NH-C_6H_4-$;
$-SO_2N(CH_3)-$;
$-SO_2N(CH_3)-CH_2-$;
$-SO_2N(CH_3)-(CH_2)_2-$;
$-SO_2N(CH_3)-(CH_2)_3-$;
$-SO_2N(CH_3)-C_6H_4-$;
$-SO_2-$;
$-SO_2-CH_2-$;
$-SO_2-(CH_2)_2-$;
$-SO_2-(CH_2)_3-$; and
$-SO_2-C_6H_4-$.

Among those listed above, examples of the preferred $X^{e'}$ include:

a single bond;
an alkylene group having 1 to 6 carbon atoms;
a perfluoroalkylene group having 1 to 6 carbon atoms (such as $-CF_2-$ and $-(CF_2)_2-$);
$-CF_2-C_{1-6}$ alkylene group;
$-CH_2-$;
$-(CH_2)_2-$;
$-(CH_2)_3-$;
$-CF_2CONH-$;
$-CF_2CONHCH_2-$;
$-CF_2CONH(CH_2)_2-$;
$-CF_2CONH(CH_2)_3-$;
$-CF_2-CON(CH_3)-$;
$-CF_2-CON(CH_3)\ CH_2-$;
$-CF_2-CON(CH_3)-(CH_2)_2-$;
$-CF_2-CON(CH_3)-(CH_2)_3-$;
$-CH_2-CONH-$;
$-CH_2-CONH-CH_2-$;
$-CH_2-CONH-(CH_2)_2-$;
$-CH_2-CONH-(CH_2)_3-$;
$-CF_2-CH_2-CONH-$;
$-CF_2-CH_2-CONH-CH_2-$;
$-CF_2-CH_2-CONH-(CH_2)_2-$;
$-CF_2-CH_2-CONH-(CH_2)_3-$;
$-C_6H_4-$;
$-CH_2-CON(CH_3)-CH_2-$;
$-CH_2-CON(CH_3)-(CH_2)_2-$;
$-CH_2-CON(CH_3)-(CH_2)_3-$;
$-CF_2-CONH-C_6H_4-$;
$-CF_2-CON(CH_3)-C_6H_4-$;
$-CF_2-CH_2-CON(CH_3)-CH_2-$;
$-CF_2-CH_2-CON(CH_3)-(CH_2)_2-$;
$-CF_2-CH_2-CON(CH_3)-(CH_2)_3-$; and
$-CF_2-CON(CH_3)-C_6H_4-$.

Among those listed above, examples of the more preferred $X^{e'}$ include:

a single bond;
$-CH_2-$;
$-(CH_2)_2-$;
$-(CH_2)_3-$;
$-CF_2CONH-$;
$-CF_2CONHCH_2-$;
$-CF_2CONH(CH_2)_2-$;
$-CF_2CONH(CH_2)_3-$;

$-CF_2-CON(CH_3)-$;
$-CF_2-CON(CH_3)\ CH_2-$;
$-CF_2-CON(CH_3)-(CH_2)_2-$;
$-CF_2-CON(CH_3)-(CH_2)_3-$;
$-CH_2-CONH-$;
$-CH_2-CONH-CH_2-$;
$-CH_2-CONH-(CH_2)_2-$;
$-CH_2-CONH-(CH_2)_3-$;
$-CF_2-CH_2-CONH-$;
$-CF_2-CH_2-CONH-CH_2-$;
$-CF_2-CH_2-CONH-(CH_2)_2-$;
$-CF_2-CH_2-CONH-(CH_2)_3-$;
$-C_6H_4-$;
$-CH_2-CON(CH_3)-CH_2-$;
$-CH_2-CON(CH_3)-(CH_2)_2-$;
$-CH_2-CON(CH_3)-(CH_2)_3-$;
$-CF_2-CONH-C_6H_4-$;
$-CF_2-CON(CH_3)-C_6H_4-$;
$-CF_2-CH_2-CON(CH_3)-CH_2-$;
$-CF_2-CH_2-CON(CH_3)-(CH_2)_2-$;
$-CF_2-CH_2-CON(CH_3)-(CH_2)_3-$; and
$-CF_2-CON(CH_3)-C_6H_4-$.

In one embodiment, $X^{e'}$ is a single bond.

In still another embodiment, $X^1$ is a group represented by formula: $-(R^{16})_x-(CFR^{17})_y-(CH_2)_z-$. In the formula, x, y, and z are each independently an integer of 0 to 10, the sum of x, y, and z is 1 or more, and the occurrence order of the respective repeating units enclosed in parentheses is not limited in the formula.

In the above formula, $R^{16}$ is each independently at each occurrence an oxygen atom, phenylene, carbazolylene, $-NR^{18}-$ (in the formula, $R^{18}$ represents a hydrogen atom or an organic group), or a divalent organic group. Preferably, $R^{16}$ is an oxygen atom or a divalent polar group.

The above "divalent polar group" is not limited, and examples thereof include $-C(O)-$ and $-C(=NR^{19})-$ (in the formula, $R^{19}$ represents a hydrogen atom or a lower alkyl group). The "lower alkyl group" is, for example, an alkyl group having 1 to 6 carbon atoms, such as a methyl group, an ethyl group, or a n-propyl group, and such a group is optionally substituted with one or more fluorine atoms.

In the above formula, $R^{17}$ is each independently at each occurrence a hydrogen atom, a fluorine atom, or a lower fluoroalkyl group, and is preferably a fluorine atom. The "lower fluoroalkyl group" is, for example, a fluoroalkyl group having 1 to 6 carbon atoms and preferably 1 to 3 carbon atoms, preferably a perfluoroalkyl group having 1 to 3 carbon atoms, more preferably a trifluoromethyl group or a pentafluoroethyl group, and still more preferably a trifluoromethyl group.

In this embodiment, $X^1$ is preferably a group represented by formula: $-(O)_x-(CF_2)_y-(CH_2)_z-$ (in the formula, x, y, and z are the same as defined above, and the occurrence order of the respective repeating units enclosed in parentheses is not limited in the formula).

Examples of the group represented by the above formula: $-(O)_x-(CF_2)_y-(CH_2)_z-$ include groups represented by:

$$-(O)_{x'}-(CH_2)_{z''}-O-[(CH_2)_{z'''}-O-]_{z''''} \text{ and } -(O)_{x'}-(CF_2)_{y''}-(CH_2)_{z''}-O-[(CH_2)_{z'''}-O-]_{z''''}$$

(in the formulae, x' is 0 or 1, y", z", and z''' are each independently an integer of 1 to 10, and z'''' is 0 or 1). Note that the left end of these groups is bonded to the PFPE side.

In another preferred embodiment, $X^1$ is $-O-CFR^{20}-(CF_2)_{e'}-$.

$R^{20}$ each independently represents a fluorine atom or a lower fluoroalkyl group. Here, the lower fluoroalkyl group is, for example, a fluoroalkyl group having 1 to 3 carbon atoms, preferably a perfluoroalkyl group having 1 to 3 carbon atoms, more preferably a trifluoromethyl group or a pentafluoroethyl group, and still more preferably a trifluoromethyl group.

e' is each independently 0 or 1.

In one specific example, $R^{20}$ is a fluorine atom and e' is 1.

In still another embodiment, examples of the $X^1$ group include the following groups:

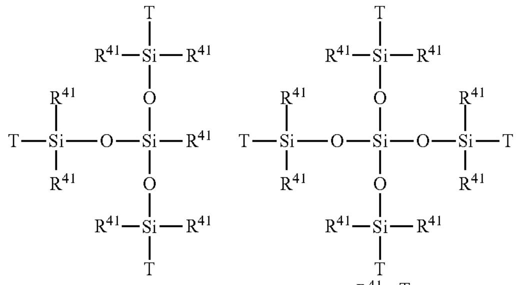

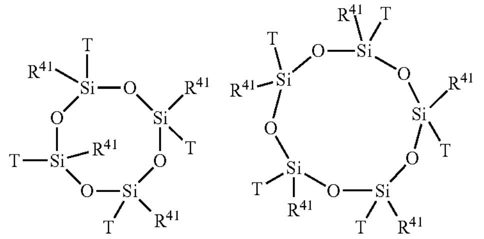

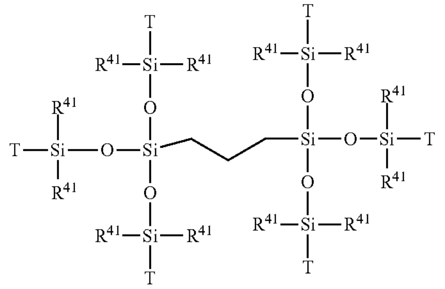

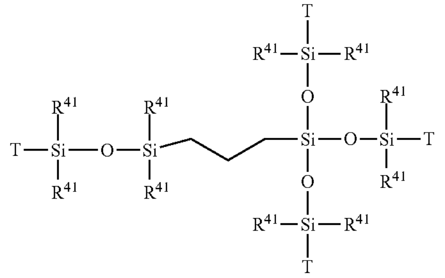

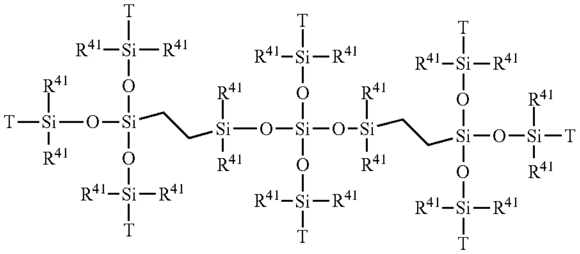

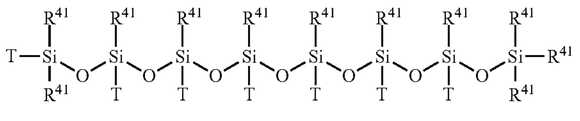

[in the formulae, $R^{41}$ is each independently a hydrogen atom, a phenyl group, an alkyl group having 1 to 6 carbon atoms, or a $C_{1-6}$ alkoxy group, preferably a methyl group;

in each $X^1$ group, one of the groups represented by T is any of the following groups to be bonded to the amide bond connected to $PFPE^1$ of the molecular backbone:

$—CH_2O(CH_2)_2—$;

$—CH_2O(CH_2)_3—$;

$—CF_2O(CH_2)_3—$;

$—CH_2—$;

$—(CH_2)_2—$;

$—(CH_2)_3—$;

$—(CH_2)_4—$; or $—$(1,3-phenylene)-$Si(R^{42})_2—(CH_2)_2—$

[in the formula, $R^{42}$ each independently represents a hydrogen atom, a $C_{1-6}$ alkyl group, or a $C_{1-6}$ alkoxy group, preferably a methyl group or a methoxy group, and more preferably a methyl group]; and some other groups represented by T are $—(CH_2)_{n''}—$ (n" is an integer of 2 to 6) bonded to the group opposite to PFPE of the molecular backbone, and the remaining groups represented by T, if present, may be each independently a methyl group, a phenyl group, a $C_{1-6}$ alkoxy group, or a radical scavenging group or an UV absorbing group. Note that, in the above embodiment as well, the left side of the group described as $X^1$ is bonded to the amide bond connected to the group represented by $PFPE^1$, and the right side thereof is bonded to the side opposite to the group represented by $PFPE^1$.

The radical scavenging group is not limited as long as it can scavenge a radical generated by light irradiation, and examples thereof include residues of benzophenones, benzotriazoles, benzoates, phenyl salicylates, crotonic acids, malonates, organoacrylates, hindered amines, hindered phenols, and triazines.

The UV absorbing group is not limited as long as it can absorb ultraviolet rays, and examples thereof include residues of benzotriazoles, hydroxybenzophenones, esters of substituted and unsubstituted benzoic acid or salicylic acid compounds, acrylates or alkoxy cinnamates, oxamides, oxanilides, benzoxazinones, and benzoxazoles.

In a preferred embodiment, examples of the preferred radical scavenging group or UV absorbing group include:

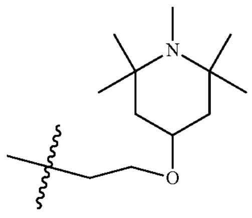

,

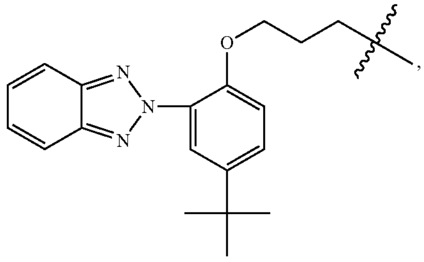

, or

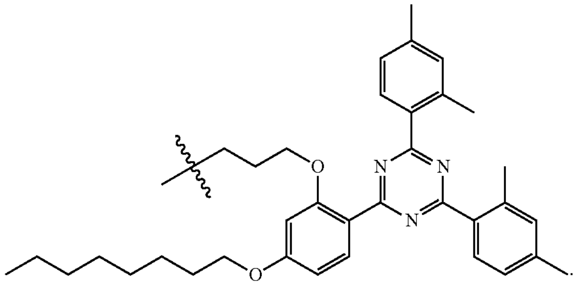

In the above formula (A), $X^2$ each independently at each occurrence represents a single bond or a divalent organic group. $X^2$ is preferably an alkylene group having 1 to 20 carbon atoms, and more preferably $—(CH_2)_u—$ (in the formula, u is an integer of 0 to 2).

In the above formula, t is each independently an integer of 1 to 10. In a preferred embodiment, t is an integer of 1 to 6. In another preferred embodiment, t is an integer of 2 to 10, and is preferably an integer of 2 to 6.

The preferred compound represented by formula (A) is a compound represented by the following formula (A'):

(A')

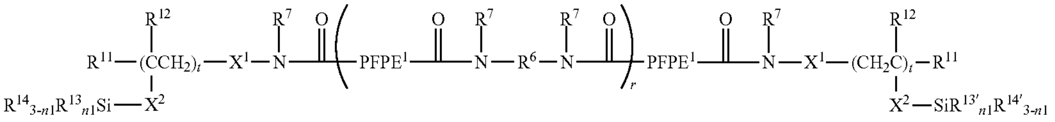

[in the formula:

$PFPE^1$, $R^6$, and $R^7$ are each independently as defined above;

$R^{13}$ each independently at each occurrence represents a hydroxyl group or a hydrolyzable group;

$R^{14}$ each independently at each occurrence represents a hydrogen atom or an alkyl group having 1 to 22 carbon atoms;

$R^{11}$ each independently at each occurrence represents a hydrogen atom or a halogen atom;

$R^{12}$ each independently at each occurrence represents a hydrogen atom or a lower alkyl group;

$R^{11''}$, $R^{12''}$, $R^{13''}$, and $R^{14''}$ are the same as defined in $R^{11}$, $R^{12}$, $R^{13}$, and $R^{14}$, respectively;

$n^1$ is an integer of 1 to 3, preferably 3;

$X^1$ is each independently at each occurrence $—O—CFR^{20}—$; $(CF_2)_{e'}—$;

$R^{20}$ is each independently at each occurrence a fluorine atom or a lower fluoroalkyl group;

e' is each independently at each occurrence 0 or 1;

$X^2$ is $—(CH_2)_u—$;

u is each independently at each occurrence an integer of 0 to 2;

t is each independently at each occurrence an integer of 2 to 10; and r is an integer of 1 or more.].

The compound represented by the above formula (A) can be obtained by, for example, introducing iodine into an end of a perfluoro(poly)ether derivative corresponding to the $-PFPE^1$-moiety, as a raw material, and allowing it to react with a vinyl monomer corresponding to $—CH_2CR^{12}(X^2—SiR^{13}_{n1}R^{14}_{3-n1})—$.

Formula (B)

(B)

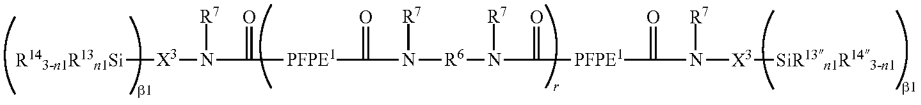

In the above formula (B), $PFPE^1$, $R^6$, $R^7$, r, $R^{13}$, $R^{13''}$, $R^{14}$, $R^{14''}$, and n1 are the same as described with respect to the above formula (A).

In the above formula (B), the Si atom bonded to at least one group selected from the group consisting of a hydroxyl group and a hydrolyzable group represents the Si atom contained in $(SiR^{13}{}_{n1}R^{14}{}_{3-n1})$ or $(—SiR^{13''}{}_{n1}R^{14''}{}_{3-n1})$, wherein n1 is an integer of 1 to 3.

In the above formula, n1 is an integer of 0 to 3 independently in each $(—SiR^{13}{}_{n1}R^{14}{}_{3-n1})$ unit or in each $(—SiR^{13''}{}_{n1}R^{14''}{}_{3-n1})$ unit, and is preferably 1 to 3, more preferably 3. In the formula, at least two of n1 are an integer of 1 to 3, namely, there is not any case where all n1 is simultaneously 0. That is, in the formula, there are at least two of $R^{13}$ or $R^{13''}$. That is, in formula (B), there are at least two structures selected from the group consisting of a $—SiR^{13}{}_{n1}R^{14}{}_{3-n1}$ structure, wherein n1 is 1 or more (that is, $—SiR^{13}$ moiety) and a $—SiR^{13''}{}_{n1}R^{14''}{}_{3-n1}$ structure, wherein n1 is 1 or more (that is, $—SiR^{13''}$ moiety).

More preferably, in formula (B), at least one Si bonded to a hydroxyl group or a hydrolyzable group is present at each of both ends of the molecular backbone of the fluoropolyether group-containing silane compound. That is, at least one $—SiR^{13}$ moiety is present and at least one $—SiR^{13''}$ moiety is present.

In the above formula, $X^3$ each independently represents a di- to decavalent organic group. That is, $X^3$ corresponds to $R^5$ in the above general formula. $X^3$ in the compound represented by formula (B) is interpreted as a linker that connects the perfluoro(poly)ether moiety (that is, $-PFPE^1-$ moiety), which mainly provides, for example, water-repellency and surface lubricity, and the silane moiety (specifically, $—SiR^{13}{}_{n1}R^{14}{}_{3-n1}$ or $—SiR^{13''}{}_{n1}R^{14''}{}_{3-n1}$), which provides binding ability to a substrate. Accordingly, $X^3$ may be any organic group as long as the compound represented by formula (B) can stably exist. Herein, the left side of the structure described as $X^3$ is bonded to the amide bond connected to the group represented by $PFPE^1$, and the right side thereof is bonded to the group enclosed in parentheses provided with β1.

In another embodiment, $X^3$ represents $X^e$. $X^e$ is the same as defined above.

β1 in the above formula is an integer of 1 to 9, and may vary depending on the valence of $X^3$. In formula (B), the value of β1 is obtained by subtracting 1 from the valence of $X^3$. When $X^3$ is a single bond, β1 is 1.

$X^3$ is preferably a di-to heptavalent, more preferably a di- to tetravalent, and still more preferably a divalent organic group.

In one embodiment, $X^3$ is a di- to tetravalent organic group, and β1 is 1 to 3.

In another embodiment, $X^3$ is a divalent organic group, and β1 is 1. In this case, formula (B) is represented by the following formula (B').

$X^3$ is not limited as long as it can form a bond with the amide group connected to the $PFPE^1$ group and can stably prepare the compound, but examples thereof include those that are the same as those described with respect to $X^1$, but other than a single bond.

In particular, preferred specific examples of $X^3$ include:

$—CH_2OCH_2—$;
$—CH_2O(CH_2)_2—$;
$—CH_2O(CH_2)_3—$;
$—CH_2O(CH_2)_6—$;
$—CF_2—CH_2—O—CH_2—$;
$—CF_2—CH_2—O—(CH_2)_2—$;
$—CF_2—CH_2—O—(CH_2)_3—$;
$—CF_2—CH_2—O—(CH_2)_6—$;
$—CH_2O(CH_2)_3Si(CH_3)_2OSi(CH_3)_2(CH_2)_2—$;
$—CH_2O(CH_2)_3Si(CH_3)_2OSi(CH_3)_2OSi(CH_3)_2(CH_2)_2—$;
$—CH_2O(CH_2)_3Si(CH_3)_2O(Si(CH_3)_2O)_2Si(CH_3)_2(CH_2)_2—$;
$—CH_2O(CH_2)_3Si(CH_3)_2O(Si(CH_3)_2O)_3Si(CH_3)_2(CH_2)_2—$;
$—CH_2O(CH_2)_3Si(CH_3)_2O(Si(CH_3)_2O)_{10}Si(CH_3)_2(CH_2)_2—$;
$—CH_2O(CH_2)_3Si(CH_3)_2O(Si(CH_3)_2O)_2OSi(CH_3)_2(CH_2)_2—$;
$—CH_2OCF_2CHFOCF_2—$;
$—CH_2OCF_2CHFOCF_2CF_2—$;
$—CH_2OCF_2CHFOCF_2CF_2CF_2—$;
$—CH_2OCH_2CF_2CF_2OCF_2—$;
$—CH_2OCH_2CF_2CF_2OCF_2CF_2—$;
$—CH_2OCH_2CF_2CF_2OCF_2CF_2CF_2—$;
$—CH_2OCH_2CF_2CF_2OCF(CF_3)CF_2OCF_2—$;
$—CH_2OCH_2CF_2CF_2OCF(CF_3)CF_2OCF_2CF_2—$;
$—CH_2OCH_2CF_2CF_2OCF(CF_3)CF_2OCF_2CF_2CF_2—$;
$—CH_2OCH_2CHFCF_2OCF_2—$;
$—CH_2OCH_2CHFCF_2OCF_2CF_2—$;
$—CH_2OCH_2CHFCF_2OCF_2CF_2CF_2—$;
$—CH_2OCH_2CHFCF_2OCF(CF_3)CF_2OCF_2—$;
$—CH_2OCH_2CHFCF_2OCF(CF_3)CF_2OCF_2CF_2—$;
$—CH_2OCH_2CHFCF_2OCF(CF_3)CF_2OCF_2CF_2CF_2—$;
$—CH_2OCF_2CHFOCF_2CF_2CF_2—C(O)NH—CH_2—$;
$—CH_2OCH_2(CH_2)_7CH_2Si(OCH_3)_2OSi(OCH_3)_2(CH_2)_2Si(OCH_3)_2OSi(OCH_3)_2(CH_2)_2—$;
$—CH_2OCH_2CH_2CH_2Si(OCH_3)_2OSi(OCH_3)_2(CH_2)_3—$;
$—CH_2OCH_2CH_2CH_2Si(OCH_2CH_3)_2OSi(OCH_2CH_3)_2(CH_2)_3—$;
$—CH_2OCH_2CH_2CH_2Si(OCH_3)_2OSi(OCH_3)_2(CH_2)_2—$;
$—CH_2OCH_2CH_2CH_2Si(OCH_2CH_3)_2OSi(OCH_2CH_3)_2(CH_2)_2—$;
$—(CH_2)_2—Si(CH_3)_2—(CH_2)_2—$;
$—CH_2—$;
$—(CH_2)_2—$;
$—(CH_2)_3—$;
$—(CH_2)_4—$;
$—(CH_2)_5—$;
$—(CH_2)_6—$;
$—CF_2—$;
$—(CF_2)_2—$;
$—CF_2—CH_2—$;

(B')

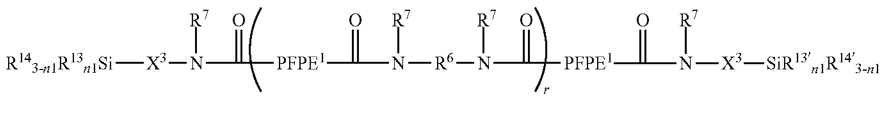

—$CF_2$—$(CH_2)_2$—;
—$CF_2$—$(CH_2)_3$—;
—$CF_2$—$(CH_2)_4$—;
—$CF_2$—$(CH_2)_5$—;
—$CF_2$—$(CH_2)_6$—;
—CO—;
—$CF_2CONH$—;
—$CF_2CONHCH_2$—;
—$CF_2CONH(CH_2)_2$—;
—$CF_2CONH(CH_2)_3$—;
—$CF_2CONH(CH_2)_6$—;
—$CF_2$—$CON(CH_3)$—$(CH_2)_3$—;
—$CF_2$—CON(Ph)-$(CH_2)_3$— (in the formula, Ph means phenyl);
—$CF_2$—$CON(CH_3)$—$(CH_2)_6$—;
—$CF_2$—CON(Ph)-$(CH_2)_6$— (in the formula, Ph means phenyl);
—$(CH_2)_2NH(CH_2)_3$—;
—$(CH_2)_6NH(CH_2)_3$—;
—$CH_2O$—CONH—$(CH_2)_3$—;
—$CH_2O$—CONH—$(CH_2)_6$—;
—S—$(CH_2)_3$—;
—$(CH_2)_2S(CH_2)_3$—;
—$(CH_2)_3Si(CH_3)_2OSi(CH_3)_2(CH_2)_2$—;
—$(CH_2)_3Si(CH_3)_2OSi(CH_3)_2OSi(CH_3)_2(CH_2)_2$—;
—$(CH_2)_3Si(CH_3)_2O(Si(CH_3)_2O)_2Si(CH_3)_2(CH_2)_2$—;
—$(CH_2)_3Si(CH_3)_2O(Si(CH_3)_2O)_3Si(CH_3)_2(CH_2)_2$—;
—$(CH_2)_3Si(CH_3)_2O(Si(CH_3)_2O)_{10}Si(CH_3)_2(CH_2)_2$—;
—$(CH_2)_3Si(CH_3)_2O(Si(CH_3)_2O)_{20}Si(CH_3)_2(CH_2)_2$—;
—C(O)O—$(CH_2)_3$—;
—C(O)O—$(CH_2)_6$—;
—$CH_2$—O—$(CH_2)_3$—$Si(CH_3)_2$—$(CH_2)_2$—$Si(CH_3)_2$—$(CH_2)_2$—;
—$CH_2$—O—$(CH_2)_3$—$Si(CH_3)_2$—$(CH_2)_2$—$Si(CH_3)_2$—$CH(CH_3)$—;
—$CH_2$—O—$(CH_2)_3$—$Si(CH_3)_2$—$(CH_2)_2$—$Si(CH_3)_2$—$(CH_2)_3$—;
—$CH_2$—O—$(CH_2)_3$—$Si(CH_3)_2$—$(CH_2)_2$—$Si(CH_3)_2$—$CH(CH_3)$—$CH_2$—;
—$OCH_2$—;
—$O(CH_2)_3$—;
—$OCFHCF_2$—;
1,3-phenylene; and
(1,3-phenylene)-$Si(CH_3)_2$—$(CH_2)_2$—.

In the above, $X^3$ is preferably any of the following:
—$CH_2OCH_2$—;
—$CH_2O(CH_2)_2$—;
—$CH_2O(CH_2)_3$—;
—$CH_2O(CH_2)_6$—;
—$CF_2$—$CH_2$—O—$CH_2$—;
—$CF_2$—$CH_2$—O—$(CH_2)_2$—;
—$CF_2$—$CH_2$—O—$(CH_2)_3$—;
—$CF_2$—$CH_2$—O—$(CH_2)_6$—;
—$CH_2OCF_2CHFOCF_2$—;
—$CH_2OCF_2CHFOCF_2CF_2$—;
—$CH_2OCF_2CHFOCF_2CF_2CF_2$—;
—$CH_2OCH_2CF_2CF_2OCF_2$—;
—$CH_2OCH_2CF_2CF_2OCF_2CF_2$—;
—$CH_2OCH_2CF_2CF_2OCF_2CF_2CF_2$—;
—$CH_2OCH_2CF_2CF_2OCF(CF_3)CF_2OCF_2$—;
—$CH_2OCH_2CF_2CF_2OCF(CF_3)CF_2OCF_2CF_2$—;
—$CH_2OCH_2CF_2CF_2OCF(CF_3)CF_2OCF_2CF_2CF_2$—;
—$CH_2OCH_2CHFCF_2OCF_2$—;
—$CH_2OCH_2CHFCF_2OCF_2CF_2$—;
—$CH_2OCH_2CHFCF_2OCF_2CF_2CF_2$—;
—$CH_2OCH_2CHFCF_2OCF(CF_3)CF_2OCF_2$—;
—$CH_2OCH_2CHFCF_2OCF(CF_3)CF_2OCF_2CF_2$—;
—$CH_2OCH_2CHFCF_2OCF(CF_3)CF_2OCF_2CF_2CF_2$—;
—$CH_2OCF_2CHFOCF_2CF_2CF_2$—C(O)NH—$CH_2$—;
—$CF_2$—$CH_2OCF_2CHFOCF_2CF_2CF_2$—C(O)NH—$CH_2$—;
—$CH_2$—;
—$(CH_2)_2$—;
—$(CH_2)_3$—;
—$(CH_2)_4$—;
—$(CH_2)_5$—;
—$(CH_2)_6$—;
—$CF_2$—;
—$(CF_2)_2$—;
—$CF_2$—$CH_2$—;
—$CF_2$—$(CH_2)_2$—;
—$CF_2$—$(CH_2)_3$—;
—$CF_2$—$(CH_2)_4$—;
—$CF_2$—$(CH_2)_5$—;
—$CF_2$—$(CH_2)_6$—;
—$CF_2CONH$—;
—$CF_2CONHCH_2$—;
—$CF_2CONH(CH_2)_2$—;
—$CF_2CONH(CH_2)_3$—;
—$CF_2CONH(CH_2)_6$—;
—$CF_2$—$CON(CH_3)$—$(CH_2)_3$—;
—$CF_2$—CON(Ph)-$(CH_2)_3$— (in the formula, Ph means phenyl);
—$CF_2$—$CON(CH_3)$—$(CH_2)_6$—;
—$CF_2$—CON(Ph)-$(CH_2)_6$— (in the formula, Ph means phenyl);
—$(CH_2)_2NH(CH_2)_3$—;
—$(CH_2)_6NH(CH_2)_3$—;
—$CH_2O$—CONH—$(CH_2)_3$—;
—$CH_2O$—CONH—$(CH_2)_6$—;
—$OCH_2$—;
—$O(CH_2)_3$—; and
—$OCFHCF_2$—.

In the above, $X^3$ is more preferably any of the following:
—$CH_2OCF_2CHFOCF_2CF_2CF_2$—C(O)NH—$CH_2$—;
—$CF_2$—$CH_2OCF_2CHFOCF_2CF_2CF_2$—C(O)NH—$CH_2$—;
—$CH_2$—;
—$(CH_2)_2$—;
—$(CH_2)_3$—;
—$(CH_2)_6$—;
—$CF_2CONH$—;
—$CF_2CONHCH_2$—;
—$CF_2CONH(CH_2)_2$—;
—$CF_2CONH(CH_2)_3$—;
—$CF_2CONH(CH_2)_6$—;
—$CF_2$—$CON(CH_3)$—$(CH_2)_3$—;
—$CF_2$—CON(Ph)-$(CH_2)_3$— (in the formula, Ph means phenyl);
—$CF_2$—$CON(CH_3)$—$(CH_2)_6$—;
—$CF_2$—CON(Ph)-$(CH_2)_6$— (in the formula, Ph means phenyl);
—$(CH_2)_2NH(CH_2)_3$—; and
—$(CH_2)_6NH(CH_2)_3$—.

In another preferred embodiment, $X^3$ represents $X^{e'}$. $X^{e'}$ is the same as defined above except that a single bond is excluded.

In one embodiment, in formula (B), there are at least two Si bonded to a hydroxyl group or a hydrolyzable group. That is, in formula (B), there are at least two —$SiR^{13}$ moieties.

The preferred compound represented by formula (B) is a compound represented by the following formula (B'):

(B')

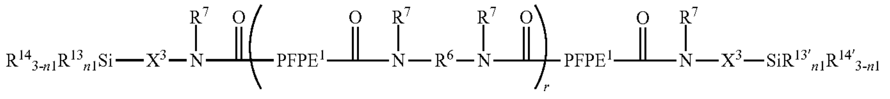

[in the formula:

$PFPE^1$, $R^6$, $R^7$, and r are as defined above;

$R^{13}$ each independently at each occurrence represents a hydroxyl group or a hydrolyzable group;

$R^{14}$ each independently at each occurrence represents a hydrogen atom or an alkyl group having 1 to 22 carbon atoms;

$R^{13''}$ and $R^{14''}$ are the same as defined in $R^{13}$ and $R^{14}$, respectively;

n1 is an integer of 1 to 3, and is preferably 3; and $X^3$ is an alkylene group having 1 to 20 carbon atoms, $—CH_2O(CH_2)_2—$, $—CH_2O(CH_2)_3—$, or $—CH_2O(CH_2)_6—$.].

The compound represented by the above formula (B) can be produced by a known method, such as a method described in JP 2013-117012 A or an improved method thereof.

$X^5$ is not limited as long as it can form a bond with the amide group connected to the $PFPE^1$ group and can stably prepare the compound, but examples thereof include those that are the same as those described with respect to $X^1$, but other than a single bond.

In particular, preferred specific examples of $X^5$ include:

$—CH_2OCH_2—$;

$—CH_2O(CH_2)_2—$;

$—CH_2O(CH_2)_3—$;

$—CH_2O(CH_2)_6—$;

$—CF_2—CH_2—O—CH_2—$;

$—CF_2—CH_2—O—(CH_2)_2—$;

$—CF_2—CH_2—O—(CH_2)_3—$;

$—CF_2—CH_2—O—(CH_2)_6—$;

$—CH_2O(CH_2)_3Si(CH_3)_2OSi(CH_3)_2(CH_2)_2—$;

$—CH_2O(CH_2)_3Si(CH_3)_2OSi(CH_3)_2OSi(CH_3)_2(CH_2)_2—$;

Formula (C)

(C)

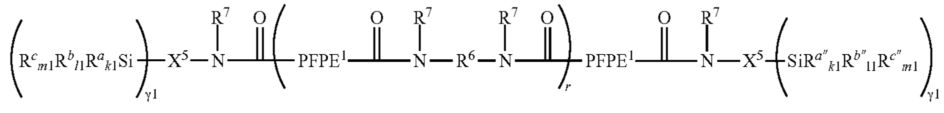

In the above formula (C), $PFPE^1$, $R^6$, $R^7$, and r are the same as described with respect to the above formula (A).

In the above formula, $X^5$ each independently represents a di- to decavalent organic group. That is, $X^5$ corresponds to $R^5$ in the above general formula. $X^5$ in the compound represented by formula (C) is interpreted as a linker that connects the perfluoro(poly)ether moiety (that is, $-PFPE^1-$ moiety), which mainly provides, for example, water-repellency and surface lubricity, and the silane moiety (specifically, $—SiR^a_{k1}R^b_{l1}R^c_{m1}$ group or $—SiR^{a''}_{k1}R^{b''}_{l1}R^{c''}_{m1}$ group), which provides binding ability to a substrate. Accordingly, $X^5$ may be any organic group as long as the compound represented by formula (C) can stably exist. Herein, the left side of the structure described as $X^5$ is bonded to the group represented by $PFPE^1$, and the right side thereof is bonded to the group enclosed in parentheses provided with γ1.

In another embodiment, $X^5$ represents $X^e$. $X^e$ is the same as defined above.

In another embodiment, the compound (C) is represented by the following formula (C').

$—CH_2O(CH_2)_3Si(CH_3)_2O(Si(CH_3)_2O)_2Si(CH_3)_2(CH_2)_2—$;

$—CH_2O(CH_2)_3Si(CH_3)_2O(Si(CH_3)_2O)_3Si(CH_3)_2(CH_2)_2—$;

$—CH_2O(CH_2)_3Si(CH_3)_2O(Si(CH_3)_2O)_{10}Si(CH_3)_2(CH_2)_2—$;

$—CH_2O(CH_2)_3Si(CH_3)_2O(Si(CH_3)_2O)_2OSi(CH_3)_2(CH_2)_2—$;

$—CH_2OCF_2CHFOCF_2—$;

$—CH_2OCF_2CHFOCF_2CF_2—$;

$—CH_2OCF_2CHFOCF_2CF_2CF_2—$;

$—CH_2OCH_2CF_2CF_2OCF_2—$;

$—CH_2OCH_2CF_2CF_2OCF_2CF_2—$;

$—CH_2OCH_2CF_2CF_2OCF_2CF_2CF_2—$;

$—CH_2OCH_2CF_2CF_2OCF(CF_3)CF_2OCF_2—$;

$—CH_2OCH_2CF_2CF_2OCF(CF_3)CF_2OCF_2CF_2—$;

$—CH_2OCH_2CF_2CF_2OCF(CF_3)CF_2OCF_2CF_2CF_2—$;

$—CH_2OCH_2CHFCF_2OCF_2—$;

$—CH_2OCH_2CHFCF_2OCF_2CF_2—$;

$—CH_2OCH_2CHFCF_2OCF_2CF_2CF_2—$;

$—CH_2OCH_2CHFCF_2OCF(CF_3)CF_2OCF_2—$;

(C')

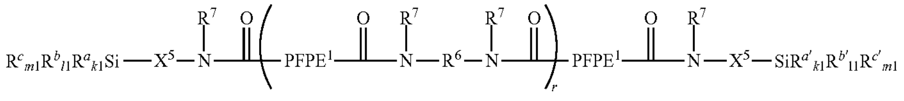

—$CH_2OCH_2CHFCF_2OCF(CF_3)CF_2OCF_2CF_2$—;
—$CH_2OCH_2CHFCF_2OCF(CF_3)CF_2OCF_2CF_2CF_2$—;
—$CH_2OCF_2CHFOCF_2CF_2CF_2$—C(O)NH—$CH_2$—;
—$CH_2OCH_2(CH_2)_7CH_2Si(OCH_3)_2OSi(OCH_3)_2(CH_2)_2Si(OCH_3)_2OSi(OCH_3)_2(CH_2)_2$—;
—$CH_2OCH_2CH_2CH_2Si(OCH_3)_2OSi(OCH_3)_2(CH_2)_3$—;
—$CH_2OCH_2CH_2CH_2Si(OCH_2CH_3)_2OSi(OCH_2CH_3)_2(CH_2)_3$—;
—$CH_2OCH_2CH_2CH_2Si(OCH_3)_2OSi(OCH_3)_2(CH_2)_2$—;
—$CH_2OCH_2CH_2CH_2Si(OCH_2CH_3)_2OSi(OCH_2CH_3)_2(CH_2)_2$—;
—$(CH_2)_2$—$Si(CH_3)_2$—$(CH_2)_2$—;
—$CH_2$—;
—$(CH_2)_2$—;
—$(CH_2)_3$—;
—$(CH_2)_4$—;
—$(CH_2)_5$—;
—$(CH_2)_6$—;
—$CF_2$—;
—$(CF_2)_2$—;
—$CF_2$—$CH_2$—;
—$CF_2$—$(CH_2)_2$—;
—$CF_2$—$(CH_2)_3$—;
—$CF_2$—$(CH_2)_4$—;
—$CF_2$—$(CH_2)_5$—;
—$CF_2$—$(CH_2)_6$—;
—CO—;
—$CF_2CONH$—;
—$CF_2CONHCH_2$—;
—$CF_2CONH(CH_2)_2$—;
—$CF_2CONH(CH_2)_3$—;
—$CF_2CONH(CH_2)_6$—;
—$CF_2$—$CON(CH_3)$—$(CH_2)_3$—;
—$CF_2$—CON(Ph)-$(CH_2)_3$— (in the formula, Ph means phenyl);
—$CF_2$—$CON(CH_3)$—$(CH_2)_6$—;
—$CF_2$—CON(Ph)-$(CH_2)_6$— (in the formula, Ph means phenyl);
—$(CH_2)_2NH(CH_2)_3$—; and
—$(CH_2)_6NH(CH_2)_3$—;
—$CH_2O$—CONH—$(CH_2)_3$—;
—$CH_2O$—CONH—$(CH_2)_6$—;
—S—$(CH_2)_3$—;
—$(CH_2)_2S(CH_2)_3$—;
—$(CH_2)_3Si(CH_3)_2OSi(CH_3)_2(CH_2)_2$—;
—$(CH_2)_3Si(CH_3)_2OSi(CH_3)_2OSi(CH_3)_2(CH_2)_2$—;
—$(CH_2)_3Si(CH_3)_2O(Si(CH_3)_2O)_2Si(CH_3)_2(CH_2)_2$—;
—$(CH_2)_3Si(CH_3)_2O(Si(CH_3)_2O)_3Si(CH_3)_2(CH_2)_2$—;
—$(CH_2)_3Si(CH_3)_2O(Si(CH_3)_2O)_{10}Si(CH_3)_2(CH_2)_2$—;
—$(CH_2)_3Si(CH_3)_2O(Si(CH_3)_2O)_{20}Si(CH_3)_2(CH_2)_2$—;
—C(O)O—$(CH_2)_3$—;
—C(O)O—$(CH_2)_6$—;
—$CH_2$—O—$(CH_2)_3$—$Si(CH_3)_2$—$(CH_2)_2$—$Si(CH_3)_2$—$(CH_2)_2$—;
—$CH_2$—O—$(CH_2)_3$—$Si(CH_3)_2$—$(CH_2)_2$—$Si(CH_3)_2$—$CH(CH_3)$—;
—$CH_2$—O—$(CH_2)_3$—$Si(CH_3)_2$—$(CH_2)_2$—$Si(CH_3)_2$—$(CH_2)_3$—;
—$CH_2$—O—$(CH_2)_3$—$Si(CH_3)_2$—$(CH_2)_2$—$Si(CH_3)_2$—$CH(CH_3)$—$CH_2$—;
—$OCH_2$—;
—$O(CH_2)_3$—;
—$OCFHCF_2$—;
1,3-phenylene; and
(1,3-phenylene)$Si(CH_3)_2$—$(CH_2)_2$—.

In the above, preferably, it is preferable that $X^5$ be any of the following:

—$CH_2OCH_2$—;
—$CH_2O(CH_2)_2$—;
—$CH_2O(CH_2)_3$—;
—$CH_2O(CH_2)_6$—;
—$CF_2$—$CH_2$—O—$CH_2$—;
—$CF_2$—$CH_2$—O—$(CH_2)_2$—;
—$CF_2$—$CH_2$—O—$(CH_2)_3$—;
—$CF_2$—$CH_2$—O—$(CH_2)_6$—;
—$CH_2OCF_2CHFOCF_2$—;
—$CH_2OCF_2CHFOCF_2CF_2$—;
—$CH_2OCF_2CHFOCF_2CF_2CF_2$—;
—$CH_2OCH_2CF_2CF_2OCF_2$—;
—$CH_2OCH_2CF_2CF_2OCF_2CF_2$—;
—$CH_2OCH_2CF_2CF_2OCF_2CF_2CF_2$—;
—$CH_2OCH_2CF_2CF_2OCF(CF_3)CF_2OCF_2$—;
—$CH_2OCH_2CF_2CF_2OCF(CF_3)CF_2OCF_2CF_2$—;
—$CH_2OCH_2CF_2CF_2OCF(CF_3)CF_2OCF_2CF_2CF_2$—;
—$CH_2OCH_2CHFCF_2OCF_2$—;
—$CH_2OCH_2CHFCF_2OCF_2CF_2$—;
—$CH_2OCH_2CHFCF_2OCF_2CF_2CF_2$—;
—$CH_2OCH_2CHFCF_2OCF(CF_3)CF_2OCF_2$—;
—$CH_2OCH_2CHFCF_2OCF(CF_3)CF_2OCF_2CF_2$—;
—$CH_2OCH_2CHFCF_2OCF(CF_3)CF_2OCF_2CF_2CF_2$—;
—$CH_2OCF_2CHFOCF_2CF_2CF_2$—C(O)NH—$CH_2$—;
—$CF_2$—$CH_2OCF_2CHFOCF_2CF_2CF_2$—C(O)NH—$CH_2$—;
—$CH_2$—;
—$(CH_2)_2$—;
—$(CH_2)_3$—;
—$(CH_2)_4$—;
—$(CH_2)_5$—;
—$(CH_2)_6$—;
—$CF_2$—;
—$(CF_2)_2$—;
—$CF_2$—$CH_2$—;
—$CF_2$—$(CH_2)_2$—;
—$CF_2$—$(CH_2)_3$—;
—$CF_2$—$(CH_2)_4$—;
—$CF_2$—$(CH_2)_5$—;
—$CF_2$—$(CH_2)_6$—;
—$CF_2CONH$—;
—$CF_2CONHCH_2$—;
—$CF_2CONH(CH_2)_2$—;
—$CF_2CONH(CH_2)_3$—;
—$CF_2CONH(CH_2)_6$—;
—$CF_2$—$CON(CH_3)$—$(CH_2)_3$—;
—$CF_2$—CON(Ph)-$(CH_2)_3$— (in the formula, Ph means phenyl);
—$CF_2$—$CON(CH_3)$—$(CH_2)_6$—;
—$CF_2$—CON(Ph)-$(CH_2)_6$— (in the formula, Ph means phenyl);
—$(CH_2)_2NH(CH_2)_3$—;
—$(CH_2)_6NH(CH_2)_3$—;
—$CH_2O$—CONH—$(CH_2)_3$—;
—$CH_2O$—CONH—$(CH_2)_6$—;
—$OCH_2$—;
—$O(CH_2)_3$—; and
—$OCFHCF_2$—.

In the above, $X^5$ is more preferably any of the following:

—$CH_2OCF_2CHFOCF_2CF_2CF_2$—C(O)NH—$CH_2$—;
—$CF_2$—$CH_2OCF_2CHFOCF_2CF_2CF_2$—C(O)NH—$CH_2$—;
—$CH_2$—;
—$(CH_2)_2$—;
—$(CH_2)_3$—;
—$(CH_2)_6$—;
—$CF_2CONH$—;

—$CF_2CONHCH_2$—;
—$CF_2CONH(CH_2)_2$—;
—$CF_2CONH(CH_2)_3$—;
—$CF_2CONH(CH_2)_6$—;
—$CF_2$—$CON(CH_3)$—$(CH_2)_3$—;
—$CF_2$—$CON(Ph)$-$(CH_2)_3$— (in the formula, Ph means phenyl);
—$CF_2$—$CON(CH_3)$—$(CH_2)_6$—;
—$CF_2$—$CON(Ph)$-$(CH_2)_6$— (in the formula, Ph means phenyl);
—$(CH_2)_2NH(CH_2)_3$—; and
—$(CH_2)_6NH(CH_2)_3$—.

In another preferred embodiment, $X^5$ represents $X^{e'}$. $X^{e'}$ is the same as defined above except that a single bond is excluded.

In the above formula, $R^a$ each independently at each occurrence represents —$Z^3$—$SiR^{71}_{p1}R^{72}_{q1}R^{73}_{r1}$.

In the formula, $Z^3$ each independently at each occurrence represents an oxygen atom or a divalent organic group.

$Z^3$ is preferably a divalent organic group, and does not encompass any group that is taken together with the Si atom at an end of the molecular backbone in formula (C) (Si atom to which Ra is bonded) to form a siloxane bond.

$Z^3$ is preferably a $C_{1-6}$ alkylene group, —$(CH_2)_g$—O—$(CH_2)_h$—, wherein g is an integer of 1 to 6 and h is an integer of 1 to 6, or -phenylene-$(CH_2)_i$—, wherein i is an integer of 0 to 6, and is more preferably a $C_{1-3}$ alkylene group. These groups are optionally substituted with one or more substituents selected from, for example, a fluorine atom, a $C_{1-6}$ alkyl group, a $C_{2-6}$ alkenyl group, and a $C_{2-6}$ alkynyl group. From the viewpoint of particularly favorable ultraviolet durability, $Z^3$ is more preferably a linear or branched alkylene group, and is still more preferably a linear alkylene group. The number of carbon atoms constituting the alkylene group of $Z^3$ is preferably in the range of 1 to 6, and more preferably in the range of 1 to 3. The alkylene group is as described above.

In the formula, $R^{71}$ each independently at each occurrence represents $R^{a'}$. $R^{a'}$ is the same as defined in $R^a$.

The number of Si atoms linearly connected via the $Z^3$ group in $R^a$ is at most 5. That is, in the case where at least one $R^{71}$ is present in $R^a$, two or more Si atoms linearly connected via the $Z^3$ group are present in $R^a$, and the number of such Si atoms linearly connected via the $Z^3$ group is at most 5. Note that, "the number of Si atoms linearly connected via the $Z^3$ group in $R^a$" is equal to the number of repeats of —$Z^3$—Si-linearly connected with each other in $R^a$.

More specifically, an example of the case where Si atoms are connected via the $Z^3$ group in $R^a$ is shown below:

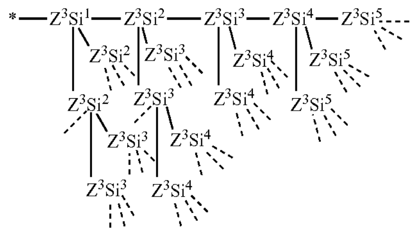

In the above formula, "*" means a site bonded to Si of the main chain, and " . . . " means that a predetermined group other than $Z^3Si$ is bonded. More specifically, if three bonds of a Si atom are all expressed by " . . . ", the repeat of $Z^3Si$ is terminated there. The superscript number in Si means the number of occurrence of Si linearly connected via the $Z^3$ group when counted from "*". That is, a chain where the repeat of $Z^3Si$ is terminated at $Si^2$ is a chain where "the number of Si atoms linearly connected via the $Z^3$ group in $R^{a''}$ is 2, and similarly, chains where the repeat of $Z^3Si$ is terminated at $Si^3$, $Si^4$, and $Si^5$ are chains where "the number of Si atoms linearly connected via the $Z^3$ group in $R^{a''}$ is 3, 4 and 5, respectively. It is noted that, as is apparent from the above formula, a plurality of $Z^3Si$ chains are present in $R^a$, and it is not necessary that these $Z^3Si$ chains all have the same length and the lengths of the chains may be arbitrarily set.

In a preferred embodiment, as shown below, "the number of Si atoms linearly connected via the $Z^3$ group in $R^a$" in all chains is one (the left formula below) or two (the right formula below).

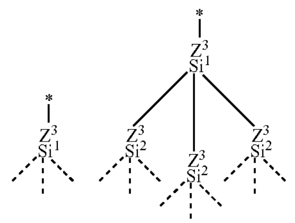

In one embodiment, the number of Si atoms linearly connected via the $Z^3$ group in $R^a$ is one or two, and is preferably one.

In the formula, $R^{72}$ each independently at each occurrence represents a hydroxyl group or a hydrolyzable group. The "hydrolyzable group" is the same as defined above.

Preferably, $R^{72}$ is —OR, wherein R represents a substituted or unsubstituted $C_{1-3}$ alkyl group, and more preferably a methyl group.

In the formula, $R^{73}$ each independently at each occurrence represents a hydrogen atom or a lower alkyl group. The lower alkyl group is preferably an alkyl group having 1 to 20 carbon atoms, more preferably an alkyl group having 1 to 6 carbon atoms, and still more preferably a methyl group.

In the formula, p1 is each independently at each occurrence an integer of 0 to 3; q1 is each independently at each occurrence an integer of 0 to 3; and r1 is each independently at each occurrence an integer of 0 to 3, provided that the sum of p1, q1, and r1 is 3 in each (—$Z^3$—$SiR^{71}_{p1}R^{72}_{q1}R^{73}_{r1}$).

In a preferred embodiment, q1 in $R^{a'}$ ($R^a$ in the case where no $R^{a'}$ is present) at an end of $R^a$ is preferably 2 or more, such as 2 or 3, and is more preferably 3.

In a preferred embodiment, at least one end of $R^a$ may be —Si(—$Z^3$—$SiR^{72}_{q1}R^{73}_{r1})_2R^b_{l1}R^c_{m1}$ (provided that one of l1 and m1 is 1 and the other is 0) or —Si(—$Z^3$—$SiR^{72}_{q1}R^{73}_{r1})_3$, preferably —Si(—$Z^3$—; $SiR^{72}_{q1}R^{73}_{r1})_3$ (wherein the total of q1 and r1 is 3). In the formula, the (—$Z^3$—$SiR^{72}_{q1}R^{73}_{r1}$) unit is preferably (—$Z^3$—$SiR^{72}_3$).

In a still more preferred embodiment, all ends of $R^a$ may be —Si(—$Z^3$—$SiR^{72}_{q1}R^{73}_{r1})_3$, preferably —Si(—$Z^3$—$SiR^{72}_3)_3$.

In the above formula, $R^{a''}$ each independently at each occurrence represents —$Z^3$—$SiR^{71}_{q1}R^{72''}_{q1}R^{73}_{r1}$. $Z^3$, $R^{71}$, $R^{73}$, p1, q1, and r1 are the same as defined above. $R^{72''}$ is the same as defined in $R^{72}$.

In a preferred embodiment, at least one end of $R^{a''}$ may be —Si(—$Z^3$—$SiR^{72''}_{q1}R^{73}_{r1})_2R^{b''}_{l1}R^{c''}_{m1}$ (provided that one of l1 and m1 is 1 and the other is 0) or —Si(—$Z^3$—$SiR^{72''}_{q1}R^{73}_{r1})_3$, preferably —Si(—$Z^3$—$SiR^{72''}_{q1}R^{73}_{r1})_3$ (wherein the total of q1 and r1 is 3). In the formula, the $(—Z^3—SiR^{72''}_{q1}R^{73}_{r1})$ unit is preferably $(—Z^3—SiR^{72''}_3)$. In a still more preferred embodiment, all ends of $R^a$ may be $—Si(—Z^3—SiR^{72''}_{q1}R^{73}_{r1})_3$, preferably $—Si(—Z^3—SiR^{72''}_3)_3$.

In formula (C), there are at least two Si bonded to a hydroxyl group or a hydrolyzable group. That is, there are at least two structures selected from the group consisting of $SiR^{72}$ (specifically, a group represented by $—SiR^{71}_{p1}R^{72}_{q1}R^{73}_{r1}$, wherein q1 is an integer of 1 to 3), $SiR^{72''}$ (specifically, a group represented by occurrence an integer of 0 to 3; and m1 is each independently at each occurrence an integer of 0 to 3, provided that the sum of k1, l1, and m1 is 3 in each $(SiR^a_{k1}R^b_{l1}R^c_{m1})$ or in each $(SiR^{a''}_{k1}R^{b''}_{l1}R^{c''}_{m1})$.

In one embodiment, k1 is preferably 1 to 3, and is more preferably 3.

The compound represented by the above formula (C) can be synthesized as described in International Publication No. WO 2014/069592, for example.

Formula (D):

(D)

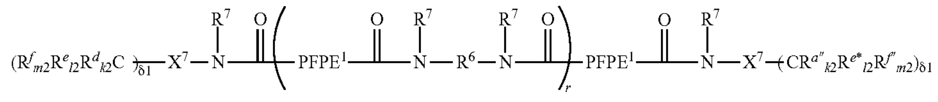

$—SiR^{71}_{p1}R^{72''}_{q1}R^{73}_{r1}$, wherein q1 is an integer of 1 to 3), $SiR^b$ (specifically, a group represented by $—SiR^a_{k1}R^b_{l1}R^c_{m1}$, wherein l1 is an integer of 1 to 3), and $SiR^{b''}$ (specifically, a group represented by $—SiR^{a''}_{k1}R^{b''}_{l1}R^{c''}_{m1}$, wherein l1 is an integer of 1 to 3). $R^b$ and $R^{b''}$ will be described later.

More preferably, in formula (C), at least one Si bonded to a hydroxyl group or a hydrolyzable group is present at each of both ends of the molecular backbone of the fluoropolyether group-containing silane compound (A). That is, at least one structure of $SiR^{72}$ and/or $SiR^b$ is present and at least one structure of $SiR^{72''}$ and/or $SiR^{b''}$ is present.

In the above formula, $R^b$ each independently at each occurrence represents a hydroxyl group or a hydrolyzable group.

$R^b$ is preferably a hydroxyl group, —OR, —OCOR, $—O—N{=}C(R)_2$, $—N(R)_2$, —NHR, or halogen, wherein R represents a substituted or unsubstituted alkyl group having 1 to 4 carbon atoms, and is more preferably —OR. Examples of R include unsubstituted alkyl groups such as a methyl group, an ethyl group, a propyl group, an isopropyl group, a n-butyl group, and an isobutyl group; and substituted alkyl groups such as a chloromethyl group. Among them, an alkyl group, particularly an unsubstituted alkyl group, is preferable, and a methyl group or an ethyl group is more preferable. The hydroxyl group is not limited, and may be generated by hydrolysis of a hydrolyzable group. More preferably, $R^b$ is —OR, wherein R represents a substituted or unsubstituted $C_{1-3}$ alkyl group, more preferably a methyl group.

In the above formula, $R^{b''}$ is the same as defined in $R^b$.

In the above formula (D), $PFPE^1$, $R^6$, $R^7$, and r are the same as described with respect to the above formula (A).

In the above formula, $X^7$ each independently represents a single bond or a di- to decavalent organic group. $X^7$ in the compound represented by formula (D) is interpreted as a linker that connects the perfluoro(poly)ether moiety (that is, $-PFPE^1$-moiety), which mainly provides, for example, water-repellency and surface lubricity, and the moiety that provides binding ability to a substrate (that is, the group enclosed in parentheses provided with δ1). Accordingly, $X^7$ may be a single bond or any organic group as long as the compound represented by formula (D) can stably exist. Herein, the left side of the structure described as $X^7$ is bonded to the amide bond adjacent to the group represented by $PFPE^1$, and the right side thereof is bonded to the group enclosed in parentheses provided with δ1.

In another embodiment, $X^7$ represents $X^e$. $X^e$ is the same as defined above.

In the above formula, δ1 is an integer of 1 to 9, and δ1 may vary depending on the valence of $X^7$. In formula (D), the value of δ1 is obtained by subtracting 1 from the valence of $X^7$. When $X^7$ is a single bond, δ1 is 1.

$X^7$ is preferably a di-to heptavalent, more preferably a di- to tetravalent, and still more preferably a divalent organic group.

In one embodiment, $X^7$ is a di- to tetravalent organic group, and δ1 is 1 to 3.

In another embodiment, $X^7$ is a divalent organic group, and δ1 is 1. In this case, formula (D) is represented by the following formula (D').

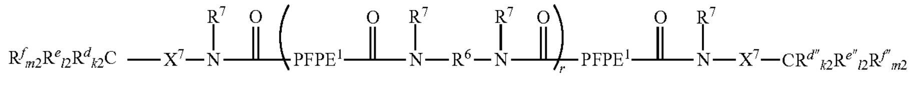

In the above formula, $R^c$ each independently at each occurrence represents a hydrogen atom or a lower alkyl group. The lower alkyl group is preferably an alkyl group having 1 to 20 carbon atoms, more preferably an alkyl group having 1 to 6 carbon atoms, and still more preferably a methyl group.

In the above formula, $R^{c''}$ is the same as defined in $R^c$.

In the formula, k1 is each independently at each occurrence an integer of 0 to 3; l1 is each independently at each $X^7$ is not limited as long as it can form a bond with the amide group connected to the $PFPE^1$ group and can stably prepare the compound, but examples thereof include those that are the same as those described with respect to $X^1$.

In particular, preferred specific examples of $X^7$ include:

a single bond;

$—CH_2OCH_2—$;

$—CH_2O(CH_2)_2—$;

$—CH_2O(CH_2)_3—$;

—$CH_2O(CH_2)_6$—;
—$CF_2$—$CH_2$—O—$CH_2$—;
—$CF_2$—$CH_2$—O—$(CH_2)_2$—;
—$CF_2$—$CH_2$—O—$(CH_2)_3$—;
—$CF_2$—$CH_2$—O—$(CH_2)_6$—;
—$CH_2O(CH_2)_3Si(CH_3)_2OSi(CH_3)_2(CH_2)_2$—;
—$CH_2O(CH_2)_3Si(CH_3)_2OSi(CH_3)_2OSi(CH_3)_2(CH_2)_2$—;
—$CH_2O(CH_2)_3Si(CH_3)_2O(Si(CH_3)_2O)_2Si(CH_3)_2(CH_2)_2$—;
—$CH_2O(CH_2)_3Si(CH_3)_2O(Si(CH_3)_2O)_3Si(CH_3)_2(CH_2)_2$—;
—$CH_2O(CH_2)_3Si(CH_3)_2O(Si(CH_3)_2O)_{10}Si(CH_3)_2(CH_2)_2$—;
—$CH_2O(CH_2)_3Si(CH_3)_2O(Si(CH_3)_2O)_2OSi(CH_3)_2(CH_2)_2$—;
—$CH_2OCF_2CHFOCF_2$—;
—$CH_2OCF_2CHFOCF_2CF_2$—;
—$CH_2OCF_2CHFOCF_2CF_2CF_2$—;
—$CH_2OCH_2CF_2CF_2OCF_2$—;
—$CH_2OCH_2CF_2CF_2OCF_2CF_2$—;
—$CH_2OCH_2CF_2CF_2OCF_2CF_2CF_2$—;
—$CH_2OCH_2CF_2CF_2OCF(CF_3)CF_2OCF_2$—;
—$CH_2OCH_2CF_2CF_2OCF(CF_3)CF_2OCF_2CF_2$—;
—$CH_2OCH_2CF_2CF_2OCF(CF_3)CF_2OCF_2CF_2CF_2$—;
—$CH_2OCH_2CHFCF_2OCF_2$—;
—$CH_2OCH_2CHFCF_2OCF_2CF_2$—;
—$CH_2OCH_2CHFCF_2OCF_2CF_2CF_2$—;
—$CH_2OCH_2CHFCF_2OCF(CF_3)CF_2OCF_2$—;
—$CH_2OCH_2CHFCF_2OCF(CF_3)CF_2OCF_2CF_2$—;
—$CH_2OCH_2CHFCF_2OCF(CF_3)CF_2OCF_2CF_2CF_2$—;
—$CH_2OCF_2CHFOCF_2CF_2CF_2$—C(O)NH—$CH_2$—;
—$CH_2OCH_2(CH_2)_7CH_2Si(OCH_3)_2OSi(OCH_3)_2(CH_2)_2Si(OCH_3)_2OSi(OCH_3)_2(CH_2)_2$—;
—$CH_2OCH_2CH_2CH_2Si(OCH_3)_2OSi(OCH_3)_2(CH_2)_3$—;
—$CH_2OCH_2CH_2CH_2Si(OCH_2CH_3)_2OSi(OCH_2CH_3)_2(CH_2)_3$—;
—$CH_2OCH_2CH_2CH_2Si(OCH_3)_2OSi(OCH_3)_2(CH_2)_2$—;
—$CH_2OCH_2CH_2CH_2Si(OCH_2CH_3)_2OSi(OCH_2CH_3)_2(CH_2)_2$—;
—$(CH_2)_2$—$Si(CH_3)_2$—$(CH_2)_2$—;
—$CH_2$—;
—$(CH_2)_2$—;
—$(CH_2)_3$—;
—$(CH_2)_4$—;
—$(CH_2)_5$—;
—$(CH_2)_6$—;
—$CF_2$—;
—$(CF_2)_2$—;
—$CF_2$—$CH_2$—;
—$CF_2$—$(CH_2)_2$—;
—$CF_2$—$(CH_2)_3$—;
—$CF_2$—$(CH_2)_4$—;
—$CF_2$—$(CH_2)_5$—;
—$CF_2$—$(CH_2)_6$—;
—CO—;
—$CF_2CONH$—;
—$CF_2CONHCH_2$—;
—$CF_2CONH(CH_2)_2$—;
—$CF_2CONH(CH_2)_3$—;
—$CF_2CONH(CH_2)_6$—;
—$CF_2$—$CON(CH_3)$—$(CH_2)_3$—;
—$CF_2$—CON(Ph)-$(CH_2)_3$— (in the formula, Ph means phenyl);
—$CF_2$—$CON(CH_3)$—$(CH_2)_6$—;
—$CF_2$—CON(Ph)-$(CH_2)_6$— (in the formula, Ph means phenyl);
—CONH—$(CH_2)_2NH(CH_2)_3$—;

—CONH—$(CH_2)_6NH(CH_2)_3$—;
—$CH_2O$—CONH—$(CH_2)_3$—;
—$CH_2O$—CONH—$(CH_2)_6$—;
—S—$(CH_2)_3$—;
—$(CH_2)_2S(CH_2)_3$—;
—$(CH_2)_3Si(CH_3)_2OSi(CH_3)_2(CH_2)_2$—;
—$(CH_2)_3Si(CH_3)_2OSi(CH_3)_2OSi(CH_3)_2(CH_2)_2$—;
—$(CH_2)_3Si(CH_3)_2O(Si(CH_3)_2O)_2Si(CH_3)_2(CH_2)_2$—;
—$(CH_2)_3Si(CH_3)_2O(Si(CH_3)_2O)_3Si(CH_3)_2(CH_2)_2$—;
—$(CH_2)_3Si(CH_3)_2O(Si(CH_3)_2O)_{10}Si(CH_3)_2(CH_2)_2$—;
—$(CH_2)_3Si(CH_3)_2O(Si(CH_3)_2O)_{20}Si(CH_3)_2(CH_2)_2$—;
—C(O)O—$(CH_2)_3$—;
—C(O)O—$(CH_2)_6$—;
—$CH_2$—O—$(CH_2)_3$—$Si(CH_3)_2$—$(CH_2)_2$—$Si(CH_3)_2$—$(CH_2)_2$—;
—$CH_2$—O—$(CH_2)_3$—$Si(CH_3)_2$—$(CH_2)_2$—$Si(CH_3)_2$—$CH(CH_3)$—;
—$CH_2$—O—$(CH_2)_3$—$Si(CH_3)_2$—$(CH_2)_2$—$Si(CH_3)_2$—$(CH_2)_3$—;
—$CH_2$—O—$(CH_2)_3$—$Si(CH_3)_2$—$(CH_2)_2$—$Si(CH_3)_2$—$CH(CH_3)$—$CH_2$—;
—$OCH_2$—;
—$O(CH_2)_3$—;
—$OCFHCF_2$—;
1,3-phenylene; and
(1,3-phenylene)-$Si(CH_3)_2$—$(CH_2)_2$—.

In the above, more preferred specific examples of $X^7$ preferably include any of the following:

—$CH_2OCH_2$—;
—$CH_2O(CH_2)_2$—;
—$CH_2O(CH_2)_3$—;
—$CH_2O(CH_2)_6$—;
—$CF_2$—$CH_2$—O—$CH_2$—;
—$CF_2$—$CH_2$—O—$(CH_2)_2$—;
—$CF_2$—$CH_2$—O—$(CH_2)_3$—;
—$CF_2$—$CH_2$—O—$(CH_2)_6$—;
—$CH_2OCF_2CHFOCF_2$—;
—$CH_2OCF_2CHFOCF_2CF_2$—;
—$CH_2OCF_2CHFOCF_2CF_2CF_2$—;
—$CH_2OCH_2CF_2CF_2OCF_2$—;
—$CH_2OCH_2CF_2CF_2OCF_2CF_2$—;
—$CH_2OCH_2CF_2CF_2OCF_2CF_2CF_2$—;
—$CH_2OCH_2CF_2CF_2OCF(CF_3)CF_2OCF_2$—;
—$CH_2OCH_2CF_2CF_2OCF(CF_3)CF_2OCF_2CF_2$—;
—$CH_2OCH_2CF_2CF_2OCF(CF_3)CF_2OCF_2CF_2CF_2$—;
—$CH_2OCH_2CHFCF_2OCF_2$—;
—$CH_2OCH_2CHFCF_2OCF_2CF_2$—;
—$CH_2OCH_2CHFCF_2OCF_2CF_2CF_2$—;
—$CH_2OCH_2CHFCF_2OCF(CF_3)CF_2OCF_2$—;
—$CH_2OCH_2CHFCF_2OCF(CF_3)CF_2OCF_2CF_2$—;
—$CH_2OCH_2CHFCF_2OCF(CF_3)CF_2OCF_2CF_2CF_2$—;
—$CH_2OCF_2CHFOCF_2CF_2CF_2$—C(O)NH—$CH_2$—;
—$CF_2$—$CH_2OCF_2CHFOCF_2CF_2CF_2$—C(O)NH—$CH_2$—;
—$CH_2$—;
—$(CH_2)_2$—;
—$(CH_2)_3$—;
—$(CH_2)_4$—;
—$(CH_2)_5$—;
—$(CH_2)_6$—;
—$CF_2$—;
—$(CF_2)_2$—;
—$CF_2$—$CH_2$—;
—$CF_2$—$(CH_2)_2$—;
—$CF_2$—$(CH_2)_3$—;
—$CF_2$—$(CH_2)_4$—;
—$CF_2$—$(CH_2)_5$—;

—$CF_2$—$(CH_2)_6$—;
—$CF_2CONH$—;
—$CF_2CONHCH_2$—;
—$CF_2CONH(CH_2)_2$—;
—$CF_2CONH(CH_2)_3$—;
—$CF_2CONH(CH_2)_6$—;
—$CF_2$—$CON(CH_3)$—$(CH_2)_3$—;
—$CF_2$—$CON(Ph)$-$(CH_2)_3$— (in the formula, Ph means phenyl);
—$CF_2$—$CON(CH_3)$—$(CH_2)_6$—;
—$CF_2$—$CON(Ph)$-$(CH_2)_6$— (in the formula, Ph means phenyl);
—$(CH_2)_2NH(CH_2)_3$—;
—$(CH_2)_6NH(CH_2)_3$—;
—$CH_2O$—$CONH$—$(CH_2)_3$—;
—$CH_2O$—$CONH$—$(CH_2)_6$—;
—$OCH_2$—;
—$O(CH_2)_3$—; and
—$OCFHCF_2$—.

In the above, $X^7$ is more preferably any of the following:
—$CH_2OCF_2CHFOCF_2CF_2CF_2$—$C(O)NH$—$CH_2$—;
—$CF_2$—$CH_2OCF_2CHFOCF_2CF_2CF_2$—$C(O)NH$—$CH_2$—;
—$CH_2$—;
—$(CH_2)_2$—;
—$(CH_2)_3$—;
—$(CH_2)_6$—;
—$CF_2CONH$—;
—$CF_2CONHCH_2$—;
—$CF_2CONH(CH_2)_2$—;
—$CF_2CONH(CH_2)_3$—;
—$CF_2CONH(CH_2)_6$—;
—$CF_2$—$CON(CH_3)$—$(CH_2)_3$—;
—$CF_2$—$CON(Ph)$-$(CH_2)_3$— (in the formula, Ph means phenyl);
—$CF_2$—$CON(CH_3)$—$(CH_2)_6$—;
—$CF_2$—$CON(Ph)$-$(CH_2)_6$— (in the formula, Ph means phenyl);
—$(CH_2)_2NH(CH_2)_3$—; and
—$(CH_2)_6NH(CH_2)_3$—.

In more preferred embodiment, $X^7$ represents $X^{e'}$. $X^{e'}$ is the same as defined above. In one embodiment, $X^{e'}$ is a single bond.

In the above formula, $R^d$ each independently at each occurrence represents —$Z^4$—$CR^{81}_{p2}R^{82}_{q2}R^{83}_{r2}$.

In the formula, $Z^4$ each independently at each occurrence represents an oxygen atom or a divalent organic group.

$Z^4$ is preferably a $C_{1-6}$ alkylene group, —$(CH_2)_g$—O—$(CH_2)_h$—, wherein g is an integer of 0 to 6, such as an integer of 1 to 6, and h is an integer of 0 to 6, such as an integer of 1 to 6, or -phenylene-$(CH_2)_i$—, wherein i is an integer of 0 to 6, and is more preferably a $C_{1-3}$ alkylene group. These groups are optionally substituted with one or more substituents selected from, for example, a fluorine atom, a $C_{1-6}$ alkyl group, a $C_{2-6}$ alkenyl group, and a $C_{2-6}$ alkynyl group.

In the formula, $R^{81}$ each independently at each occurrence represents $R^{d'}$. $R^{d'}$ is the same as defined in $R^d$.

The number of C atoms linearly connected via the $Z^4$ group in $R^d$ is at most 5. That is, in the case where at least one $R^{81}$ is present in $R^d$, two or more C atoms linearly connected via the $Z^4$ group are present in $R^d$, and the number of such C atoms linearly connected via the $Z^4$ group is at most 5. Note that, "the number of C atoms linearly connected via the $Z^4$ group in $R^d$ is equal to the number of repeats of —$Z^4$—C-linearly connected with each other in $R^d$.

In a preferred embodiment, as shown below, "the number of C atoms linearly connected via the $Z^4$ group in $R^{d''}$ in all chains is one (the left formula below) or two (the right formula below).

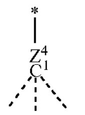

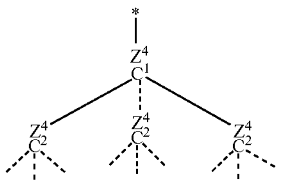

In one embodiment, the number of C atoms linearly connected via the $Z^4$ group in $R^d$ is one or two, and is preferably one.

In the formula, $R^{82}$ each independently at each occurrence represents —Y—$SiR^{85}_{n2}R^{86}_{3-n2}$.

Y each independently at each occurrence represents a divalent organic group.

In a preferred embodiment, Y is a $C_{1-6}$ alkylene group, —$(CH_2)_{g'}$—O—$(CH_2)_{h'}$—, wherein g' is an integer of 0 to 6, such as an integer of 1 to 6, and h' is an integer of 0 to 6, such as an integer of 1 to 6, or -phenylene-$(CH_2)_{i'}$—, wherein i' is an integer of 0 to 6. These groups are optionally substituted with one or more substituents selected from, for example, a fluorine atom, a $C_{1-6}$ alkyl group, a $C_{2-6}$ alkenyl group, and a $C_{2-6}$ alkynyl group.

In one embodiment, Y may be a $C_{1-6}$ alkylene group or -phenylene-$(CH_2)_{i'}$—.

In the case where Y is any of the above groups, light resistance, in particular, ultraviolet resistance can be more enhanced.

$R^{85}$ each independently at each occurrence represents a hydroxyl group or a hydrolyzable group.

Examples of the above "hydrolyzable group" include those that are the same as those described with respect to formula (C).

Preferably, $R^{85}$ is —OR, wherein R represents a substituted or unsubstituted $C_{1-3}$ alkyl group, more preferably an ethyl group or a methyl group, and particularly a methyl group.

$R^{86}$ each independently at each occurrence represents a hydrogen atom or a lower alkyl group. The lower alkyl group is preferably an alkyl group having 1 to 20 carbon atoms, more preferably an alkyl group having 1 to 6 carbon atoms, and still more preferably a methyl group.

n2 represents an integer of 0 to 3 independently in each (—Y—$SiR^{85}_{n2}R^{86}_{3-n2}$) unit or in each (—Y—$SiR^{85''}_{n2}R^{86''}_{3-n2}$) unit, and is preferably an integer of 1 to 3, more preferably 2 or 3, and particularly preferably 3. $R^{85''}$ and $R^{86''}$ will be described later.

$R^{83}$ each independently at each occurrence represents a hydrogen atom, a hydroxyl group, or a lower alkyl group, and preferably represents a hydrogen atom or a lower alkyl group. The lower alkyl group is preferably an alkyl group having 1 to 20 carbon atoms, more preferably an alkyl group having 1 to 6 carbon atoms, and still more preferably a methyl group.

In the formula, p2 is each independently at each occurrence an integer of 0 to 3; q2 is each independently at each occurrence an integer of 0 to 3; and r2 is each independently at each occurrence an integer of 0 to 3, provided that the sum of p2, q2, and r2 is 3 in each (—$Z^4$—$CR^{81}_{p2}R^{82}_{q2}R^{83}_{r2}$) or in each (—$Z^4$—$CR^{81}_{p2}R^{82''}_{q2}R^{83}_{r2}$). $R^{82''}$ will be described later.

In a preferred embodiment, q2 in $R^{d'}$ ($R^d$ in the case where no $R^{d'}$ is present) at an end of $R^d$ is preferably 2 or more, such as 2 or 3, and is more preferably 3.

In a preferred embodiment, at least one end of $R^d$ may be $—C(—Y—SiR^{85}_{n2}R^{86}_{3-n2})_2$(specifically, $—C(—Y—SiR^{85}_{n2}R^{86}_{3-n2})_2R^{83}$) or $—C(—Y—SiR^{85}_{n2}R^{86}_{3-n2})_3$, preferably $—C(—Y—SiR^{85}_{n2}R^{86}_{3-n2})_3$. Here, n2 is an integer of 1 to 3. In the formula, the $(—YSiR^{85}_{n2}R^{86}_{3-n2})$ unit is preferably $(—Y—SiR^{85}_3)$. In a still more preferred embodiment, all ends of $R^d$ may be $—C(—Y—SiR^{85}_{n2}R^{86}_{3-n2})_3$, preferably $—C(—Y—SiR^{85}_3)_3$.

In a more preferred embodiment, an end of the group represented by $(CR^d_{k2}R^e_{l2}R^f_{m2})$ is $C(—Y—SiR^{85}_{n2}R^{86}_{3-n2})_2R^f)$ or $C(—Y—SiR^{85}_{n2}R^{86}_{3-n2})_3$, preferably $C(—Y—SiR^{85}_{n2}R^{86}_{3-n2})_3$. Here, n2 is an integer of 1 to 3. In the formula, the $(—Y—SiR^{85}_{n2}R^{86}_{3-n2})$ unit is preferably $(—Y—SiR^{85}_3)$. In a still more preferred embodiment, all ends of the above group may be $—C(—Y—SiR^{85}_{n2}R^{86}_{3-n2})_3$, preferably $—C(—Y—SiR^{85}_3)_3$.

In the above formula, $R^{d''}$ each independently at each occurrence represents $—Z^4—CR^{81}_{p2}R^{82''}_{q2}R^{83}_{r2}$. $Z^4$, $R^{81}$, $R^{83}$, p2, q2, and r2 are the same as defined above. $R^{82''}$ each independently at each occurrence represents $—Y—SiR^{85''}_{n2}R^{86''}_{3-n2}$. Here, Y and n2 are the same as defined above. $R^{85''}$ and $R^{86''}$ are the same as defined in $R^{85}$ and $R^{86}$, respectively.

In a preferred embodiment, q2 in $R^{d'}$ ($R^{d''}$ in the case where no $R^{d'}$ is present) at an end of $R^{d''}$ is preferably 2 or more, such as 2 or 3, and is more preferably 3.

In a preferred embodiment, at least one end of $R^{d''}$ may be $—C(—Y—SiR^{85''}_{n2}R^{86''}_{3-n2})_2$(specifically, $—C(—Y—SiR^{85''}_{n2}R^{86''}_{3-n2})_2R^{83}$) or $—C(—Y—SiR^{85''}_{n2}R^{86''}_{3-n2})_3$, preferably $—C(—Y—SiR^{85''}_{n2}R^{86''}_{3-n2})_3$. Here, n2 is an integer of 1 to 3. In the formula, the $(—Y—SiR^{85''}_{n2}R^{86''}_{3-n2})$ unit is preferably $(—Y—SiR^{85''}_3)$. In a still more preferred embodiment, all ends of $R^d$ may be $—C(—Y—SiR^{85''}_{n2}R^{86''}_{3-n2})_3$, preferably $—C(—Y—SiR^{85''}_3)_3$.

In a more preferred embodiment, an end of the group represented by $(CR^{d''}_{k2}R^{e''}_{l2}R^{f''}_{m2})$ is $C(—Y—SiR^{85''}_{n2}R^{86''}_{3-n2})_2R^{f''})$ or $C(—Y—SiR^{85''}_{n2}R^{86''}_{3-n2})_3$, preferably $C(—Y—SiR^{85''}_{n2}R^{86''}_{3-n2})_3$. Here, n2 is an integer of 1 to 3. In the formula, the $(—Y—SiR^{85''}_{n2}R^{86''}_{3-n2})$ unit is preferably $(—Y—SiR^{85''}_3)$. In a still more preferred embodiment, all ends of the above group may be $—C(—Y—SiR^{85''}_{n2}R^{86''}_{3-n2})_3$, preferably $—C(—Y—SiR^{85''}_3)_3$.

In the above formula, $R^e$ each independently at each occurrence represents $—Y—SiR^{85}_{n2}R^{86}_{3-n2}$. Here, Y, $R^{85}$, $R^{86}$, and n2 are the same as described with respect to $R^{82}$.

In the above formula, $R^{e''}$ each independently at each occurrence represents $—Y—SiR^{85''}_{n2}R^{86''}_{3-n2}$. Here, $R^{85''}$, $R^{86''}$, Y, and n2 are the same as defined above.

In the above formula, $R^f$ each independently at each occurrence represents a hydrogen atom, a hydroxyl group, or a lower alkyl group. Preferably, $R^f$ each independently at each occurrence represents a hydrogen atom or a lower alkyl group. The lower alkyl group is preferably an alkyl group having 1 to 20 carbon atoms, more preferably an alkyl group having 1 to 6 carbon atoms, and still more preferably a methyl group.

In the above formula, $R^{f''}$ is the same as defined in $R^f$.

In the formula, k2 is each independently at each occurrence an integer of 0 to 3; l2 is each independently at each occurrence an integer of 0 to 3; and m2 is each independently at each occurrence an integer of 0 to 3, provided that the sum of k2, l2, and m2 is 3.

In one embodiment, at least one k2 is 2 or 3, and preferably 3.

In one embodiment, k2 is 2 or 3, and preferably 3.

In one embodiment, l2 is 2 or 3, and preferably 3.

In the above formula (D), there are two or more groups selected from the group consisting of a group represented by $—Y—SiR^{85}$ and a group represented by $—Y—SiR^{85''}$. In the above formula (D), preferably, there are one or more groups represented by $—Y—SiR^{85}$ and one or more groups represented by $—Y—SiR^{85''}$. More preferably, there are one or more carbon atoms bonded to two or more groups represented by $—Y—SiR^{85}_{n2}R^{86}_{3-n2}$, and one or more carbon atoms bonded to two or more groups represented by $—Y—SiR^{85''}_{n2}R^{86''}_{3-n2}$. In the formula, n2 is an integer of 1 to 3. That is, preferably, there are one or more groups selected from a group represented by $—C\text{-}Rd_{k2}(Y—SiR^{85}_{n2}R^{86}_{3-n2})_{62}Rf_{m2}$ (provided that l2 is 2 or 3 and the total of k2, l2, and m2 is 3) and a group represented by $—CR^{81}_{p2}$ $(Y—SiR^{85}_{n2}R^{86}_{3-n2})_{q2}R^{83}_{r2}$ (provided that q2 is 2 or 3 and the total of p2, q2, and r2 is 3), and there are one or more groups selected from a group represented by $—C\text{-}Rd_{k2}$ $(Y—SiR^{85''}_{n2}R^{86''}_{3-n2})_{l2}Rf_{m2}$ (provided that l2 is 2 or 3 and the total of k2, l2, and m2 is 3) and a group represented by $—C—R^{81}_{p2}(Y—SiR^{85''}_{n2}R^{86''}_{3-n2})_{q2}R^{83}_{r2}$ (provided that q2 is 2 or 3 and the total of p2, q2, and r2 is 3) (in the formulae, n2 is an integer of 1 to 3).

In one embodiment, in the above formula (D), it is preferable that one or more groups represented by $—C—(Y—SiR^{85}_{n2}R^{86}_{3-n2})_2$ be present and one or more groups represented by $—C—(Y—SiR^{85''}_{n2}R^{86''}_{3-n2})_2$ be present (in the formulae, n2 is an integer of 1 to 3).

In one embodiment, in the above formula (D), it is preferable that one or more groups represented by $—C—(Y—SiR^{85}_{n2}R^{86}_{3-n2})_3$ be present and one or more groups represented by $—C—(Y—SiR^{85''}_{n2}R^{86''}_{3-n2})_3$ be present (in the formulae, n2 is an integer of 1 to 3).

In the above formulae (D), n2 is an integer of 1 to 3, and at least one q2 is 2 or 3, or at least one l2 is 2 or 3.

In the above formula (D), it is preferable that at least two $—Y—SiR^{85}_{n2}R^{86}_{3-n2}$ groups or $—Y—SiR^{85''}_{n2}R^{86''3}$-n2 groups be present in the formula. In the above formula (D), it is more preferable that one or more $—Y—SiR^{85}_{n2}R^{86}_{3-n2}$ groups be present and one or more $—Y—SiR^{85''}_{n2}R^{86''}_{3-n2}$ groups be present. That is, it is preferable that a group containing $—SiR^{85}$ and a group containing $—SiR^{85''}$ be present at both ends of the molecular backbone of the fluoropolyether group-containing silane compound (A).

The compound represented by the above formula (D) can be produced by combining known methods.

In a preferred embodiment, the fluoropolyether group-containing silane compound is represented by formula (B) or (C).

In one embodiment, the fluoropolyether group-containing silane compound is represented by formula (A), (C), or (D).

In one embodiment, the fluoropolyether group-containing silane compound has two or more, preferably three or more, Si atoms having a hydroxyl group or a hydrolyzable group at at least one end.

The fluoropolyether group-containing silane compound described above may have, in one embodiment, a number average molecular weight of 5×102 to 1×105, without any limitation. In particular, the compound preferably has a number average molecular weight of 2,000 to 50,000, more preferably 2,500 to 30,000, and still more preferably 3,000 to 10,000. In the present disclosure, the number average molecular weight is defined as a value obtained by $^{19}$F-NMR measurement.

The present disclosure provides a composition, typically a surface-treating agent, containing the fluoropolyether group-containing silane compound of the present disclosure described above.

The fluoropolyether group-containing silane compound of the present disclosure contained in the above composition may be contained singly or in multiple types. For example, the composition may contain a compound wherein k or r is any integer of 1 to 5. The composition of the present disclosure may also contain a compound wherein k or r is 0. Preferably, the average value of k or r in the composition is 1.

The surface-treating agent of the present disclosure can contain a (unreactive) fluoropolyether compound which can be understood as solvent or fluorine-containing oil, preferably a perfluoro(poly)ether compound (hereinafter, referred to collectively as "fluorine-containing oil"), a (unreactive) silicone compound which can be understood as a silicone oil (hereinafter, referred to as "silicone oil"), a catalyst, a surfactant, a polymerization inhibitor, a sensitizer and the like.

Examples of the solvent include aliphatic hydrocarbons such as hexane, cyclohexane, heptane, octane, nonane, decane, undecane, dodecane, and mineral spirits; aromatic hydrocarbons such as benzene, toluene, xylene, naphthalene, and solvent naphtha; esters such as methyl acetate, ethyl acetate, propyl acetate, n-butyl acetate, isopropyl acetate, isobutyl acetate, cellosolve acetate, propylene glycol methyl ether acetate, carbitol acetate, diethyl oxalate, ethyl pyruvate, ethyl 2-hydroxybutyrate, ethyl acetoacetate, amyl acetate, methyl lactate, ethyl lactate, methyl 3-methoxypropionate, ethyl 3-methoxypropionate, methyl 2-hydroxyisobutyrate, and ethyl 2-hydroxyisobutyrate; ketones such as acetone, methyl ethyl ketone, methyl isobutyl ketone, 2-hexanone, cyclohexanone, methyl amino ketone, and 2-heptanone; glycol ethers such as ethyl cellosolve, methyl cellosolve, methyl cellosolve acetate, ethyl cellosolve acetate, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether, and ethylene glycol monoalkyl ether; alcohols such as methanol, ethanol, iso-propanol, n-butanol, isobutanol, tert-butanol, sec-butanol, 3-pentanol, octyl alcohol, 3-methyl-3-methoxybutanol, and tert-amyl alcohol; glycols such as ethylene glycol and propylene glycol; cyclic ethers such as tetrahydrofuran, tetrahydropyran, and dioxane; amides such as N,N-dimethylformamide and N,N-dimethylacetamide; ether alcohols such as methyl cellosolve, cellosolve, isopropyl cellosolve, butyl cellosolve, and diethylene glycol monomethyl ether; diethylene glycol monoethyl ether acetate; and fluorine-containing solvents such as 1,1,2-trichloro-1,2,2-trifluoroethane, 1,2-dichloro-1,1,2,2-tetrafluoroethane, dimethyl sulfoxide, 1,1-dichloro-1,2,2,3,3-pentafluoropropane (HCFC 225), Zeorora H, HFE 7100, HFE 7200, and HFE 7300. Alternatively, the solvent may be a mixed solvent of two or more of such solvents.

The fluorine-containing oil is not limited, and examples thereof include a compound (perfluoro(poly)ether compound) represented by the following general formula (3).

$$Rf^5—(OC_4F_8)_{a'}—(OC_3F_6)_{b'}—(OC_2F_4)_{c'}—(OCF_2)_{d'}—Rf^6 \quad (3)$$

In the formula, $Rf^5$ represents an alkyl group having 1 to 16 carbon atoms optionally substituted with one or more fluorine atoms (preferably, a $C_{116}$ perfluoroalkyl group), $Rf^6$ represents an alkyl group having 1 to 16 carbon atoms optionally substituted with one or more fluorine atoms (preferably, a $C_{116}$ perfluoroalkyl group), a fluorine atom, or a hydrogen atom, and $Rf^5$ and $Rf^6$ are each independently, more preferably, a $C_{1-3}$ perfluoroalkyl group.

a', b', c', and d' represent the respective four numbers of repeating units in perfluoro(poly)ether constituting the main backbone of the polymer and are mutually independently an integer of 0 or more and 300 or less, and the sum of a', b', c', and d' is at least 1, preferably 1 to 300, more preferably 20 to 300. The occurrence order of the respective repeating units enclosed in parentheses provided with the subscript a', b', c', or d' is not limited in the formula. Among such repeating units, $—(OC_4F_8)—$ may be any of $—(OCF_2CF_2CF_2CF_2)—$, $—(OCF(CF_3)CF_2CF_2)—$, $—(OCF_2CF(CF_3)CF_2)—$, $—(OCF_2CF_2CF(CF_3))—$, $—(OC(CF_3)_2CF_2)—$, $—(OCF_2C(CF_3)_2)—$, $—(OCF(CF_3)CF(CF_3))—$, $—(OCF(C_2F_5)CF_2)—$, and $(OCF_2CF(C_2F_5))—$, but it is preferably $—(OCF_2CF_2CF_2CF_2)—$. $—(OC_3F_6)—$ may be any of $—(OCF_2CF_2CF_2)—$, $—(OCF(CF_3)CF_2)—$, and $(OCF_2CF(CF_3))—$, and it is preferably $—(OCF_2CF_2CF_2)—$. $—(OC_2F_4)—$ may be any of $—(OCF_2CF_2)—$ and $(OCF(CF_3))—$, but it is preferably $—(OCF_2CF_2)—$.

Examples of the perfluoro(poly)ether compound represented by the above general formula (3) include a compound represented by any of the following general formulae (3a) and (3b) (which may be used singly or as a mixture of two or more kinds thereof).

$$Rf^5—(OCF_2CF_2CF_2)_{b''}—Rf^6 \quad (3a)$$

$$Rf^5—(OCF_2CF_2CF_2CF_2)_{a''}—(OCF_2CF_2CF_2)_{b''}—(OCF_2CF_2)_{c''}—(OCF_2)_{d''}—Rf^6 \quad (3b)$$

In these formulae, $Rf^5$ and $Rf^6$ are as described above; in formula (3a), b" is an integer of 1 or more and 100 or less; and in formula (3b), a" and b" are each independently an integer of 0 or more and 30 or less, and c" and d" are each independently an integer of 1 or more and 300 or less. The occurrence order of the respective repeating units enclosed in parentheses provided with the subscript a", b", c", or d" is not limited in the formula.

Alternatively, from another viewpoint, the fluorine-containing oil may be a compound represented by general formula $Rf^3—F$, wherein $Rf^3$ is a $C_{5-16}$ perfluoroalkyl group. The fluorine-containing oil may be a chlorotrifluoroethylene oligomer.

The above fluorine-containing oil may have an average molecular weight of 500 to 10,000. The molecular weight of the fluorine-containing oil can be measured using GPC.

The fluorine-containing oil may be contained in an amount of, for example, 0 to 50% by mass, preferably 0 to 30% by mass, and more preferably 0 to 5% by mass based on the composition of the present disclosure. In one embodiment, the composition of the present disclosure is substantially free from the fluorine-containing oil. Being substantially free from the fluorine-containing oil means that the fluorine-containing oil is not contained at all, or an extremely small amount of the fluorine-containing oil may be contained.

In one embodiment, the average molecular weight of the fluorine-containing oil may be greater than the average molecular weight of the fluoropolyether group-containing silane compound. With such average molecular weights, better friction durability and surface lubricity can be obtained, in the case of forming the surface-treating layer by the vacuum deposition method.

In one embodiment, the average molecular weight of the fluorine-containing oil may be smaller than the average molecular weight of the fluoropolyether group-containing silane compound. With such average molecular weights, it is possible to form a cured product having high friction durability and high surface lubricity while suppressing reduction in the transparency of a surface-treating layer obtained from the compound.

The fluorine-containing oil contributes to improving the surface lubricity of a layer formed of the composition of the present disclosure.

For example, a linear or cyclic silicone oil having 2,000 or less siloxane bonds can be used as the silicone oil. The linear silicone oil may be a so-called straight silicone oil or modified silicone oil. Examples of the straight silicone oil include dimethyl silicone oil, methyl phenyl silicone oil, and methyl hydrogen silicone oil. Examples of the modified silicone oil include those obtained by modifying a straight silicone oil with alkyl, aralkyl, polyether, higher fatty acid ester, fluoroalkyl, amino, epoxy, carboxyl, alcohol, or the like. Examples of the cyclic silicone oil include cyclic dimethylsiloxane oil.

In the composition of the present disclosure (for example, a surface-treating agent), such a silicone oil may be contained in an amount of, for example, 0 to 300 parts by mass, and preferably 50 to 200 parts by mass, based on the total 100 parts by mass of the above fluoropolyether group-containing silane compound of the present disclosure (in the case of two or more kinds, the total thereof, and the same applies below).

The silicone oil contributes to improving the surface lubricity of the surface-treating layer.

Examples of the above catalyst include an acid (such as acetic acid and trifluoroacetic acid), a base (such as ammonia, triethylamine, and diethylamine), and a transition metal (such as Ti, Ni, and Sn).

The catalyst promotes hydrolysis and dehydrative condensation of the fluoropolyether group-containing silane compound of the present disclosure, and promotes formation of a layer formed of the composition of the present disclosure (for example, a surface-treating agent).

Examples of the other components include, in addition to those described above, tetraethoxysilane, methyltrimethoxysilane, 3-aminopropyltrimethoxysilane, 3-glycidoxypropyltrimethoxysilane, and methyltriacetoxysilane.

The composition of the present disclosure can be used as a surface-treating agent for surface treatment of a substrate.

The surface-treating agent of the present disclosure can be formed into pellets by impregnating a porous material such as a porous ceramic material or a metal fiber such as a fiber obtained by, for example, solidifying steel wool in a cotton-like form therewith. Such pellets can be used in, for example, vacuum deposition.

Hereinafter, an article of the present disclosure will be described.

The article of the present disclosure comprises a substrate and a layer (surface-treating layer) on a surface of the substrate, the layer being formed of a surface-treating agent comprising a fluoropolyether group-containing silane compound according to the present disclosure.

The substrate that can be used in the present disclosure may be composed of any suitable material such as glass, a resin (which may be a natural or synthetic resin, for example, a common plastic material, and may be in the form of a plate, a film, or the like), a metal, ceramics, a semiconductor (such as silicon and germanium), a fiber (such as woven fabric and nonwoven fabric), fur, leather, a wood material, a ceramic material, a stone material, or a building material.

For example, when the article to be produced is an optical member, the material constituting the surface of the substrate may be a material for an optical member, such as glass or a transparent plastic. When the article to be produced is an optical member, some layer (or film) such as a hard coat layer or an antireflection layer may be formed on the surface (the outermost layer) of the substrate. The antireflection layer may be any of a single-layer antireflection layer and a multi-layer antireflection layer. Examples of inorganic substances that can be used in the antireflection layer include $SiO_2$, SiO, $ZrO_2$, $TiO_2$, TiO, $Ti_2O_3$, $Ti_2O_5$, $Al_2O_3$, $Ta_2O_5$, $CeO_2$, MgO, $Y_2O_3$, $SnO_2$, $MgF_2$, and $WO_3$. One of these inorganic substances may be used singly, or two or more kinds thereof may be used in combination (for example, as a mixture). In the case of a multi-layer antireflection layer, it is preferable to use $SiO_2$ and/or SiO for the outermost layer thereof. When the article to be produced is an optical glass component for a touch panel, a part of the surface of the substrate (glass) may have a transparent electrode such as a thin film in which indium tin oxide (ITO), indium zinc oxide, or the like is used. The substrate, according to its specific configuration or the like, may have an insulating layer, an adhesive layer, a protecting layer, a decorated frame layer (I—CON), an atomizing film layer, a hard coating layer, a polarizing film, a phase difference film, a liquid crystal display module, or the like.

The shape of the substrate is not limited. The surface region of the substrate on which a surface-treating layer is to be formed may be at least a part of the substrate surface, and may be suitably determined according to the application, specific configuration, and the like of an article to be produced.

The substrate, or at least the surface portion thereof, may be composed of a material originally having hydroxyl groups. Examples of the material include glass, as well as metal (in particular, base metal) where a natural oxidized film or a thermal oxidized film is formed on the surface, ceramics, and semiconductors. Alternatively, when the substrate has an insufficient amount of hydroxyl groups or when the substrate originally has no hydroxyl group as in resin and the like, a pre-treatment may be performed on the substrate to thereby introduce or increase hydroxyl groups on the surface of the substrate. Examples of such a pre-treatment include a plasma treatment (for example, corona discharge) and ion beam irradiation. The plasma treatment can be suitably utilized to not only introduce or increase hydroxyl groups on the substrate surface, but also clean the substrate surface (remove foreign matter and the like). Another example of such a pre-treatment is a method wherein a monolayer of a surface adsorbent having a carbon-carbon unsaturated bonding group is formed on the surface of the substrate by a LB method (a Langmuir-Blodgett method), a chemical adsorption method, or the like beforehand, and thereafter cleaving the unsaturated bond under an atmosphere containing oxygen, nitrogen, or the like.

Alternatively, the substrate, or at least the surface portion thereof, may be composed of a material including another reactive group, such as a silicone compound having one or more Si—H groups or alkoxysilane.

Then, on the surface of such a substrate, a layer of the surface-treating agent of the present disclosure is formed, this layer is post-treated as necessary, and thereby a layer is formed from the surface-treating agent of the present disclosure.

The layer of the surface-treating agent of the present disclosure can be formed by applying the above composition on the surface of the substrate such that the composition coats the surface. The coating method is not limited. For example, a wet coating method and a dry coating method can be used.

Examples of the wet coating method include dip coating, spin coating, flow coating, spray coating, roll coating, gravure coating, and similar methods.

Examples of the dry coating method include deposition (usually, vacuum deposition), sputtering, CVD, and similar methods. Specific examples of the deposition method (usually, a vacuum deposition method) include resistive heating, high-frequency heating using electron beam, microwave or the like, ion beam, and similar methods. Specific examples of the CVD method include plasma-CVD, optical CVD, thermal CVD, and similar methods.

Furthermore, coating by an atmospheric pressure plasma method can be performed.

When using the wet coating method, the surface-treating agent of the present disclosure can be applied to the substrate surface after being diluted with a solvent. From the viewpoint of the stability of the composition of the present disclosure and the volatility of solvents, the following solvents are preferably used: perfluoroaliphatic hydrocarbons having 5 to 12 carbon atoms (such as perfluorohexane, perfluoromethylcyclohexane, and perfluoro-1,3-dimethylcyclohexane); polyfluoroaromatic hydrocarbons (such as bis (trifluoromethyl)benzene); polyfluoroaliphatic hydrocarbons (such as $C_6F_{13}CH_2CH_3$ (such as Asahiklin (registered trademark) AC-6000 manufactured by Asahi Glass Co., Ltd., and 1,1,2,2,3,3,4-heptafluorocyclopentane (such as Zeorora (registered trademark) H manufactured by Zeon Corporation)); alkyl perfluoroalkyl ethers (the perfluoroalkyl group and the alkyl group may be linear or branched) such as hydrofluoroether (HFE) (such as perfluoropropyl methyl ether ($C_3F_7OCH_3$) (such as Novec (trademark) 7000 manufactured by Sumitomo 3M Limited), perfluorobutyl methyl ether ($C_4F_9OCH_3$) (such as Novec (trademark) 7100 manufactured by Sumitomo 3M Limited), perfluorobutyl ethyl ether ($C_4F_9OC_2H_5$) (such as Novec (trademark) 7200 manufactured by Sumitomo 3M Limited), and perfluorohexyl methyl ether ($C_2F_5CF(OCH_3)C_3F_7$) (such as Novec (trademark) 7300 manufactured by Sumitomo 3M Limited), or $CF_3CH_2OCF_2CHF_2$(such as Asahiklin (registered trademark) AE-3000 manufactured by Asahi Glass Co., Ltd.)). One of these solvents may be used singly, or two or more may be used as a mixture. In particular, hydrofluoroether is preferable, and perfluorobutyl methyl ether ($C_4F_9OCH_3$) and/or perfluorobutyl ethyl ether ($C_4F_{90}C_2H_5$) is particularly preferable.

When using the dry coating method, the surface-treating agent of the present disclosure may be directly subjected to the dry coating method, or may be diluted with the above solvent before being subjected to the dry coating method.

A layer of the surface-treating agent is preferably formed such that the surface-treating agent of the present disclosure coexists in the layer with a catalyst for hydrolysis and dehydrative condensation. Conveniently, in the case of a wet coating method, the surface-treating agent of the present disclosure is diluted with a solvent, and then, immediately before application to the substrate surface, a catalyst may be added to the diluted solution of the surface-treating agent of the present disclosure. In the case of a dry coating method, the surface-treating agent of the present disclosure to which a catalyst has been added is directly used to a deposition (usually vacuum deposition) treatment, or a pellet-like material may be used to a deposition (usually vacuum deposition) treatment, wherein the pellets are obtained by impregnating a porous body of metal such as iron or copper with the surface-treating agent of the present disclosure to which the catalyst has been added.

Any suitable acid or base can be used as a catalyst. For example, acetic acid, formic acid, and trifluoroacetic acid can be used as the acid catalyst. For example, ammonia and organic amines can be used as the base catalyst.

In the above-described manner, a layer derived from the surface-treating agent of the present disclosure is formed on the substrate surface, and the article of the present disclosure is produced. The above layer thus obtained has both high surface lubricity and high friction durability. The above layer may have not only high friction durability but also have, depending on the compositional features of the surface-treating agent used, water-repellency, oil-repellency, antifouling property (for example, preventing fouling such as fingerprints from adhering), waterproof property (preventing water from penetrating into electronic components and the like), surface lubricity (or lubricity, such as wiping property for fouling including fingerprints and the like and excellent tactile sensations to the fingers), and the like, and may be suitably utilized as a functional thin film.

That is, the present disclosure further relates to an optical material having the surface-treating layer in the outermost layer.

The optical material preferably includes a wide variety of optical materials in addition to optical materials relating to displays and the like as exemplified below: for example, displays such as cathode ray tubes (CRTs; for example, PC monitors), liquid crystal displays, plasma displays, organic EL displays, inorganic thin-film EL dot matrix displays, rear projection displays, vacuum fluorescent displays (VFDs), field emission displays (FEDs); protective plates for such displays; and those obtained by performing an antireflection film treatment on their surfaces.

The article having a layer obtained according to the present disclosure may be, but is not limited to, an optical member. Examples of the optical member include lenses of glasses or the like; front surface protective plates, antireflection plates, polarizing plates, and anti-glare plates for displays such as PDPs and LCDs; touch panel sheets for devices such as mobile phones and personal digital assistants; disc surfaces of optical discs such as Blu-ray (registered trademark) discs, DVD discs, CD-Rs, and MOs; optical fibers; and display surfaces of watches and clocks.

The article having a layer obtained according to the present disclosure may be medical equipment or a medical material.

The thickness of the above layer is not limited. The thickness of the above layer in the case of an optical member is in the range of 1 to 50 nm, 1 to 30 nm, and preferably 1 to 15 nm, from the viewpoint of optical performance, surface lubricity, friction durability, and antifouling property.

The article obtained by using the fluoropolyether group-containing silane compound of the present disclosure typically as a surface-treating agent has been described in detail above. The application and the method for using the fluoropolyether group-containing silane compound of the present disclosure or the composition containing the fluoropolyether group-containing silane compound, as well as the method for producing the article, are not limited to those exemplified above.

The present disclosure provides the following embodiments.

[1]A fluoropolyether group-containing silane compound represented by the following formula (I):

(I)

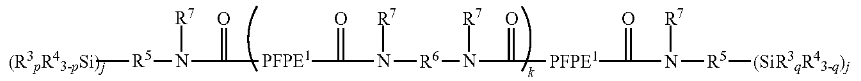

wherein $R^3$ is each independently at each occurrence a hydrogen atom or a monovalent organic group;

$R^4$ is each independently at each occurrence a hydroxyl group or a hydrolyzable group;

p is each independently at each occurrence an integer of 0 to 3, provided that, in at least one $SiR^3_pR^4_{3-p}$ in $(SiR^3_pR^4_{3-p})_j$, p is an integer of 0 to 2;

q is each independently at each occurrence an integer of 0 to 3, provided that, in at least one $SiR^3_qR^4_{3-q}$ in $(SiR^3_qR^4_{3-q})_j$, q is an integer of 0 to 2;

$R^5$ is each independently at each occurrence a (j+1)-valent organic group;

$R^6$ is each independently at each occurrence $—R^{16}—R^{15}—R^{17}—$;

$R^{15}$ is each independently at each occurrence a cycloalkylene-containing group;

$R^{16}$ is each independently at each occurrence a single bond or a divalent organic group;

$R^{17}$ is each independently at each occurrence a single bond or a divalent organic group;

$R^7$ is each independently at each occurrence a hydrogen atom or a $C_{1-20}$ alkyl group; $PFPE^1$ is each independently at each occurrence $—R^F\text{-}R^{FE}\_$;

$R^F$ is $—(C_fF_{2f})—$;

f is an integer of 1 to 10;

$R^{FE}$ is a divalent fluoropolyether group represented by formula:

$$(OCF_2)_{a1}—(OC_2F_4)_{a2}—(OC_3X^{10}_6)_{a3}—(OC_4F_8)_{a4}—(OC_5F_{10})_{a5}—(OC_6F_{12})_{a6}—(OC_7F_{14})_{a7}—(OC_8F_{16})_{a8}—$$

wherein a1, a2, a3, a4, a5, a6, a7, and a8 are each independently an integer of 0 to 200 and the sum of a1, a2, a3, a4, a5, a6, a7, and a8 is at least 5, the occurrence order of the respective repeating units enclosed in parentheses provided with the subscript a1, a2, a3, a4, a5, a6, a7, or a8 is not limited in the formula, and $X^{10}$ is each independently at each occurrence a hydrogen atom, a fluorine atom, or a chlorine atom, provided that at least one of a1, a2, a4, a5, a6, a7, and a8 is an integer of 1 or more when all $X^{10}$ is a hydrogen atom or a chlorine atom;

j is independently at each occurrence an integer of 1 to 9; and k is an integer of 1 or more.

[2] The fluoropolyether group-containing silane compound according to [1], wherein $R^{15}$ is each independently at each occurrence a group containing a monocyclic, bicyclic, or tricyclic cycloalkylene group having 5 to 12 carbon atoms;

$R^{16}$ is each independently at each occurrence a single bond or a $C_{1-6}$ alkylene group; and $R^{17}$ is each independently at each occurrence a single bond or a $C_{1-6}$ alkylene group.

[3] The fluoropolyether group-containing silane compound according to [1] or [2], wherein $R^6$ is a group selected from the following groups in which a hydrogen atom in the ring is optionally substituted:

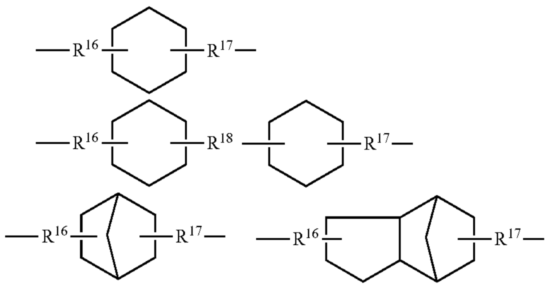

wherein $R^{16}$ is each independently at each occurrence a single bond or a $C_{1-6}$ alkylene group;

$R^{17}$ is each independently at each occurrence a single bond or a $C_{1-6}$ alkylene group; and $R^{18}$ is each independently at each occurrence a $C_{1-6}$ alkylene group.

[4] The fluoropolyether group-containing silane compound according to any one of [1] to [3], wherein $X^{10}$ is a fluorine atom.

[5] The fluoropolyether group-containing silane compound according to any one of [1] to [4], wherein $R^{FE}$ is each independently at each occurrence a group represented by the following formula (f1), (f2), (f3), (f4), or (f5):

$$(OC_3F_6)_{a3}—(OC_2F_4)_{a2}— \quad (f1)$$

wherein a3 is an integer of 5 to 200 and a2 is 0 or 1;

$$(OC_4F_8)_{a4}—(OC_3F_6)_{a3}—(OC_2F_4)_{a2}—(OCF_2)_{a1}— \quad (f2)$$

wherein a3 and a4 are each independently an integer of 0 to 30, a1 and a2 are each independently an integer of 1 to 200, the sum of a1, a2, a3, and a4 is an integer of 10 to 200, and the occurrence order of the respective repeating units enclosed in parentheses provided with the subscript a1, a2, a3, or a4 is not limited in the formula;

$$—(R^{16}—R^{17})_g— \quad (f3)$$

wherein $R^{16}$ is $OCF_2$ or $OC_2F_4$, $R^{17}$ is a group selected from $OC_2F_4$, $OC_3F_6$, $OC_4F_8$, $OC_5F_{10}$, and $OC_6F_{12}$, or alternatively a combination of two or three groups selected from these groups, and g is an integer of 2 to 100;

$$(OC_6F_{12})_{a6}—(OC_5F_{10})_{a5}—(OC_4F_8)_{a4}—(OC_3F_6)_{a3}—(OC_2F_4)_{a2}—(OCF_2)_{a1}— \quad (f4)$$

wherein a2 is an integer of 1 to 200, a1, a3, a4, a5, and a6 are each independently an integer of 0 to 200, the sum of a1, a2, a3, a4, a5, and a6 is at least 5, and the occurrence order of the respective repeating units enclosed in parentheses provided with a1, a2, a3, a4, a5, or a6 is not limited in the formula; or $$-(OC_6F_{12})_{a6}-(OC_5F_{10})_{a5}-(OC_4F_8)_{a4}-(OC_3F_6)_{a3}-(OC_2F_4)_{a2}-(OCF_2)_{a1}- \quad (f5)$$

wherein a1 is an integer of 1 to 200, a2, a3, a4, a5, and a6 are each independently an integer of 0 to 200, the sum of a1, a2, a3, a4, a5, and a6 is at least 5, and the occurrence order of the respective repeating units enclosed in parentheses provided with a1, a2, a3, a4, a5, or a6 is not limited in the formula.

[6] The fluoropolyether group-containing silane compound according to any one of [1] to [5], wherein $R^7$ is a hydrogen atom.

[7] The fluoropolyether group-containing silane compound according to any one of [1] to [6], wherein $R^5$ is a divalent organic group and j is 1.

[8] The fluoropolyether group-containing silane compound according to any one of [1] to [7], wherein $R^5$ is a $C_{1-6}$ alkylene group and j is 1.

[9] The fluoropolyether group-containing silane compound according to any one of [1] to [8], which is represented by formula (A), (B), (C), or (D):

β1 is an integer of 1 to 9;

$X^5$ is each independently a di- to decavalent organic group;

γ1 is an integer of 1 to 9;

$R^a$ is each independently at each occurrence $-Z^3-SiR^{71}_{p1}R^{72}_{q1}R^{73}_{r1}$;

$Z^3$ is each independently at each occurrence an oxygen atom or a divalent organic group;

$R^{71}$ is each independently at each occurrence $R^{a'}$;

$R^{a'}$ is the same as defined in $R^a$;

the number of Si atoms linearly connected via the $Z^3$ group in $R^a$ is at most 5;

$R^{72}$ is each independently at each occurrence a hydroxyl group or a hydrolyzable group;

$R^{73}$ is each independently at each occurrence a hydrogen atom or a lower alkyl group;

p1 is each independently at each occurrence an integer of 0 to 3, q1 is each independently at each occurrence an integer of 0 to 3, and r1 is each independently at each occurrence an integer of 0 to 3, provided that the sum of p1, q1, and r1 is 3 in each $(-Z^3-SiR^{71}_{p1}R^{72}_{q1}R^{73}_{r1})$;

(A)

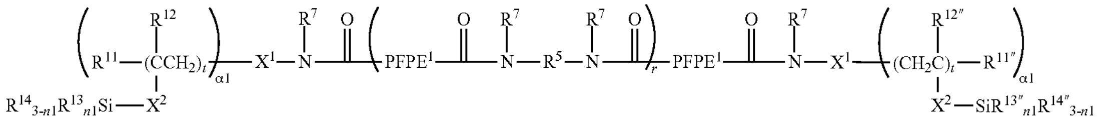

(B)

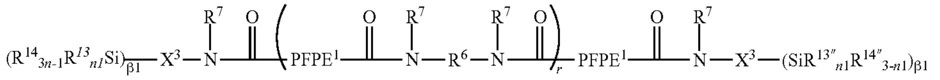

(C)

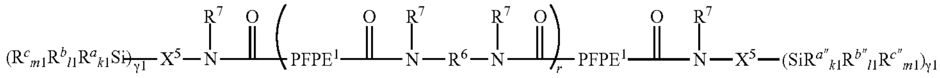

(D)

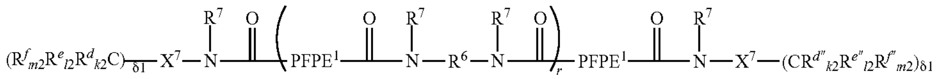

wherein $R^{11}$ and $R^{11''}$ are each independently at each occurrence a hydrogen atom or a halogen atom;

$R^{12}$ and $R^{12''}$ are each independently at each occurrence a hydrogen atom or a lower alkyl group;

$R^{13}$ and $R^{13''}$ are each independently at each occurrence a hydroxyl group or a hydrolyzable group;

$R^{14}$ and $R^{14''}$ are each independently at each occurrence a hydrogen atom or an alkyl group having 1 to 22 carbon atoms;

$X^2$ is each independently at each occurrence a single bond or a divalent organic group;

n1 is an integer of 0 to 3 independently in each $(-SiR^{13}_{n1}R^{14}_{3-n1})$ unit or in each $(-SiR^{13''}_{n1}R^{14''}_{3-n1})$ unit;

$X^1$ is each independently a single bond or di- to decavalent organic group connected to the amide bond;

t is each independently an integer of 1 to 10;

α1 is an integer of 1 to 9;

$X^3$ is each independently a di- to decavalent organic group;

$R^{a''}$ is each independently at each occurrence $-Z^3-SiR^{71}_{p1}R^{72''}_{q1}R^{73}_{r1}$;

$Z^3$, $R^{71}$, $R^{73}$, p1, q1, and r1 are the same as defined above;

$R^{72''}$ is the same as defined in $R^{72}$;

$R^b$ and $R^{b''}$ are each independently at each occurrence a hydroxyl group or a hydrolyzable group;

$R^c$ and $R^{c''}$ are each independently at each occurrence a hydrogen atom or a lower alkyl group;

k1 is each independently at each occurrence an integer of 0 to 3, l1 is each independently at each occurrence an integer of 0 to 3, and m1 is each independently at each occurrence an integer of 0 to 3, provided that the sum of k1, l1, and m1 is 3 in each $(SiR^a_{k1}R^b_{l1}R^c_{m1})$ or in each $(SiR^{a''}_{k1}R^{b''}_{l1}R^{c''}_{m1})$;

$X^7$ is each independently a di- to decavalent organic group;

δ1 is an integer of 1 to 9;

$R^d$ is each independently at each occurrence $-Z^4-CR^{81}_{p2}R^{82}_{q2}R^{83}_{r2}$;

$Z^4$ is each independently at each occurrence an oxygen atom or a divalent organic group;

$R^{81}$ is each independently at each occurrence $R^{d'}$;

$R^{d'}$ is the same as defined in $R^d$;

$R^{82}$ is each independently at each occurrence $—Y—SiR^{85}_{n2}R^{86}_{3-n2}$;

Y is each independently at each occurrence a divalent organic group;

$R^{85}$ is each independently at each occurrence a hydroxyl group or a hydrolyzable group;

$R^{86}$ is each independently at each occurrence a hydrogen atom or a lower alkyl group;

n2 is an integer of 0 to 3 independently in each $(—Y—SiR^{85}_{n2}R^{86}_{3-n2})$ unit or in each $(—Y—SiR^{85''}_{n2}R^{86''}_{3-n2})$ unit;

$R^{83}$ is each independently at each occurrence a hydrogen atom, a hydroxyl group, or a lower alkyl group;

p2 is each independently at each occurrence an integer of 0 to 3, q2 is each independently at each occurrence an integer of 0 to 3, and r2 is each independently at each occurrence an integer of 0 to 3, provided that the sum of p2, q2, and r2 is 3 in each $(—Z^4—CR^{81}_{p2}R^{82}_{q2}R^{83}_{r2})$ or in each $(—Z^4—CR^{81}_{p2}R^{82''}_{q2}R^{83}_{r2})$;

$R^{d''}$ is each independently at each occurrence $—Z^4—CR^{81}_{p2}R^{82''}_{q2}R^{83}_{r2}$;

$R^{82''}$ is each independently at each occurrence $—Y—SiR^{85''}_{n2}R^{86''}_{3-n2}$;

$R^{85''}$ and $R^{86''}$ are the same as defined in $R^{85}$ and $R^{86}$, respectively;

$R^e$ is each independently at each occurrence $—Y—SiR^{85}_{n2}R^{86}_{3-n2}$; $R^{e''}$ is each independently at each occurrence $—Y—SiR^{85''}_{n2}R^{86''}_{3-n2}$;

$R^f$ and $R^{f''}$ are each independently at each occurrence a hydrogen atom, a hydroxyl group, or a lower alkyl group;

k2 is each independently at each occurrence an integer of 0 to 3, l2 is each independently at each occurrence an integer of 0 to 3, and m2 is each independently at each occurrence an integer of 0 to 3, provided that the sum of k2, l2, and m2 is 3;

$R^6$ is each independently at each occurrence $—R^{16}—R^{15}—R^{17}—$;

$R^{15}$ is each independently at each occurrence a cycloalkylene-containing group;

$R^{16}$ is each independently at each occurrence a single bond or a divalent organic group;

$R^{17}$ is each independently at each occurrence a single bond or a divalent organic group;

$R^7$ is each independently at each occurrence a hydrogen atom or a $C_{1-20}$ alkyl group;

$PFPE^1$ is each independently at each occurrence $—R^F—R^{FE}—$;

$R^F$ is $—(C_fF_{2f})—$;

f is an integer of 1 to 10;

$R^{FE}$ is a divalent fluoropolyether group represented by formula:

$$(OCF_2)_{a1}—(OC_2F_4)_{a2}—(OC_3X^{10}{}_6)_{a3}—(OC_4F_8)_{a4}—(OC_5F_{10})_{a5}—(OC_6F_{12})_{a6}—(OC_7F_{14})_{a7}—(OC_8F_{16})_{a8}—$$

wherein a1, a2, a3, a4, a5, a6, a7, and a8 are each independently an integer of 0 to 200 and the sum of a1, a2, a3, a4, a5, a6, a7, and a8 is at least 5, the occurrence order of the respective repeating units enclosed in parentheses provided with the subscript a1, a2, a3, a4, a5, a6, a7, or a8 is not limited in the formula, and $X^{10}$ is each independently at each occurrence a hydrogen atom, a fluorine atom, or a chlorine atom, provided that at least one of a1, a2, a4, a5, a6, a7, and a8 is an integer of 1 or more when all $X^{10}$ is a hydrogen atom or a chlorine atom; and r is an integer of 1 or more.

[10]A surface-treating agent comprising the fluoropolyether group-containing silane compound according to any one of [1] to [9].

[11] The surface-treating agent according to [10], further comprising one or more other components selected from a fluorine-containing oil, a silicone oil, and a catalyst.

[12] The surface-treating agent according to [10] or [11], further comprising a solvent.

[13] The surface-treating agent according to any one of [10] to [12], which is used as an antifouling coating agent or a water-proof coating agent.

[14] An article comprising a substrate and a layer on a surface of the substrate, wherein the layer is formed of the fluoropolyether group-containing silane compound according to any one of [1] to [9] or the surface-treating agent according to any one of [10] to [13].

[15] The article according to [14], which is an optical member.

EXAMPLES

The surface-treating agent of the present invention will be described more specifically through the following Examples, but the present invention is not limited to these Examples. In the Examples, all chemical formulae shown below indicate average compositional features, and the occurrence order of the respective repeating units forming perfluoropolyether is arbitrary.

Example 1

20 g of a PFPE-modified ester, represented by average compositional features of $CH_3OCO—CF_2—(OCF_2)_{29}—(OCF_2CF_2)_{17}—OCF_2—COOCH_3$, and 10 g of 1,3-bis(trifluoromethyl)benzene were added into a 50 mL four-neck flask equipped with a reflux condenser, a thermometer, and a stirrer, and under nitrogen gas stream, 0.53 mL of 1-amino-3-aminomethyl-3,5,5-trimethylcyclohexane was added using a dropping funnel, and the mixture was stirred at 25° C. for 1 hour. Subsequently, 1.0 mL of 3-aminopropyltrimethoxysilane was added, and the mixture was then stirred at 25° C. for 1 hour. Thereafter, by removing the volatile substances under reduced pressure, a PFPE-containing silane compound (A) represented by the following formula was obtained.

PFPE-containing silane compound (A) $(CH_3O)_3Si—CH_2CH_2CH_2—NHCO—CF_2—(OCF_2)_{29}—(OCF_2CF_2)_{17}—OCF_2—CONH—R—NHCO—CF_2—(OCF_2)_{29}—(OCF_2CF_2)_{17}—OCF_2—CONH—CH_2CH_2CH_2—Si(OCH_3)_3$ In the formula, R is a group represented by the following formula.

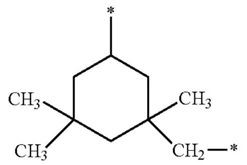 [SMILES: *CC1(C)CC(*)CC(C)(C)C1]

Note that a compound having $CF_3O$— at one end was present in an amount of 4.8%. In addition, a minute amount of $(CH_3O)_3Si$—$CH_2CH_2CH_2$—NHCO—{$CF_2$—$(OCF_2)_{29}$—$(OCF_2CF_2)_{17}$—$OCF_2$—CONH—R—NHCO}$_n$—$CF_2$—$(OCF_2)_{29}$—$(OCF_2CF_2)_{17}$—$OCF_2$—CONH—$CH_2CH_2CH_2$—$Si(OCH_3)_3$ (n is 0 or 2) was observed as a byproduct.

Example 2

20 g of a PFPE-modified ester, represented by average compositional features of $CH_3OCO$—$CF_2$—$(OCF_2)_{29}$—$(OCF_2CF_2)_{17}$—$OCF_2$—$COOCH_3$, and 10 g of 1,3-bis(trifluoromethyl)benzene were added into a 50 mL four-neck flask equipped with a reflux condenser, a thermometer, and a stirrer, and under nitrogen gas stream, 0.61 g of 4,4'-methylenebis(cyclohexylamine) was added using a dropping funnel, and the mixture was stirred at 25° C. for 1 hour. Subsequently, 1.0 mL of 3-aminopropyltrimethoxysilane was added and the mixture was then stirred at 25° C. for 1 hour. Thereafter, by removing the volatile substances under reduced pressure, a PFPE-containing silane compound (B) represented by the following formula was obtained.

PFPE-containing silane compound (B) $(CH_3O)_3Si$—$CH_2CH_2CH_2$—NHCO—$CF_2$—$(OCF_2)_{29}$—$(OCF_2CF_2)_{17}$—$OCF_2$—CONH—R—NHCO—$CF_2$—$(OCF_2)_{29}$—$(OCF_2CF_2)_{17}$—$OCF_2$—CONH—$CH_2CH_2CH_2$—$Si(OCH_3)_3$ In the formula, R is a group represented by the formula below.

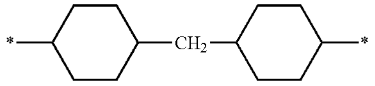 [SMILES: *C1CCC(CC2CCC(*)CC2)CC1]

Note that a compound with $CF_3O$— at one end was present in an amount of 4.8%. In addition, as a byproduct, a minute amount of $(CH_3O)_3Si$—$CH_2CH_2CH_2$—NHCO—{$CF_2$—$(OCF_2)_{29}$—$(OCF_2CF_2)_{17}$—$OCF_2$—CONH—R—NHCO}$_n$—$CF_2$—$(OCF_2)_{29}$—$(OCF_2CF_2)_{17}$—$OCF_2$—CONH—$CH_2CH_2CH_2$—$Si(OCH_3)_3$ (n is 0 or 2) was observed.

Example 3

20 g of a PFPE-modified ester, represented by average compositional features of $CH_3OCO$—$CF_2$—$(OCF_2)_{29}$—$(OCF_2CF_2)_{17}$—$OCF_2$—$COOCH_3$, and 10 g of 1,3-bis(trifluoromethyl)benzene were added into a 50 mL four-neck flask equipped with a reflux condenser, a thermometer, and a stirrer, and under nitrogen gas stream, 0.70 g of 4,4'-methylenebis(2-methylcyclohexylamine) was added using a dropping funnel, and the mixture was stirred at 25° C. for 1 hour. Next, 1.0 mL of 3-aminopropyltrimethoxysilane was added, and the mixture was then stirred at 25° C. for 1 hour. Thereafter, by removing the volatile substances under reduced pressure, a PFPE-containing silane compound (C) represented by the following formula was obtained.

PFPE-containing silane compound (C) $(CH_3O)_3Si$—$CH_2CH_2CH_2$—NHCO—$CF_2$—$(OCF_2)_{29}$—$(OCF_2CF_2)_{17}$—$OCF_2$—CONH—R—NHCO—$CF_2$—$(OCF_2)_{29}$—$(OCF_2CF_2)_{17}$—$OCF_2$—CONH—$CH_2CH_2CH_2$—$Si(OCH_3)_3$ In the formula, R is a group represented by the following formula.

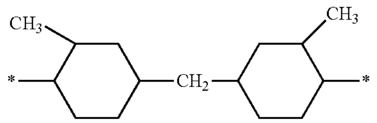 [SMILES: *C1CCC(CC2CCC(*)C(C)C2)CC1C]

A compound having $CF_3O$— at one end was present in an amount of 4.8%. Also, a minute amount of $(CH_3O)_3Si$—$CH_2CH_2CH_2$—NHCO—{$CF_2$—$(OCF_2)_{29}$—$(OCF_2CF_2)_{17}$—$OCF_2$—CONH—R—NHCO}$_n$—$CF_2$—$(OCF_2)_{29}$—$(OCF_2CF_2)_{17}$-$OCF_2$—CONH—$CH_2CH_2CH_2$—$Si(OCH_3)_3$ (n is 0 or 2) was observed as a byproduct.

Comparative Example 1

20 g of a PFPE-modified ester, represented by average compositional features of $CH_3OCO$—$CF_2$—$(OCF_2)_{29}$—$(OCF_2CF_2)_{17}$—$OCF_2$—$COOCH_3$, and 10 g of 1,3-bis(trifluoromethyl)benzene were added into a 50 mL four-neck flask equipped with a reflux condenser, a thermometer, and a stirrer, and under nitrogen gas stream, 0.40 g of p-xylylenediamine was added using a dropping funnel, and the mixture was stirred at 25° C. for 1 hour. Next, 1.0 mL of 3-aminopropyltrimethoxysilane was added and the mixture was then stirred at 25° C. for 1 hour. Thereafter, by removing the volatile substances under reduced pressure, a PFPE-containing silane compound (D) represented by the following formula was obtained.

PFPE-containing silane compound (D) $(CH_3O)_3Si$—$CH_2CH_2CH_2$—NHCO—$CF_2$—$(OCF_2)_{29}$—$(OCF_2CF_2)_{17}$—$OCF_2$—CONH—R—NHCO—$CF_2$—$(OCF_2)_{29}$—$(OCF_2CF_2)_{17}$—$OCF_2$—CONH—$CH_2CH_2CH_2$—$Si(OCH_3)_3$ In the formula, R is a group represented by the formula below.

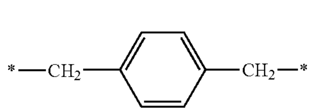 [SMILES: *Cc1ccc(C*)cc1]

A compound with $CF_3O$— at one end was present in an amount of 4.8%. Also, as a byproduct, a minute amount of $(CH_3O)_3Si$—$CH_2CH_2CH_2$—NHCO—{$CF_2$—$(OCF_2)_{29}$—$(OCF_2CF_2)_{17}$—$OCF_2$—CONH—R—NHCO}$_n$—$CF_2$—$(OCF_2)_{29}$—$(OCF_2CF_2)_{17}$—$OCF_2$—CONH—$CH_2CH_2CH_2$—$Si(OCH_3)_3$ (n is 0 or 2) was observed.

Comparative Example 2

20 g of a PFPE-modified ester, represented by average compositional features of $CH_3OCO$—$CF_2$—$(OCF_2)_{29}$—$(OCF_2CF_2)_{17}$—$OCF_2$—$COOCH_3$, and 10 g of 1,3-bis(trifluoromethyl)benzene were added into a 50 mL four-neck flask equipped with a reflux condenser, a thermometer, and a stirrer, and under nitrogen gas stream, 0.33 g of 2,5-dimethylpiperazine was added using a dropping funnel, and the mixture was stirred at 70° C. for 16 hours. Subsequently, the reaction solution was cooled to 25° C., and after adding 1.0 mL of 3-aminopropyltrimethoxysilane, the mixture was stirred at 25° C. for 1 hour. Thereafter, by removing the volatile substances under reduced pressure, a PFPE-containing silane compound (E) represented by the following formula was obtained.

PFPE-containing silane compound (E) $(CH_3O)_3Si—CH_2CH_2CH_2—NHCO—CF_2—(OCF_2)_{29}—(OCF_2CF_2)_{17}—OCF_2—R—CF_2—(OCF_2)_{29}—(OCF_2CF_2)_{17}—OCF_2—CONH—CH_2CH_2CH_2—Si(OCH_3)_3$ In the formula, R is a group represented by the following formula.

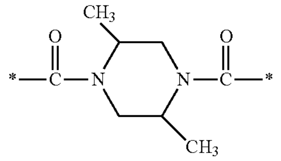

Note that a compound having $CF_3O—$ at one end was present in an amount of 4.8%. Also, as a byproduct, a minute amount of $(CH_3O)_3Si—CH_2CH_2CH_2—NHCO—\{CF_2—(OCF_2)_{29}—(OCF_2CF_2)_{17}—OCF_2—R\}_n—CF_2—(OCF_2)_{29}—(OCF_2CF_2)_{17}—OCF_2—CONH—CH_2CH_2CH_2—Si(OCH_3)_3$ (n is 0 or 2) was observed.

(Evaluation)

(Preparation of Surface-Treating Agent)

The perfluoropolyether group-containing silane compounds obtained in the above Examples 1 to 3 and Comparative Examples 1 to 2 were dissolved in Novec 7200 (manufactured by 3M Limited) so as to have a concentration of 20 wt %, and thus surface-treating agents 1 to 5 were prepared.

(Formation of Surface-Treating Layer)

The surface-treating agents 1 to 6 prepared as described above were each vacuum-deposited on a chemically tempered glass ("Gorilla" glass, manufactured by Corning Incorporated, thickness 0.7 mm). The conditions of the vacuum deposition method were as follows: resistive heating deposition machine (manufactured by Shincron Co., Ltd.), chamber size 1,900 mmφ, degree of vacuum 5.0E-05, current value 240 A, voltage 10 V, and substrate temperature 40° C. Next, the chemically tempered glass with a deposited film was left to stand in an atmosphere at a temperature of 150° C. for 30 minutes, and then allowed to cool to room temperature to form a surface-treating layer on the glass substrate.

<Eraser Abrasion Resistance Test after Exposure to Constant Temperature and Humidity>

The glass that had been subjected to surface treatment as described above was exposed to an environment of 40° C./80% RH for 300 hours. Specifically, the low temperature thermo-hygrostat tester TPAV-210-20, manufactured by ISUZU CAP, was used, and the surface-treated glass was placed horizontally in the chamber set at 40° C./80% RH and allowed to stand for 300 hours. Thereafter, using a rubbing tester (manufactured by Shinto Scientific Co., Ltd.), the water resistance contact angle was measured every 250 rubs under the following conditions, and the test was continued until the angle became less than 100°. The test environment conditions were 40° C. and a humidity of 90% RH. The results are shown in Table 1 below.

Eraser: Raber Eraser (manufactured by Minoan)
Contact area: 6 mmφ
Moving distance (one way): 30 mm
Moving speed: 3,600 mm/min
Load: 1 kg/6 mmφ

<Marker-Repellency Test>

For the surface of the glass prepared as described above, the marker-repellency was examined. Specifically, on the surface-treated glass, a straight line with a line thickness of 1 cm×length of 10 cm was drawn with a marker, and then the surface was observed after being wiped 10 times using KimWipes with a load of 1 kg. The evaluation results are shown in Table 1 according to the following criteria: Good if ink is removed after wiping, Fair if some ink remains, and Poor if ink remains completely. The marker used was the Mckee extra fine oil-based marker manufactured by ZEBRA Co., Ltd.

TABLE 1

| | Eraser resistance (number of times) | Marker-repellency |
|---|---|---|
| Example 1 | 1750 | Good |
| Example 2 | 2000 | Good |
| Example 3 | 2000 | Good |
| Comparative Example 1 | 750 | Fair |
| Comparative Example 2 | 1000 | Fair |

INDUSTRIAL APPLICABILITY

The fluoropolyether group-containing silane compound of the present disclosure can be suitably utilized to form a surface-treating layer on the surface of a variety of substrates.

What is claimed is:

1. A fluoropolyether group-containing silane compound represented by the following formula (I):

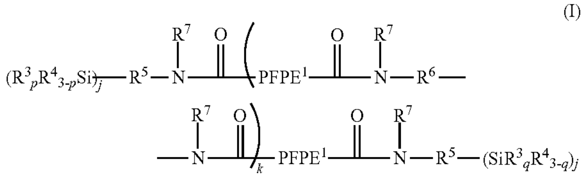

(I)

wherein $R^3$ is each independently at each occurrence a hydrogen atom or a monovalent organic group;

$R^4$ is each independently at each occurrence a hydroxyl group or a hydrolyzable group;

p is each independently at each occurrence an integer of 0 to 3, provided that, in at least one $SiR^3_pR^4_{3-p}$ in $(SiR^3_pR^4_{3-p})_j$, p is an integer of 0 to 2;

q is each independently at each occurrence an integer of 0 to 3, provided that, in at least one $SiR^3_qR^4_{3-q}$ in $(SiR^3_qR^4_{3-q})_j$, q is an integer of 0 to 2;

$R^5$ is each independently at each occurrence a (j+1)-valent organic group;

$R^6$ is each independently at each occurrence $—R^{16}—R^{15}—R^{17}—$;

$R^{15}$ is each independently at each occurrence a cycloalkylene-containing group;

$R^{16}$ is each independently at each occurrence a single bond or a divalent organic group;

$R^{17}$ is each independently at each occurrence a single bond or a divalent organic group;

$R^7$ is each independently at each occurrence a hydrogen atom or a $C_{1-20}$ alkyl group;

$PFPE^1$ is each independently at each occurrence $—R^F—R^{FE}$;

$R^F$ is $—(C_fF_{2f})—$;

f is an integer of 1 to 10;

$R^{FE}$ is a divalent fluoropolyether group represented by formula:

$$—(OCF_2)_{a1}—(OC_2F_4)_{a2}—(OC_3X^{10}{}_6)_{a3}—(OC_4F_8)_{a4}—(OC_5F_{10})_{a5}—(OCF_{12})_{a6}—(OC_7F_{14})_{a7}—(OC_8F_{16})_{a8}—$$

wherein a1, a2, a3, a4, a5, a6, a7, and a8 are each independently an integer of 0 to 200 and the sum of a1, a2, a3, a4, a5, a6, a7, and a8 is at least 5, the occurrence order of the respective repeating units enclosed in parentheses provided with the subscript a1, a2, a3, a4, a5, a6, a7, or a8 is not limited in the formula, and $X^{10}$ is each independently at each occurrence a hydrogen atom, a fluorine atom, or a chlorine atom, provided that at least one of a1, a2, a4, a5, a6, a7, and a8 is an integer of 1 or more when all $X^{10}$ is a hydrogen atom or a chlorine atom;

j is independently at each occurrence an integer of 1 to 9; and k is an integer of 1 or more.

2. The fluoropolyether group-containing silane compound according to claim 1, wherein $R^{15}$ is each independently at each occurrence a group containing a monocyclic, bicyclic, or tricyclic cycloalkylene group having 5 to 12 carbon atoms;

$R^{16}$ is each independently at each occurrence a single bond or a $C_{1-6}$ alkylene group; and $R^{17}$ is each independently at each occurrence a single bond or a $C_{1-6}$ alkylene group.

3. The fluoropolyether group-containing silane compound according to claim 1, wherein $R^6$ is a group selected from the following groups in which a hydrogen atom in the ring is optionally substituted:

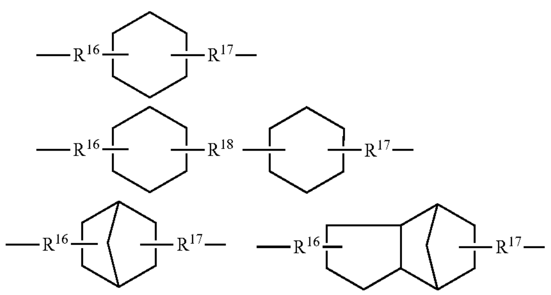

wherein $R^{16}$ is each independently at each occurrence a single bond or a $C_{1-6}$ alkylene group;

$R^{17}$ is each independently at each occurrence a single bond or a $C_{1-6}$ alkylene group; and $R^{18}$ is each independently at each occurrence a $C_{1-6}$ alkylene group.

4. The fluoropolyether group-containing silane compound according claim 1, wherein $X^{10}$ is a fluorine atom.

5. The fluoropolyether group-containing silane compound according to claim 1, wherein $R^{FE}$ is each independently at each occurrence a group represented by the following formula (f1), (f2), (13), (f4), or (f5):

$$—(OC_3F_6)_{a3}—(OC_2F_4)_{a2}— \quad (f1)$$

wherein a3 is an integer of 5 to 200 and a2 is 0 or 1;

$$—(OC_4F_8)_{a4}—(OC_3F_6)_{a3}—(OC_2F_4)_{a2}—(OCF_2)_{a1}— \quad (f2)$$

wherein a3 and a4 are each independently an integer of 0 to 30, a1 and a2 are each independently an integer of 1 to 200, the sum of a1, a2, a3, and a4 is an integer of 10 to 200, and the occurrence order of the respective repeating units enclosed in parentheses provided with the subscript a1, a2, a3, or a4 is not limited in the formula;

$$—(R^{16}—R^{17})_g— \quad (f3)$$

wherein $R^{16}$ is $OCF_2$ or $OC_2F_4$, $R^{17}$ is a group selected from $OC_2F_4$, $OC_3F_6$, $OC_4F_8$, $OC_5F_{10}$, and $OC_6F_{12}$, or alternatively a combination of two or three groups selected from these groups, and g is an integer of 2 to 100;

$$—(OC_6F_{12})_{a6}—(OC_5F_{10})_{a5}—(OC_4F_8)_{a4}—(OC_3F_6)_{a3}—(OC_2F_4)_{a2}—(OCF_2)_{a1}— \quad (f4)$$

wherein a2 is an integer of 1 to 200, a1, a3, a4, a5, and a6 are each independently an integer of 0 to 200, the sum of a1, a2, a3, a4, a5, and a6 is at least 5, and the occurrence order of the respective repeating units enclosed in parentheses provided with a1, a2, a3, a4, a5, or a6 is not limited in the formula; or $$—(OC_6F_{12})_{a6}—(OC_5F_{10})_{a5}—(OC_4F_8)_{a4}—(OC_3F_6)_{a3}—(OC_2F_4)_{a2}—(OCF_2)_{a1}— \quad (f5)$$

wherein a1 is an integer of 1 to 200, a2, a3, a4, a5, and a6 are each independently an integer of 0 to 200, the sum of a1, a2, a3, a4, a5, and a6 is at least 5, and the occurrence order of the respective repeating units enclosed in parentheses provided with a1, a2, a3, a4, a5, or a6 is not limited in the formula.

6. The fluoropolyether group-containing silane compound according to claim 1, wherein $R^7$ is a hydrogen atom.

7. The fluoropolyether group-containing silane compound according to claim 1, wherein $R^5$ is a divalent organic group and j is 1.

8. The fluoropolyether group-containing silane compound according to claim 1, wherein $R^5$ is a $C_{1-6}$ alkylene group and j is 1.

9. The fluoropolyether group-containing silane compound according to claim 1, which is represented by formula (A), (B), (C), or (D):

(A)

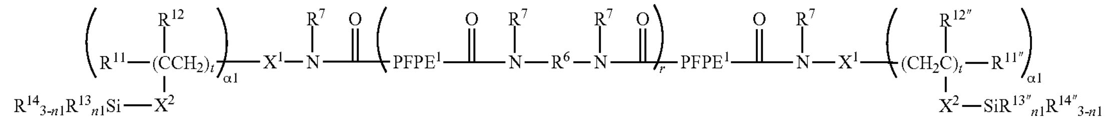

(B)

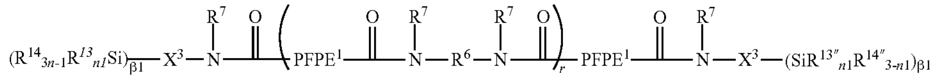

(C)

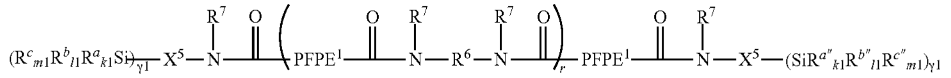

(D)

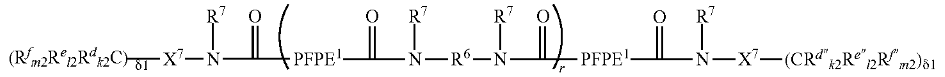

wherein $R^{11}$ and $R^{11''}$ are each independently at each occurrence a hydrogen atom or a halogen atom;

$R^{12}$ and $R^{12''}$ are each independently at each occurrence a hydrogen atom or a lower alkyl group;

$R^{13}$ and $R^{13''}$ are each independently at each occurrence a hydroxyl group or a hydrolyzable group;

$R^{14}$ and $R^{14''}$ are each independently at each occurrence a hydrogen atom or an alkyl group having 1 to 22 carbon atoms;

$X^2$ is each independently at each occurrence a single bond or a divalent organic group;

n1 is an integer of 0 to 3 independently in each ($—SiR^{13}_{n1}R^{14}_{3-n1}$) unit or in each ($—SiR^{13''}_{n1}R^{14''}_{3-n1}$) unit;

$X^1$ is each independently a single bond or di- to decavalent organic group connected to the amide bond;

t is each independently an integer of 1 to 10;

α1 is an integer of 1 to 9;

$X^3$ is each independently a di- to decavalent organic group;

β1 is an integer of 1 to 9;

$X^5$ is each independently a di- to decavalent organic group;

γ1 is an integer of 1 to 9;

$R^a$ is each independently at each occurrence $—Z^3—SiR^{71}_{p1}R^{72}_{q1}R^{73}_{r1}$;

$Z^3$ is each independently at each occurrence an oxygen atom or a divalent organic group;

$R^{71}$ is each independently at each occurrence $R^{a'}$;

$R^{a'}$ is the same as defined in $R^a$;

the number of Si atoms linearly connected via the $Z^3$ group in $R^a$ is at most 5;

$R^{72}$ is each independently at each occurrence a hydroxyl group or a hydrolyzable group;

$R^{73}$ is each independently at each occurrence a hydrogen atom or a lower alkyl group;

p1 is each independently at each occurrence an integer of 0 to 3, q1 is each independently at each occurrence an integer of 0 to 3, and r1 is each independently at each occurrence an integer of 0 to 3, provided that the sum of p1, q1, and r1 is 3 in each ($—Z^3—SiR^{71}_{p1}R^{72}_{q1}R^{73}_{r1}$);

$R^{a''}$ is each independently at each occurrence $—Z^3—SiR^{71}_{p1}R^{72''}_{q1}R^{73}_{r1}$;

$Z^3$, $R^{71}$, $R^{73}$, p1, q1, and r1 are the same as defined above;

$R^{72''}$ is the same as defined in $R^{72}$;

$R^b$ and $R^{b''}$ are each independently at each occurrence a hydroxyl group or a hydrolyzable group;

$R^c$ and $R^{c''}$ are each independently at each occurrence a hydrogen atom or a lower alkyl group;

k1 is each independently at each occurrence an integer of 0 to 3, l1 is each independently at each occurrence an integer of 0 to 3, and m1 is each independently at each occurrence an integer of 0 to 3, provided that the sum of k1, l1, and m1 is 3 in each ($SiR^a_{k1}R^b_{l1}R^c_{m1}$) or in each ($SiR^{a''}_{k1}R^{b''}_{l1}R^{c''}_{m1}$);

$X^7$ is each independently a di- to decavalent organic group;

δ1 is an integer of 1 to 9;

$R^d$ is each independently at each occurrence $—Z^4—CR^{81}_{p2}R^{82}_{q2}R^{83}_{r2}$;

$Z^4$ is each independently at each occurrence an oxygen atom or a divalent organic group;

$R^{81}$ is each independently at each occurrence $R^{d'}$;

$R^{d'}$ is the same as defined in $R^d$;

$R^{82}$ is each independently at each occurrence $—Y—SiR^{85}_{n2}R^{86}_{3-n2}$;

Y is each independently at each occurrence a divalent organic group;

$R^{85}$ is each independently at each occurrence a hydroxyl group or a hydrolyzable group;

$R^{86}$ is each independently at each occurrence a hydrogen atom or a lower alkyl group;

n2 is an integer of 0 to 3 independently in each ($—Y—SiR^{85}_{n2}R^{86}_{3-n2}$) unit or in each ($—Y—SiR^{85''}_{n2}R^{86}_{3-n2}$) unit;

$R^{83}$ is each independently at each occurrence a hydrogen atom, a hydroxyl group, or a lower alkyl group;

p2 is each independently at each occurrence an integer of 0 to 3, q2 is each independently at each occurrence an integer of 0 to 3, and r2 is each independently at each occurrence an integer of 0 to 3, provided that the sum of p2, q2, and r2 is 3 in each $(—Z^4—CR^{81}_{p2}R^{82}_{q2}R^{83}_{r2})$ or in each $(—Z^4—CR^{81"}_{p2}R^{82"}_{q2}R^{83}_{r2})$;

$R^{d"}$ is each independently at each occurrence $—Z^4—CR^{81}_{p2}R^{82"}_{q2}R^{83}_{r2}$;

$R^{82"}$ is each independently at each occurrence $—Y—SiR^{85"}_{n2}R^{86"}_{3-n2}$;

$R^{85"}$ and $R^{86"}$ are the same as defined in $R^{85}$ and $R^{86}$, respectively;

$R^e$ is each independently at each occurrence $—Y—SiR^{85}_{n2}R^{86}_{3-n2}$;

$R^{e"}$ is each independently at each occurrence $—Y—SiR^{85"}_{n2}R^{86"}_{3-n2}$;

$R^f$ and $R^{f"}$ are each independently at each occurrence a hydrogen atom, a hydroxyl group, or a lower alkyl group;

k2 is each independently at each occurrence an integer of 0 to 3, l2 is each independently at each occurrence an integer of 0 to 3, and m2 is each independently at each occurrence an integer of 0 to 3, provided that the sum of k2, l2, and m2 is 3;

$R^6$ is each independently at each occurrence $—R^{16}—R^{15}—R^{17}—$;

$R^{15}$ is each independently at each occurrence a cycloalkylene-containing group;

$R^{16}$ is each independently at each occurrence a single bond or a divalent organic group;

$R^{17}$ is each independently at each occurrence a single bond or a divalent organic group;

$R^7$ is each independently at each occurrence a hydrogen atom or a $C_{1-20}$ alkyl group;

$PFPE^1$ is each independently at each occurrence $—R^F—R^{FE}$;

$R^F$ is $—(C_fF_{2f})—$;

f is an integer of 1 to 10;

$R^{FE}$ is a divalent fluoropolyether group represented by formula:

$$—(OCF_2)_{a1}—(OC_2F_4)_{a2}—(OC_3X^6)_{a3}—(OC_4F_8)_{a4}—(OC_5F_{10})_{a5}—(OCF_{12})_{a6}—(OC_7F_{14})_{a7}—(OC_8F_{16})_{a8}—$$

wherein a1, a2, a3, a4, a5, a6, a7, and a8 are each independently an integer of 0 to 200 and the sum of a1, a2, a3, a4, a5, a6, a7, and a8 is at least 5, the occurrence order of the respective repeating units enclosed in parentheses provided with the subscript a1, a2, a3, a4, a5, a6, a7, or a8 is not limited in the formula, and $X^{10}$ is each independently at each occurrence a hydrogen atom, a fluorine atom, or a chlorine atom, provided that at least one of a1, a2, a4, a5, a6, a7, and a8 is an integer of 1 or more when all $X^{10}$ is a hydrogen atom or a chlorine atom; and r is an integer of 1 or more.

10. A surface-treating agent comprising the fluoropolyether group-containing silane compound according to claim 1.

11. The surface-treating agent according to claim 10, further comprising one or more other components selected from a fluorine-containing oil, a silicone oil, and a catalyst.

12. The surface-treating agent according to claim 10, further comprising a solvent.

13. The surface-treating agent according to claim 10, which is configured for use as an antifouling coating agent or a water-proof coating agent.

14. An article comprising a substrate and a layer on a surface of the substrate, wherein the layer is formed of the fluoropolyether group-containing silane compound according to claim 1.

15. The article according to claim 14, which is an optical member.

16. The surface-treating agent according to claim 11, further comprising a solvent.

17. An article comprising a substrate and a layer on a surface of the substrate, wherein the layer is formed of the surface-treating agent according to claim 10.

18. An article comprising a substrate and a layer on a surface of the substrate, wherein the layer is formed of the surface-treating agent according to claim 11.

* * * * *